US012804627B2

(12) United States Patent
Chang et al.

(10) Patent No.: US 12,804,627 B2
(45) Date of Patent: Nov. 17, 2026

(54) METHOD AND APPARATUS FOR TRANSMISSION AND RECEPTION OF SIGNAL FOR TIMING ESTIMATION IN COMMUNICATION SYSTEM

(71) Applicant: ELECTRONICS AND TELECOMMUNICATIONS RESEARCH INSTITUTE, Daejeon (KR)

(72) Inventors: Kapseok Chang, Daejeon (KR); Cheul Soon Kim, Daejeon (KR); Young-Jo Ko, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 558 days.

(21) Appl. No.: 18/338,301

(22) Filed: Jun. 20, 2023

(65) Prior Publication Data

US 2024/0080826 A1 Mar. 7, 2024

(30) Foreign Application Priority Data

Jun. 20, 2022 (KR) ........................ 10-2022-0075169

(51) Int. Cl.
*H04W 72/0453* (2023.01)
*H04L 5/00* (2006.01)

(52) U.S. Cl.
CPC ......... *H04W 72/0453* (2013.01); *H04L 5/001* (2013.01); *H04L 5/0035* (2013.01); *H04L 5/0048* (2013.01)

(58) Field of Classification Search
CPC .. H04W 72/0453; H04L 5/001; H04L 5/0035; H04L 5/0048
See application file for complete search history.

(56) References Cited

U.S. PATENT DOCUMENTS 9,531,510 B2 12/2016 Kim et al.
9,768,925 B2 9/2017 Kim et al.
10,057,839 B2 8/2018 Ng et al.
10,263,744 B2 * 4/2019 Iwai ...................... H04L 5/0048
10,880,847 B2 12/2020 Kwak et al.
(Continued)

FOREIGN PATENT DOCUMENTS

WO WO-2018196996 A1 * 11/2018 ............. H04L 27/26

*Primary Examiner* — Kevin C. Harper
(74) *Attorney, Agent, or Firm* — Rabin & Berdo, P.C.

(57) ABSTRACT

A method may comprise: generating first and second FA sequences corresponding to first and second FAs, respectively, based on a first sequence; mapping elements of first and second FA signals, which are respectively generated by modulating the first and second FA sequences, to first and second subcarrier groups corresponding to the first and second FAs, first base station, and first symbol; generating third and fourth FA sequences corresponding to the first and second FAs, respectively, based on a second sequence; mapping elements of third and fourth FA signals, which are respectively generated by modulating the first and second FA sequences, to third and fourth subcarrier groups corresponding to the first and second FAs, second base station, and second symbol; and transmitting a first transmission signal including the first and second FA signals, and a second transmission signal including the third and fourth FA signals.

19 Claims, 32 Drawing Sheets

(56) References Cited

U.S. PATENT DOCUMENTS

| | | | | |
|---|---|---|---|---|
| 11,140,646 | B2 | 10/2021 | Chang et al. | |
| 2011/0255496 | A1* | 10/2011 | Kim | H04L 1/0071 370/329 |
| 2013/0259013 | A1 | 10/2013 | Malladi et al. | |
| 2013/0303179 | A1* | 11/2013 | Jitsukawa | H04W 72/20 455/450 |
| 2015/0071200 | A1* | 3/2015 | Takeda | H04W 72/0453 370/329 |
| 2015/0263875 | A1 | 9/2015 | Chang et al. | |
| 2018/0255522 | A1* | 9/2018 | Jung | H04L 5/005 |
| 2018/0270095 | A1 | 9/2018 | Ahmad et al. | |
| 2020/0007293 | A1* | 1/2020 | Wei | H04L 5/0053 |
| 2020/0228275 | A1 | 7/2020 | Li et al. | |

* cited by examiner

FIG. 10A

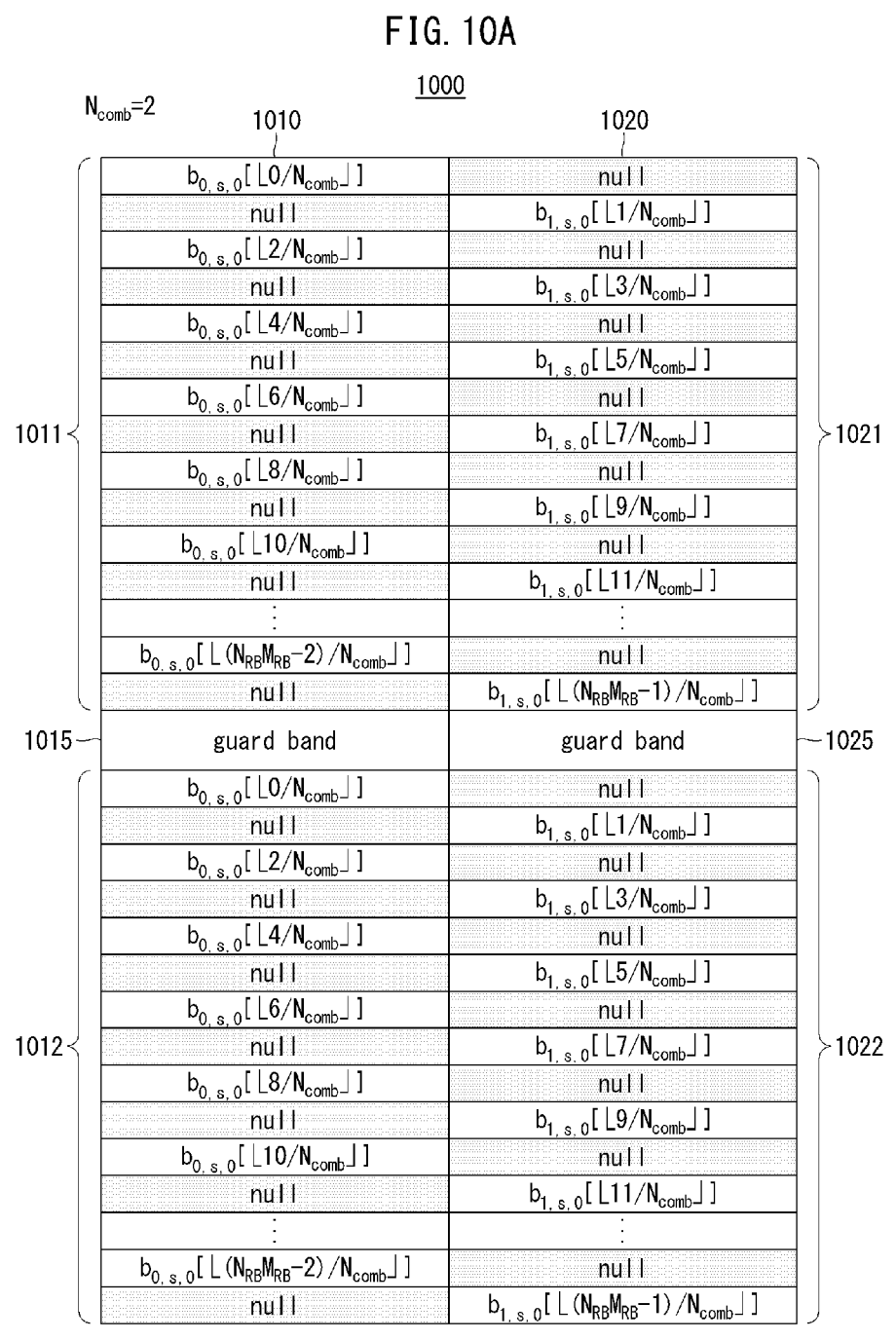

1000

$N_{comb}=2$

| | 1010 | 1020 | |
|---|---|---|---|
| 1011 | $b_{0,s,0}[\lfloor 0/N_{comb} \rfloor]$ | null | 1021 |
| | null | $b_{1,s,0}[\lfloor 1/N_{comb} \rfloor]$ | |
| | $b_{0,s,0}[\lfloor 2/N_{comb} \rfloor]$ | null | |
| | null | $b_{1,s,0}[\lfloor 3/N_{comb} \rfloor]$ | |
| | $b_{0,s,0}[\lfloor 4/N_{comb} \rfloor]$ | null | |
| | null | $b_{1,s,0}[\lfloor 5/N_{comb} \rfloor]$ | |
| | $b_{0,s,0}[\lfloor 6/N_{comb} \rfloor]$ | null | |
| | null | $b_{1,s,0}[\lfloor 7/N_{comb} \rfloor]$ | |
| | $b_{0,s,0}[\lfloor 8/N_{comb} \rfloor]$ | null | |
| | null | $b_{1,s,0}[\lfloor 9/N_{comb} \rfloor]$ | |
| | $b_{0,s,0}[\lfloor 10/N_{comb} \rfloor]$ | null | |
| | null | $b_{1,s,0}[\lfloor 11/N_{comb} \rfloor]$ | |
| | ⋮ | ⋮ | |
| | $b_{0,s,0}[\lfloor (N_{RB}M_{RB}-2)/N_{comb} \rfloor]$ | null | |
| | null | $b_{1,s,0}[\lfloor (N_{RB}M_{RB}-1)/N_{comb} \rfloor]$ | |
| 1015 | guard band | guard band | 1025 |
| 1012 | $b_{0,s,0}[\lfloor 0/N_{comb} \rfloor]$ | null | 1022 |
| | null | $b_{1,s,0}[\lfloor 1/N_{comb} \rfloor]$ | |
| | $b_{0,s,0}[\lfloor 2/N_{comb} \rfloor]$ | null | |
| | null | $b_{1,s,0}[\lfloor 3/N_{comb} \rfloor]$ | |
| | $b_{0,s,0}[\lfloor 4/N_{comb} \rfloor]$ | null | |
| | null | $b_{1,s,0}[\lfloor 5/N_{comb} \rfloor]$ | |
| | $b_{0,s,0}[\lfloor 6/N_{comb} \rfloor]$ | null | |
| | null | $b_{1,s,0}[\lfloor 7/N_{comb} \rfloor]$ | |
| | $b_{0,s,0}[\lfloor 8/N_{comb} \rfloor]$ | null | |
| | null | $b_{1,s,0}[\lfloor 9/N_{comb} \rfloor]$ | |
| | $b_{0,s,0}[\lfloor 10/N_{comb} \rfloor]$ | null | |
| | null | $b_{1,s,0}[\lfloor 11/N_{comb} \rfloor]$ | |
| | ⋮ | ⋮ | |
| | $b_{0,s,0}[\lfloor (N_{RB}M_{RB}-2)/N_{comb} \rfloor]$ | null | |
| | null | $b_{1,s,0}[\lfloor (N_{RB}M_{RB}-1)/N_{comb} \rfloor]$ | |

FIG. 10C

1000

$N_{comb}=2$

| 1010 | 1020 |
|---|---|
| $b_{0,s,0}[\lfloor 0/N_{comb} \rfloor]$ | null |
| null | $b_{1,s,0}[\lfloor 1/N_{comb} \rfloor]$ |
| $b_{0,s,0}[\lfloor 2/N_{comb} \rfloor]$ | null |
| null | $b_{1,s,0}[\lfloor 3/N_{comb} \rfloor]$ |
| $b_{0,s,0}[\lfloor 4/N_{comb} \rfloor]$ | null |
| null | $b_{1,s,0}[\lfloor 5/N_{comb} \rfloor]$ |
| $b_{0,s,0}[\lfloor 6/N_{comb} \rfloor]$ | null |
| null | $b_{1,s,0}[\lfloor 7/N_{comb} \rfloor]$ |
| $b_{0,s,0}[\lfloor 8/N_{comb} \rfloor]$ | null |
| null | $b_{1,s,0}[\lfloor 9/N_{comb} \rfloor]$ |
| $b_{0,s,0}[\lfloor 10/N_{comb} \rfloor]$ | null |
| null | $b_{1,s,0}[\lfloor 11/N_{comb} \rfloor]$ |
| ⋮ | ⋮ |
| $b_{0,s,0}[\lfloor (N_{RB}M_{RB}-2)/N_{comb} \rfloor]$ | null |
| null | $b_{1,s,0}[\lfloor (N_{RB}M_{RB}-1)/N_{comb} \rfloor]$ |
| $b_{0,s,0}[\lfloor 0/N_{comb} \rfloor]$ | null |
| null | $b_{1,s,0}[\lfloor 1/N_{comb} \rfloor]$ |
| $b_{0,s,0}[\lfloor 2/N_{comb} \rfloor]$ | null |
| null | $b_{1,s,0}[\lfloor 3/N_{comb} \rfloor]$ |
| $b_{0,s,0}[\lfloor 4/N_{comb} \rfloor]$ | null |
| null | $b_{1,s,0}[\lfloor 5/N_{comb} \rfloor]$ |
| $b_{0,s,0}[\lfloor 6/N_{comb} \rfloor]$ | null |
| null | $b_{1,s,0}[\lfloor 7/N_{comb} \rfloor]$ |
| $b_{0,s,0}[\lfloor 8/N_{comb} \rfloor]$ | null |
| null | $b_{1,s,0}[\lfloor 9/N_{comb} \rfloor]$ |
| $b_{0,s,0}[\lfloor 10/N_{comb} \rfloor]$ | null |
| null | $b_{1,s,0}[\lfloor 11/N_{comb} \rfloor]$ |
| ⋮ | ⋮ |
| $b_{0,s,0}[\lfloor (N_{RB}M_{RB}-2)/N_{comb} \rfloor]$ | null |
| null | $b_{1,s,0}[\lfloor (N_{RB}M_{RB}-1)/N_{comb} \rfloor]$ |

FIG. 10D

1000

$N_{comb}=2$ 1061 (upper half, 1060 column), 1071 (upper half, 1070 column); 1062 (lower half, 1060 column), 1072 (lower half, 1070 column)

| 1060 | 1070 |
|---|---|
| null | $b_{1,s,1}[\lfloor 0/N_{comb} \rfloor]$ |
| $b_{0,s,1}[\lfloor 1/N_{comb} \rfloor]$ | null |
| null | $b_{1,s,1}[\lfloor 2/N_{comb} \rfloor]$ |
| $b_{0,s,1}[\lfloor 3/N_{comb} \rfloor]$ | null |
| null | $b_{1,s,1}[\lfloor 4/N_{comb} \rfloor]$ |
| $b_{0,s,1}[\lfloor 5/N_{comb} \rfloor]$ | null |
| null | $b_{1,s,1}[\lfloor 6/N_{comb} \rfloor]$ |
| $b_{0,s,1}[\lfloor 7/N_{comb} \rfloor]$ | null |
| null | $b_{1,s,1}[\lfloor 8/N_{comb} \rfloor]$ |
| $b_{0,s,1}[\lfloor 9/N_{comb} \rfloor]$ | null |
| null | $b_{1,s,1}[\lfloor 10/N_{comb} \rfloor]$ |
| $b_{0,s,1}[\lfloor 11/N_{comb} \rfloor]$ | null |
| ⋮ | ⋮ |
| null | $b_{1,s,1}[\lfloor (N_{RB}M_{RB}-2)/N_{comb} \rfloor]$ |
| $b_{0,s,1}[\lfloor (N_{RB}M_{RB}-1)/N_{comb} \rfloor]$ | null |
| null | $b_{1,s,1}[\lfloor 0/N_{comb} \rfloor]$ |
| $b_{0,s,1}[\lfloor 1/N_{comb} \rfloor]$ | null |
| null | $b_{1,s,1}[\lfloor 2/N_{comb} \rfloor]$ |
| $b_{0,s,1}[\lfloor 3/N_{comb} \rfloor]$ | null |
| null | $b_{1,s,1}[\lfloor 4/N_{comb} \rfloor]$ |
| $b_{0,s,1}[\lfloor 5/N_{comb} \rfloor]$ | null |
| null | $b_{1,s,1}[\lfloor 6/N_{comb} \rfloor]$ |
| $b_{0,s,1}[\lfloor 7/N_{comb} \rfloor]$ | null |
| null | $b_{1,s,1}[\lfloor 8/N_{comb} \rfloor]$ |
| $b_{0,s,1}[\lfloor 9/N_{comb} \rfloor]$ | null |
| null | $b_{1,s,1}[\lfloor 10/N_{comb} \rfloor]$ |
| $b_{0,s,1}[\lfloor 11/N_{comb} \rfloor]$ | null |
| ⋮ | ⋮ |
| null | $b_{1,s,1}[\lfloor (N_{RB}M_{RB}-2)/N_{comb} \rfloor]$ |
| $b_{0,s,1}[\lfloor (N_{RB}M_{RB}-1)/N_{comb} \rfloor]$ | null |

FIG. 11A

1100

$N_{comb}=4$

| | 1110 | 1120 | |
|---|---|---|---|
| 1111 | $b_{0,s,0}[\lfloor 0/N_{comb} \rfloor]$ | null | 1121 |
| | null | $b_{1,s,0}[\lfloor 1/N_{comb} \rfloor]$ | |
| | null | null | |
| | null | null | |
| | $b_{0,s,0}[\lfloor 4/N_{comb} \rfloor]$ | null | |
| | null | $b_{1,s,0}[\lfloor 5/N_{comb} \rfloor]$ | |
| | null | null | |
| | null | null | |
| | $b_{0,s,0}[\lfloor 8/N_{comb} \rfloor]$ | null | |
| | null | $b_{1,s,0}[\lfloor 9/N_{comb} \rfloor]$ | |
| | null | null | |
| | null | null | |
| | ⋮ | ⋮ | |
| | $b_{0,s,0}[\lfloor (N_{RB}M_{RB}-4)/N_{comb} \rfloor]$ | null | |
| | null | $b_{1,s,0}[\lfloor (N_{RB}M_{RB}-3)/N_{comb} \rfloor]$ | |
| | null | null | |
| | null | null | |
| 1115 | guard band | guard band | 1125 |
| 1112 | $b_{0,s,0}[\lfloor 0/N_{comb} \rfloor]$ | null | 1122 |
| | null | $b_{1,s,0}[\lfloor 1/N_{comb} \rfloor]$ | |
| | null | null | |
| | null | null | |
| | $b_{0,s,0}[\lfloor 4/N_{comb} \rfloor]$ | null | |
| | null | $b_{1,s,0}[\lfloor 5/N_{comb} \rfloor]$ | |
| | null | null | |
| | null | null | |
| | $b_{0,s,0}[\lfloor 8/N_{comb} \rfloor]$ | null | |
| | null | $b_{1,s,0}[\lfloor 9/N_{comb} \rfloor]$ | |
| | null | null | |
| | null | null | |
| | ⋮ | ⋮ | |
| | $b_{0,s,0}[\lfloor (N_{RB}M_{RB}-4)/N_{comb} \rfloor]$ | null | |
| | null | $b_{1,s,0}[\lfloor (N_{RB}M_{RB}-3)/N_{comb} \rfloor]$ | |
| | null | null | |
| | null | null | |

FIG. 11C

1100

$N_{comb}=4$

| | 1110 | 1120 | |
|---|---|---|---|
| 1111 | $b_{0,s,0}[\lfloor 0/N_{comb} \rfloor]$ | null | 1121 |
| | null | $b_{1,s,0}[\lfloor 1/N_{comb} \rfloor]$ | |
| | null | null | |
| | null | null | |
| | $b_{0,s,0}[\lfloor 4/N_{comb} \rfloor]$ | null | |
| | null | $b_{1,s,0}[\lfloor 5/N_{comb} \rfloor]$ | |
| | null | null | |
| | null | null | |
| | $b_{0,s,0}[\lfloor 8/N_{comb} \rfloor]$ | null | |
| | null | $b_{1,s,0}[\lfloor 9/N_{comb} \rfloor]$ | |
| | null | null | |
| | null | null | |
| | ⋮ | ⋮ | |
| | $b_{0,s,0}[\lfloor (N_{RB}M_{RB}-4)/N_{comb} \rfloor]$ | null | |
| | null | $b_{1,s,0}[\lfloor (N_{RB}M_{RB}-3)/N_{comb} \rfloor]$ | |
| | null | null | |
| | null | null | |
| 1112 | $b_{0,s,0}[\lfloor 0/N_{comb} \rfloor]$ | null | 1122 |
| | null | $b_{1,s,0}[\lfloor 1/N_{comb} \rfloor]$ | |
| | null | null | |
| | null | null | |
| | $b_{0,s,0}[\lfloor 4/N_{comb} \rfloor]$ | null | |
| | null | $b_{1,s,0}[\lfloor 5/N_{comb} \rfloor]$ | |
| | null | null | |
| | null | null | |
| | $b_{0,s,0}[\lfloor 8/N_{comb} \rfloor]$ | null | |
| | null | $b_{1,s,0}[\lfloor 9/N_{comb} \rfloor]$ | |
| | null | null | |
| | null | null | |
| | ⋮ | ⋮ | |
| | $b_{0,s,0}[\lfloor (N_{RB}M_{RB}-4)/N_{comb} \rfloor]$ | null | |
| | null | $b_{1,s,0}[\lfloor (N_{RB}M_{RB}-3)/N_{comb} \rfloor]$ | |
| | null | null | |
| | null | null | |

FIG. 11D

1100

$N_{comb}=4$

| | 1130 | 1140 | |
|---|---|---|---|
| 1131 | null | null | 1141 |
| | null | null | |
| | $b_{2,s,0}[\lfloor 2/N_{comb} \rfloor]$ | null | |
| | null | $b_{3,s,0}[\lfloor 3/N_{comb} \rfloor]$ | |
| | null | null | |
| | null | null | |
| | $b_{2,s,0}[\lfloor 6/N_{comb} \rfloor]$ | null | |
| | null | $b_{3,s,0}[\lfloor 7/N_{comb} \rfloor]$ | |
| | null | null | |
| | null | null | |
| | $b_{2,s,0}[\lfloor 10/N_{comb} \rfloor]$ | null | |
| | null | $b_{3,s,0}[\lfloor 11/N_{comb} \rfloor]$ | |
| | ⋮ | ⋮ | |
| | null | null | |
| | null | null | |
| | $b_{2,s,0}[\lfloor (N_{RB}M_{RB}-2)/N_{comb} \rfloor]$ | null | |
| | null | $b_{3,s,0}[\lfloor (N_{RB}M_{RB}-1)/N_{comb} \rfloor]$ | |
| 1132 | null | null | 1142 |
| | null | null | |
| | $b_{2,s,0}[\lfloor 2/N_{comb} \rfloor]$ | null | |
| | null | $b_{3,s,0}[\lfloor 3/N_{comb} \rfloor]$ | |
| | null | null | |
| | null | null | |
| | $b_{2,s,0}[\lfloor 6/N_{comb} \rfloor]$ | null | |
| | null | $b_{3,s,0}[\lfloor 7/N_{comb} \rfloor]$ | |
| | null | null | |
| | null | null | |
| | $b_{2,s,0}[\lfloor 10/N_{comb} \rfloor]$ | null | |
| | null | $b_{3,s,0}[\lfloor 11/N_{comb} \rfloor]$ | |
| | ⋮ | ⋮ | |
| | null | null | |
| | null | null | |
| | $b_{2,s,0}[\lfloor (N_{RB}M_{RB}-2)/N_{comb} \rfloor]$ | null | |
| | null | $b_{3,s,0}[\lfloor (N_{RB}M_{RB}-1)/N_{comb} \rfloor]$ | |

METHOD AND APPARATUS FOR TRANSMISSION AND RECEPTION OF SIGNAL FOR TIMING ESTIMATION IN COMMUNICATION SYSTEM

CROSS-REFERENCE TO RELATED APPLICATIONS

This application claims priority to Korean Patent Application No. 10-2022-0075169, filed on Jun. 20, 2022, with the Korean Intellectual Property Office (KIPO), the entire contents of which are hereby incorporated by reference.

BACKGROUND

1. Technical Field

Exemplary embodiments of the present disclosure relate to a timing estimation technique in a communication system, and more specifically, to a technique for transmitting and receiving signals for timing estimation, which can improve timing estimation performance in a carrier aggregation (CA) transmission mode.

2. Related Art

With the development of information and communication technology, various wireless communication technologies are being developed. Representative wireless communication technologies include long term evolution (LTE) and new radio (NR) defined as the 3rd generation partnership project (3GPP) standards. The LTE may be one of 4th generation (4G) wireless communication technologies, and the NR may be one of 5th generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

In a communication environment such as a factory automation system, precise positioning and precise time synchronization may be required. For precise time synchronization, excellent time resolution may be required. For excellent time resolution, securing a wide bandwidth may be required.

A communication system may support one or more configurations for securing a wide bandwidth. For example, the communication system may support a carrier frequency of an ultra-high frequency band. In this case, a wide bandwidth can be easily secured. Meanwhile, the communication system may support a carrier aggregation (CA) transmission mode. Even in this case, a wide bandwidth can be easily secured. The CA transmission mode may be used to improve performances such as a network coverage or transmission rate. Techniques for improving timing estimation accuracy based on excellent time resolution in the CA transmission mode may be required.

Matters described as the prior arts are prepared to help understanding of the background of the present disclosure, and may include matters that are not already known to those of ordinary skill in the technology domain to which exemplary embodiments of the present disclosure belong.

SUMMARY

Exemplary embodiments of the present disclosure are directed to providing a method and an apparatus for transmitting and receiving signals for timing estimation, which can improve timing estimation performance in a carrier aggregation (CA) transmission mode of a communication system.

According to a first exemplary embodiment of the present disclosure, a method of a first communication node may comprise: generating a first frequency assignment (FA) sequence and a second FA sequence corresponding to a first FA and a second FA, respectively, based on a first sequence; mapping elements of a first FA signal and a second FA signal, which are respectively generated by modulating the first and second FA sequences, to first and second subcarrier groups corresponding to the first and second FAs, a first base station, and a first symbol; generating a third FA sequence and a fourth FA sequence corresponding to the first FA and the second FA, respectively, based on a second sequence; mapping elements of a third FA signal and a fourth FA signal, which are respectively generated by modulating the first and second FA sequences, to third and fourth subcarrier groups corresponding to the first and second FAs, a second base station, and a second symbol; and transmitting a first transmission signal including the first and second FA signals mapped to the first and second subcarrier groups, and a second transmission signal including the third and fourth FA signals mapped to the third and fourth subcarrier groups.

Null values may be mapped to the subcarrier groups corresponding to the first and second FAs, the first base station, and the second symbol, and the subcarrier groups corresponding to the first and second FAs, the second base station, and the first symbol.

The method may further comprise, before the generating of the first FA sequence and the second FA sequence, determining the first sequence and the second sequence at least based on first to third identifiers, wherein the first identifier is identifier(s) of the first and second base stations, the second identifier is an identifier of a time resource, the third identifier is identifier(s) of the first and second symbols, the first sequence is equally determined for the first and second FAs, and the second sequence is equally determined for the first and second FAs.

The method may further comprise, before the generating of the first FA sequence and the second FA sequence, determining the first sequence and the second sequence at least based on first to fourth identifiers, wherein the first identifier is identifier(s) of the first and second base stations, the second identifier is an identifier of a time resource, the third identifier is identifier(s) of the first and second symbols, and the fourth identifier is identifier(s) of the first and second FAs.

The first and second transmission signals may be generated based on a transmission comb value of 1.

The number of elements of the first and second sequences may be determined based on a total number of available subcarriers for each FA, and the total number of available subcarriers for each FA may be determined based on a number of resource blocks for each FA, a number of subcarriers for each resource block, and a transmission comb value.

The generating of the first FA sequence and the second FA sequence may comprise: determining values of elements constituting a first element group and a second element group included in the first FA sequence, based on the first sequence, wherein values of elements of one of the first and second element groups are determined based on a first modified sequence modified from the first sequence.

One group among the first and second element groups may be composed of elements having even indices and the other group may be composed of elements having odd indices.

The generating of the first FA sequence and the second FA sequence may comprise: determining values of elements constituting a third element group and a fourth element group included in the second FA sequence, based on the first sequence, wherein indices of elements constituting the first to fourth element groups are determined as successive values.

Values of elements of one group among the third and fourth element groups may be determined based on a second modified sequence modified from the first sequence, and values of elements of another group may be determined based on a third modified sequence modified from the first sequence.

A guard band may be disposed between the first and second subcarrier groups and between the third and fourth subcarrier groups, respectively.

According to a second exemplary embodiment of the present disclosure, a method of a first communication node may comprise: generating a first frequency assignment (FA) sequence and a second FA sequence corresponding to a first FA and a second FA, respectively, based on a first sequence; mapping elements of a first FA signal and a second FA signal, which are respectively generated by modulating the first and second FA sequences, to first and second subcarrier groups corresponding to the first and second FAs, a first base station, and a first symbol; generating a third FA sequence and a fourth FA sequence corresponding to the first FA and the second FA, respectively, based on a second sequence; mapping elements of a third FA signal and a fourth FA signal, which are respectively generated by modulating the third and fourth FA sequences, to third and fourth subcarrier groups corresponding to the first and second FAs, the first base station, and a second symbol; and transmitting a first transmission signal including the first and second FA signals mapped to the first and second subcarrier groups and the third and fourth FA signals mapped to the third and fourth subcarrier groups.

Elements having odd indices in the first and second FA sequences and elements having even indices in the third and fourth FA sequences may all have null values.

The method may further comprise: generating a fifth FA sequence and a sixth FA sequence corresponding to the first FA and the second FA, respectively, based on a third sequence; mapping elements of a fifth FA signal and a sixth FA signal, which are respectively generated by modulating the fifth and sixth FA sequences, to fifth and sixth subcarrier groups corresponding to the first and second FAs, a second base station, and the first symbol; generating a seventh FA sequence and an eighth FA sequence corresponding to the first FA and the second FA, respectively, based on a fourth sequence; mapping elements of a seventh FA signal and an eighth FA signal, which are respectively generated by modulating the seventh and eighth FA sequences, to seventh and eighth subcarrier groups corresponding to the first and second FAs, the second base station and the second symbol; and transmitting a second transmission signal including the fifth and sixth FA signals mapped to the fifth and sixth subcarrier groups and the seventh and eighth FA signals mapped to the seventh and eighth subcarrier groups.

Elements having even indices in the fifth and sixth FA sequences and elements having odd indices in the seventh and eighth FA sequences may all have null values.

The method may further comprise, before the generating of the first FA sequence and the second FA sequence, determining the first sequence and the second sequence at least based on first to third identifiers, wherein the first identifier is an identifier of the first base station, the second identifier is an identifier of a time resource, and the third identifier is identifier(s) of the first and second symbols.

The first transmission signal may be generated based on a transmission comb value of 2.

The number of elements of the first and second sequences may be determined based on a total number of available subcarriers for each FA, and the total number of available subcarriers for each FA may be determined based on a number of resource blocks for each FA, a number of subcarriers for each resource block, and a transmission comb value.

When the first transmission signal is generated based on a transmission comb value of n, the method may further comprise: before the transmitting of the first transmission signal, generating a (2n−1)-th FA sequence and a 2n-th FA sequence corresponding to the first FA and the second FA, respectively, based on an n-th sequence; and mapping elements of a (2n−1)-th FA signal and a 2n-th FA signal, which are respectively generated by modulating the (2n−1)-th and 2n-th FA sequences, to (2n−1)-th and 2n-th subcarrier groups corresponding to the first and second FAs, the first base station, and an n-th symbol, wherein the first transmission signal further includes the (2n−1)-th FA signal and the 2n-th FA signal, and n is a natural number greater than 2.

According to a third exemplary embodiment of the present disclosure, a first communication comprising a processor, and the processor may cause the first communication node to perform: generating a first component carrier (CC) sequence and a second CC sequence corresponding to a first CC and a second CC, respectively, based on a first sequence; mapping elements of a first CC signal and a second CC signal, which are respectively generated by modulating the first and second CC sequences, to first and second subcarrier groups corresponding to the first and second CCs, a first base station, and a first symbol; generating a third CC sequence and a fourth CC sequence corresponding to the first CC and the second CC, respectively, based on a second sequence; mapping elements of a third CC signal and a fourth CC signal, which are respectively generated by modulating the first and second CC sequences, to third and fourth subcarrier groups corresponding to the first and second CCs, a second base station, and a second symbol; and transmitting a first transmission signal including the first and second CC signals mapped to the first and second subcarrier groups, and a second transmission signal including the third and fourth CC signals mapped to the third and fourth subcarrier groups.

According to exemplary embodiments of a method and an apparatus for transmitting and receiving signals for timing estimation in the communication system, timing estimation performance can be improved based on radio signals designed in consideration of an interference avoidance effect for each base station or each FA in the CA transmission mode. Accordingly, improvement in time resolution and timing accuracy performance can be expected even in an environment where hardware impairment is non-negligible for each FA frequency band (or across FA frequency bands).

BRIEF DESCRIPTION OF DRAWINGS

FIGS. 10A to 10D are conceptual diagrams for describing ninth and tenth exemplary embodiments of a radio signal generation method in a communication system.

FIGS. 11A to 11D are conceptual diagrams for describing eleventh and twelfth exemplary embodiments of a radio signal generation method in a communication system.

DETAILED DESCRIPTION OF THE EMBODIMENTS

Figure 1:
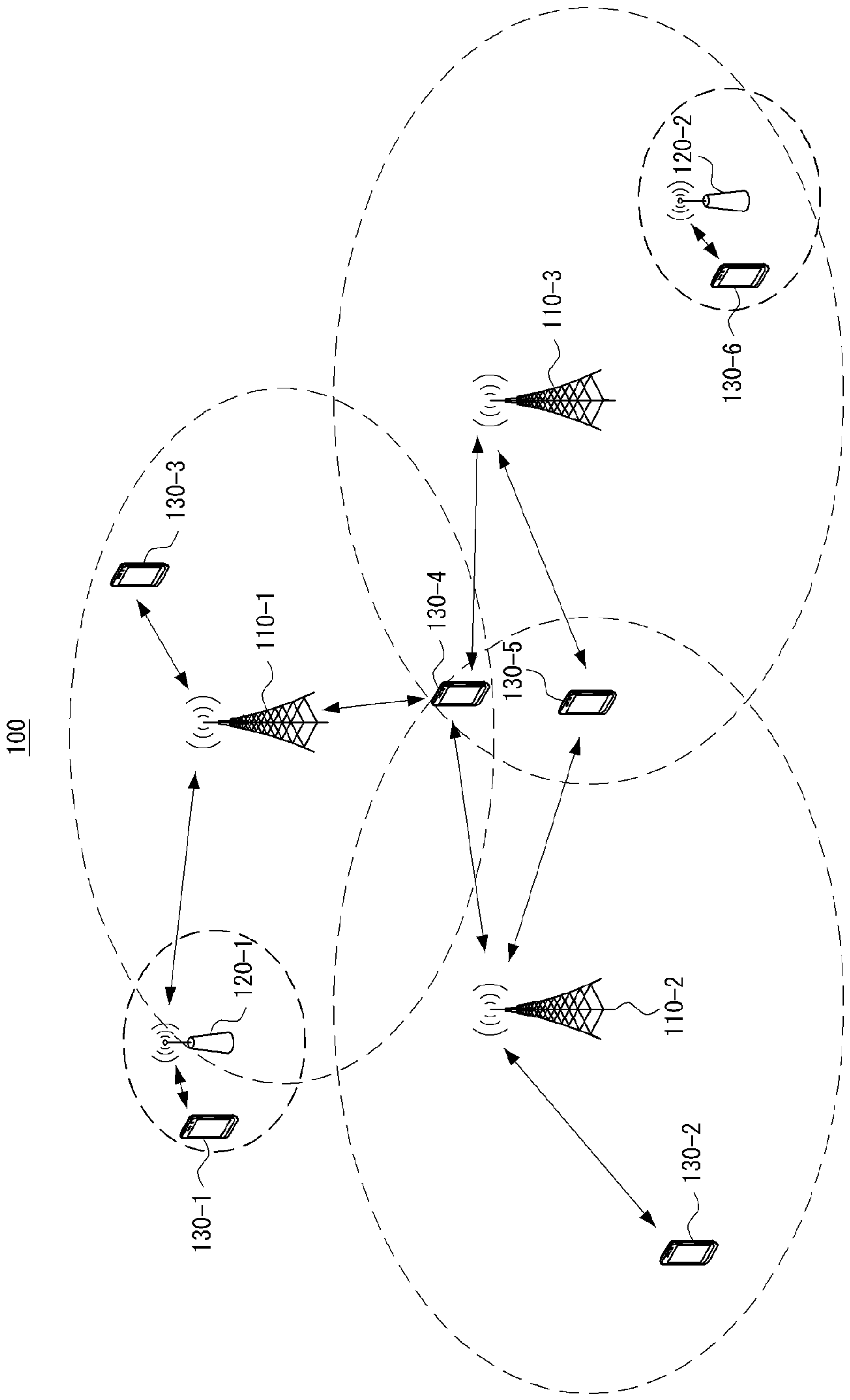
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
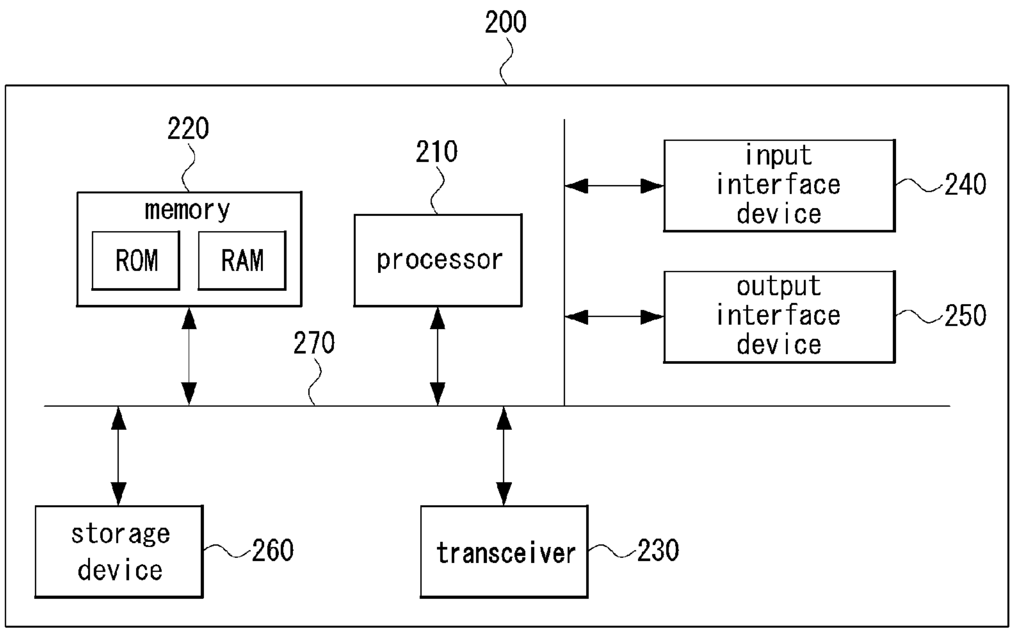
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving signals for timing estimation in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
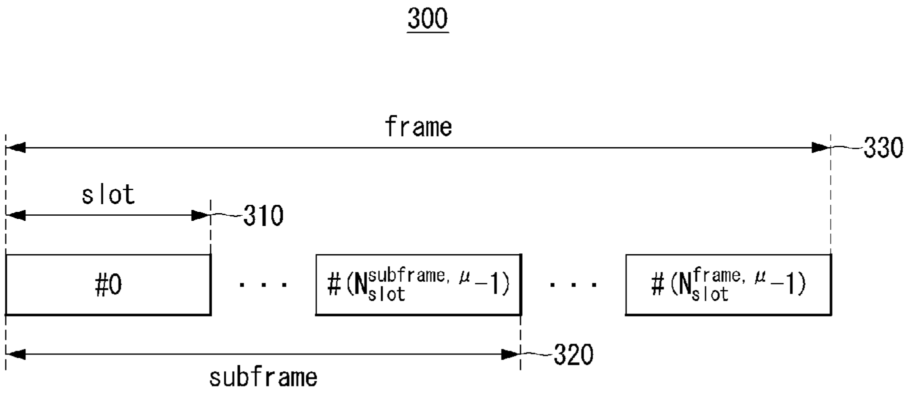
FIG. 3 is a conceptual diagram illustrating an exemplary embodiment of a structure of a radio frame in a communication system.

FIG. 3 is a conceptual diagram illustrating an exemplary embodiment of a structure of a radio frame in a communication system.

Referring to FIG. 3, in the communication system, one radio frame may consist of 10 subframes, and one subframe may consist of 2 time slots. One time slot may have a plurality of symbols in the time domain and may include a plurality of subcarriers in the frequency domain. The plurality of symbols in the time domain may be OFDM symbols. For convenience, an exemplary embodiment of a radio frame structure in the communication system will be described below using an OFDM transmission mode in which the plurality of symbols in the time domain are OFDM symbols as an example. However, this is only an example for convenience of description, and exemplary embodiments of the radio frame structure in the communication system are not limited thereto. For example, various exemplary embodiments of the radio frame structure in the communication system may be configured to support other transmission modes, such as a single carrier (SC) transmission mode.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is only an example for convenience of description, and exemplary embodiments of numerologies used in the communication system may not be limited thereto. Each numerology μ may correspond to information of a subcarrier spacing (SCS) Δf and a cyclic prefix (CP). The terminal may identify values of the numerology μ and CP applied to a downlink bandwidth part or uplink bandwidth part based on higher layer parameters such as 'subcarrierSpacing' and 'cyclicPrefix'.

Time resources in which radio signals are transmitted in a communication system 300 may be represented with a frame 320 comprising one or more $$\left(N_{slot}^{frame,\mu}/N_{slot}^{subframe,\mu}\right)$$

subframes, a subframe 320 comprising one or more $$\left(N_{slot}^{subframe,\mu}\right)$$

slots, and a slot 310 comprising 14

$$\left(N_{symb}^{slot}\right)$$

OFDM symbols. In this case, according to a configured numerology, as the values of $$N_{symb}^{slot},$$

$$N_{slot}^{subframe,\mu}, \text{ and } N_{slot}^{frame,\mu},$$

values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In an exemplary embodiment of a communication system, the frame 330 may have a length of 10 ms, and the subframe 320 may have a length of 1 ms. Each frame 330 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

One slot may have 6 (i.e., extended cyclic prefix (CP) case) or 7 (i.e., normal CP case) OFDM symbols. A time-frequency region defined by one slot may be referred to as a resource block (RB). When one slot has 7 OFDM symbols, one subframe may have 14 OFDM symbols (i.e., l=0, 1, 2, . . . , 13).

The subframe may be divided into a control region and a data region. A physical downlink control channel (PDCCH) may be allocated to the control region. A physical downlink shared channel (PDSCH) may be allocated to the data region. Some of the subframes may be special subframes. The special subframe may include a downlink pilot time slot (DwPTS), a guard period (GP), and an uplink pilot time slot (UpPTS). The DwPTS may be used for time and frequency synchronization estimation and cell search of the terminal. The GP may be a period for avoiding interferences caused by multipath delays of downlink signals.

In an exemplary embodiment of the communication system, a first radio signal may be used for timing estimation and the like. The first radio signal may be configured based on one or more sequences. The one or more sequences constituting the first radio signal may be arranged in a frame 330, a subframe 320, a slot 310, or OFDM symbols constituting the slot 310 in the time domain. Meanwhile, the one or more sequences constituting the first radio signal may be modulated and mapped to a plurality of subcarriers in the frequency domain. In an exemplary embodiment of the communication system, the one or more sequences constituting the first radio signal may correspond to one or more binary sequences or complex sequences.

Figure 4:
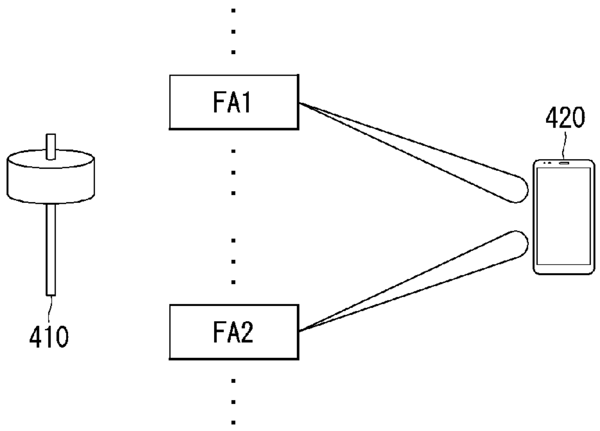
FIG. 4 is a conceptual diagram for describing an exemplary embodiment of a carrier aggregation (CA) transmission mode in a communication system.

FIG. 4 is a conceptual diagram for describing an exemplary embodiment of a carrier aggregation (CA) transmission mode in a communication system.

Referring to FIG. 4, in a communication environment such as a factory automation system, precise positioning and precise time synchronization may be required. For precise time synchronization, excellent time resolution may be required. For excellent time resolution, securing a wide bandwidth may be required.

The communication system may support one or more configurations for securing a wide bandwidth. For example, the communication system may support a carrier frequency of an ultra-high frequency band. In this case, a wide bandwidth can be easily secured. Meanwhile, the communication system may support a carrier aggregation (CA) transmission mode. Also in this case, a wide bandwidth can be easily secured.

The CA transmission mode may be used to improve performance such as a network coverage or transmission rate. For example, in the CA transmission mode, a frequency band within one or more radio access technologies (RATs) may be divided into continuous (or discontinuous) frequency assignment (FA) units.

For example, a transmitting node 410 (e.g., base station, etc.) may transmit the first radio signal divided into FA units based on the CA transmission mode. A receiving node 420 (e.g., terminal, etc.) may receive the first radio signal divided into FA units based on the CA transmission mode. The receiving node 420 may process and combine the received first radio signal in parallel for the respective FA units.

In an exemplary embodiment of the communication system, the receiving node 420 may perform timing estimation independently for each FA frequency band. Accordingly, there may be limitations in improving time resolution and preciseness. In addition, when hardware impairment (e.g., carrier frequency offset (CFO), phase noise (PhN), etc.) is non-negligible for each FA frequency band (or across FA frequency bands), performance such as timing accuracy may deteriorate. In the CA transmission mode, a transmission/reception technique for timing estimation may be required, which can expect improvement in time resolution and timing accuracy performance even in an environment where hardware impairment exists.

Figure 5:
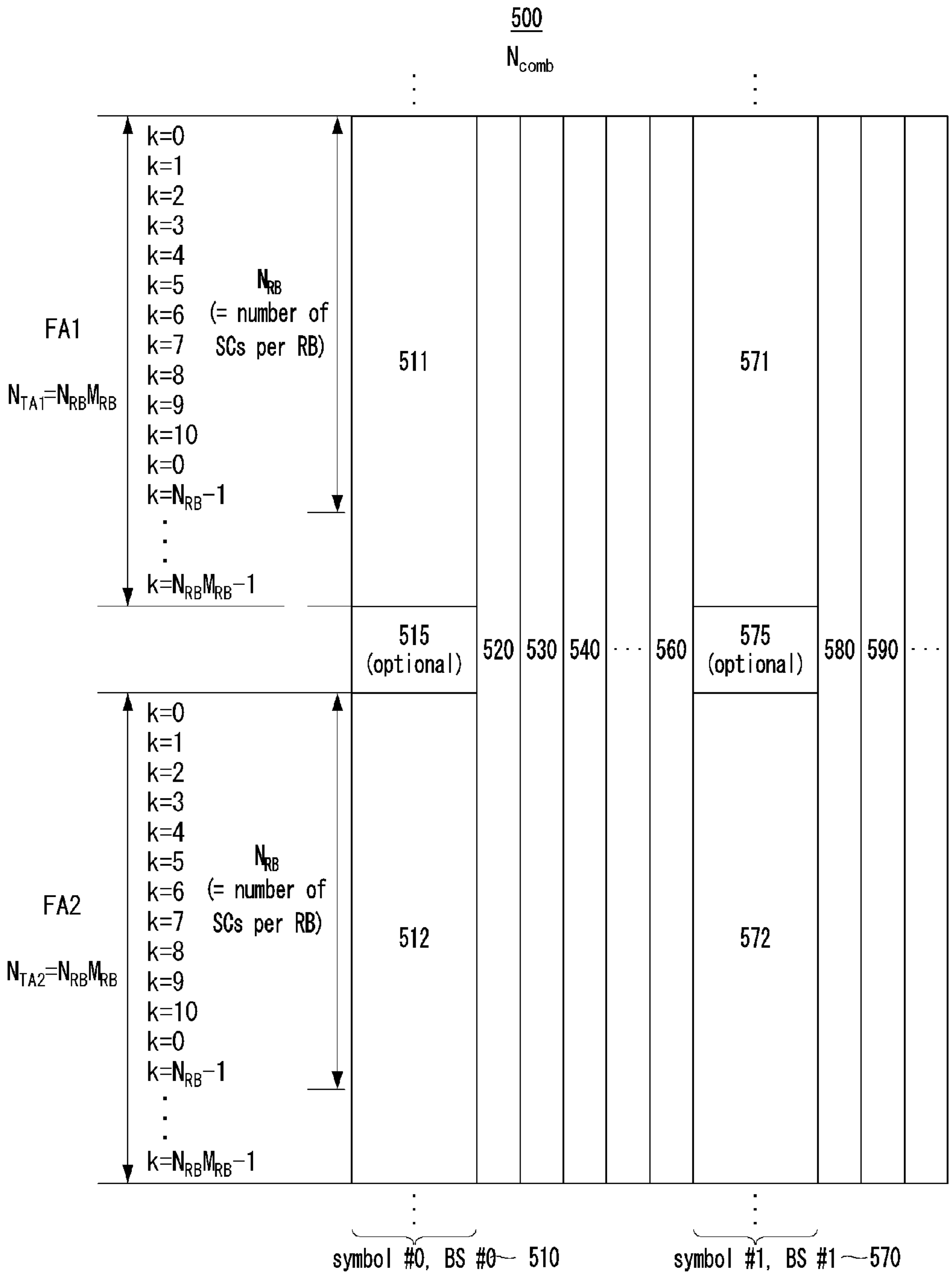
FIG. 5 is a conceptual diagram for describing an exemplary embodiment of a radio signal structure in a communication system.

FIG. 5 is a conceptual diagram for describing an exemplary embodiment of a radio signal structure in a communication system.

Referring to FIG. 5, the first radio signal in the communication system may be generated and transmitted based on a radio signal structure 500 shown in FIG. 5. The first radio signal may be a signal generated and transmitted for timing estimation, that is, a 'transmission signal for timing estimation'. In the radio signal structure 500, the first radio signal may be expressed as $q_{l,s,c}$. Here, l, s, and c may mean an OFDM symbol index, a slot index, and a base station (BS) index, respectively. The first radio signal $q_{l,s,c}$ may vary according to an OFDM symbol, slot, and BS in which it is transmitted.

In the radio signal structure 500, k may mean a subcarrier (SC) index or an identifier corresponding to each subcarrier. $N_{RB}$ may mean the number of subcarriers constituting one RB. Although it can be seen that FIG. 5 shows an exemplary embodiment in which $N_{RB}$=12, exemplary embodiments of the radio signal structure are not limited thereto. $M_{RB}$ may mean the total number of RBs occupied by one FA. That is, the amount of frequency resources (or the number of subcarriers) occupied by one FA may be $N_{RB}M_{RB}$.

In the radio signal structure 500, a comb-type mapping scheme may be used. In the comb-type mapping scheme, a signal (e.g., sequence) may be alternately mapped in units of one or more subcarriers in a frequency domain corresponding to one symbol or one node. In this case, the same signal may be repeated in the time domain after performing an inverse fast Fourier transform (IFFT) operation. In the radio signal structure 500, the first radio signal may be mapped to the time domain and frequency domain based on the comb-type mapping scheme. Based on the comb-type mapping scheme, $N_{comb}$, which is a comb value or a transmission comb value, may be determined. When the comb-type mapping scheme is not used, $N_{comb}$=1 may be used. On the other hand, when the comb-type mapping scheme is used, $N_{comb}$ may have a natural number value other than 1. The total number of available subcarriers for each FA may be determined according to $N_{comb}$. For example, the total number of available subcarriers per FA may be determined as $N_{RB}M_{RB}/N_{comb}$.

In the radio signal structure 500, one or more symbols corresponding to one or more base stations (BSs) may be mapped to the available subcarriers. For example, a symbol #0 510 of a BS #0 may be mapped to subcarriers 511 of FA1 and subcarriers 512 of FA2. Here, the subcarriers 511 of FA1 may be referred to as a first subcarrier group 511, and the subcarriers 512 of FA2 may be referred to as a second subcarrier group 512. A guard band 515 may be arranged between the first and second subcarrier groups 511 and 512. The arrangement of the guard band may be optional. That is, a guard band may not be arranged between the first and second subcarrier groups 511 and 512.

Meanwhile, in the radio signal structure 500, a symbol #1 570 of a BS #1 may be mapped to subcarriers 571 of FA1 and subcarriers 572 of FA2. Here, the subcarriers 571 of FA1 may be referred to as a third subcarrier group 571, and the subcarriers 572 of FA2 may be referred to as a fourth subcarrier group 572. A guard band 575 may be arranged between the third and fourth subcarrier groups 571 and 572. The arrangement of the guard band may be optional. That is, a guard band may not be arranged between the third and fourth subcarrier groups 571 and 572.

The symbol #0 510 of the BS #0 and the symbol #1 570 of the BS #1 are merely examples for convenience of description, and exemplary embodiments of the radio signal structure 500 are not limited thereto. For example, an exemplary embodiment of the radio signal structure 500 may include at least some of a symbol #1 520 of the BS #0, a symbol #2 530 of the BS #0, a symbol #3 540 of the BS #0, a symbol #0 of the BS #1 560, a symbol #2 580 of the BS #1, and a symbol #3 590 of the BS #1.

Configurations described for 'FA' in the present disclosure may be replaced with configurations for 'carrier' or 'component carrier (CC)'.

FIGS. 6A to 6D are conceptual diagrams for describing first and second exemplary embodiments of a radio signal generation method in a communication system.

Figure 6A:
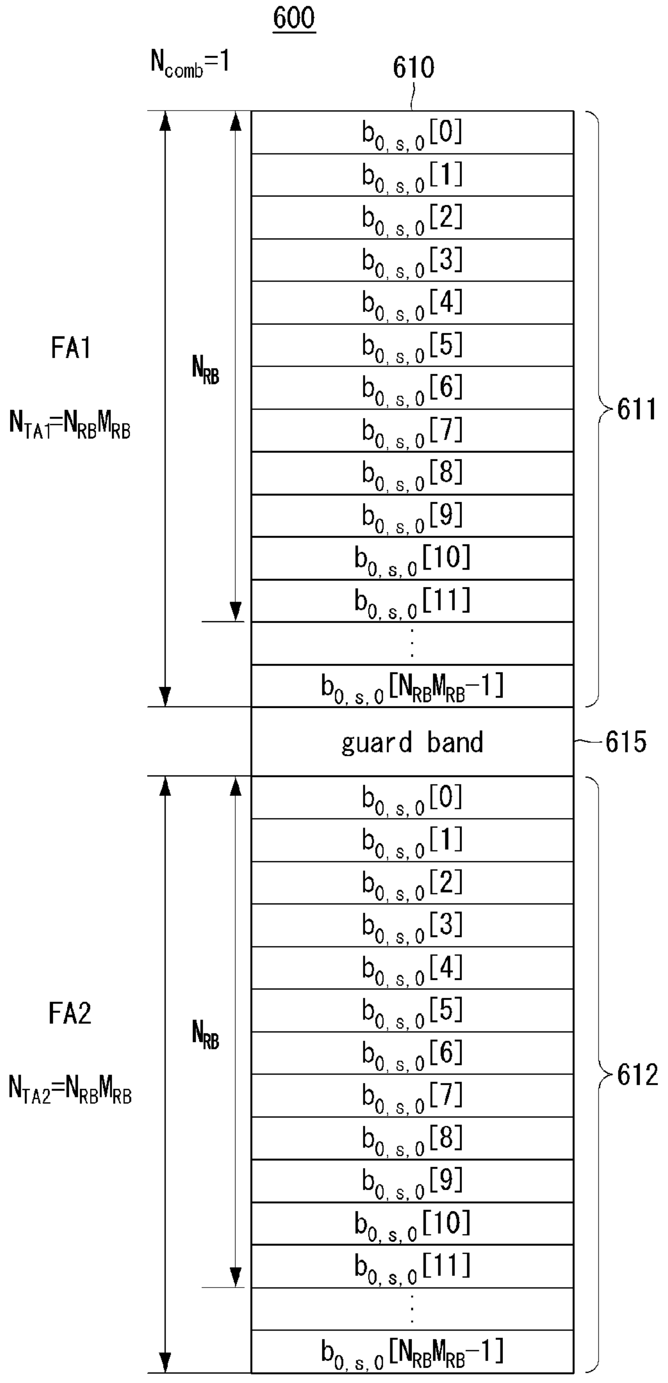
FIGS. 6A to 6D are conceptual diagrams for describing first and second exemplary embodiments of a radio signal generation method in a communication system.
Figure 6B:
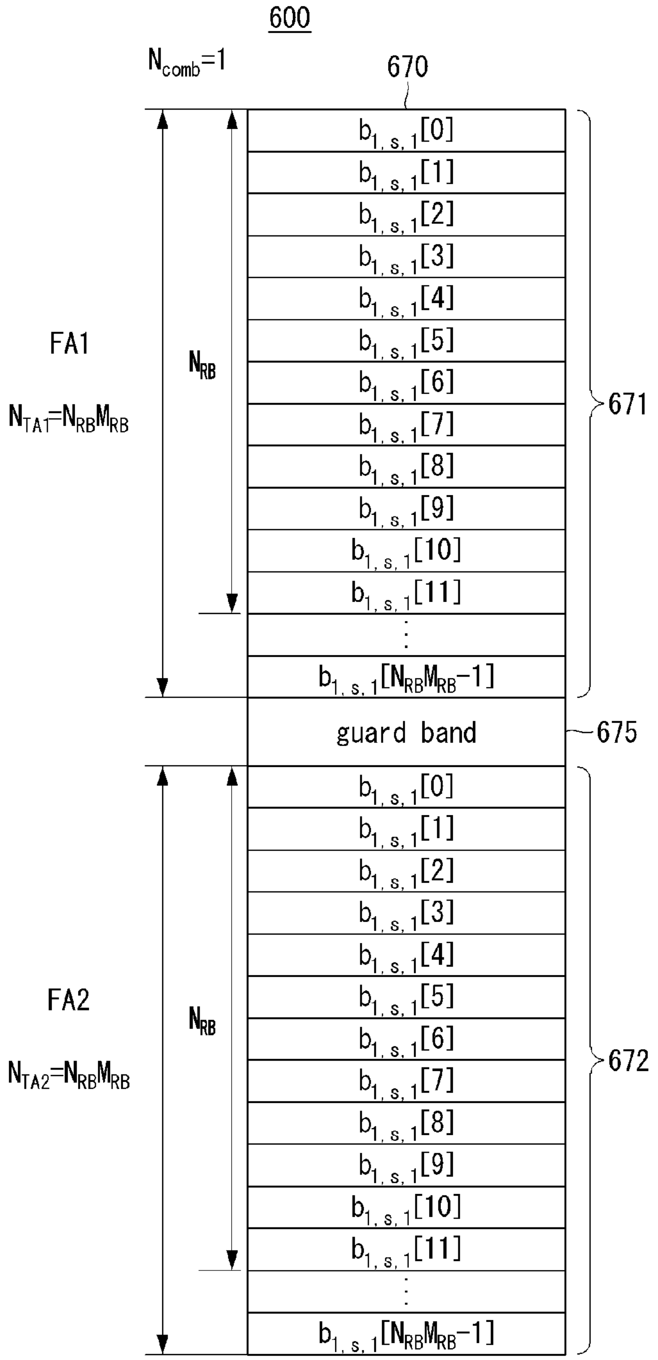

Referring to FIGS. 6A to 6D, in the first and second exemplary embodiments of the radio signal generation method in the communication system, the first radio signal may be generated based on a specific radio signal structure 600. Here, the radio signal structure 600 may be the same as or similar to the radio signal structure 500 described with reference to FIG. 5. FIGS. 6A and 6B may correspond to the first exemplary embodiment of the radio signal generation method, and FIGS. 6C and 6D may correspond to the second exemplary embodiment of the radio signal generation method. In the first and second exemplary embodiments of the radio signal generation method, $N_{comb}$ may be 1.

First Exemplary Embodiment of Radio Signal Generation Method

Referring to FIGS. 6A and 6B, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may mean an OFDM symbol index, a slot index, and a BS index, respectively. Hereinafter, in describing the first exemplary embodiment of the radio signal generation method with reference to FIGS. 6A and 6B, contents overlapping with those described with reference to FIGS. 1 to 5 may be omitted.

Referring to FIG. 6A, according to the first exemplary embodiment of the radio signal generation method, in a radio signal structure 600, a transmission signal for timing estimation corresponding to a symbol #0 610 of a BS #0 may be expressed as $q_{0,s,0}$. To generate $q_{0,s,0}$, a first candidate sequence $b_{0,s,0}[k]$ may be mapped to a first subcarrier group 611 and a second subcarrier group 612. That is, the first candidate sequence $b_{0,s,0}[k]$ may be equally mapped to the first and second subcarrier groups 611 and 612. The first candidate sequence may have a different value according to an OFDM symbol, slot, BS, and/or the like. The first candidate sequence may be a binary sequence or a complex sequence, but this is merely an example for convenience of description, and the first exemplary embodiment of the radio signal generation method is not limited thereto.

In the first exemplary embodiment of the radio signal generation method, the first candidate sequence $b_{0,s,0}[k]$ may have the same number of elements as the number of available subcarriers for each FA according to $N_{comb}$=1 (i.e., the number of subcarriers for each FA $N_{TA1}=N_{TA2}=N_{RB}M_{RB}$). The transmission signal for timing estimation for each FA may be expressed as $q_{0,s,0,FA\ \#}$. In the first exemplary embodiment of the radio signal generation method, $q_{0,s,0}$ for each FA may be expressed as in Equation 1.

$$q_{0,s,0,FA1}[k] = b_{0,s,0}[k],\quad k = 0, 1, 2, \ldots, N_{RB}M_{RB} - 1$$ [Equation 1]

$$q_{0,s,0,FA2}[k] = b_{0,s,0}[k],\quad k = 0, 1, 2, \ldots, N_{RB}M_{RB} - 1.$$

For $N_{comb}$=1, in order to avoid interference between BSs, null values may be applied to available subcarriers corresponding to a symbol #0 of a BS #1. Meanwhile, a guard band 615 may be arranged between the first subcarrier group 611 and the second subcarrier group 612.

Referring to FIG. 6B, according to the first exemplary embodiment of the radio signal generation method, in the radio signal structure 600, a transmission signal for timing estimation corresponding to a symbol #1 670 of the BS #1 may be expressed as $q_{1,s,1}$. To generate $q_{1,s,1}$, a second candidate sequence $b_{1,s,1}[k]$ may be mapped to a third subcarrier group 671 and a fourth subcarrier group 672. That is, the second candidate sequence $b_{1,s,1}[k]$ may be equally mapped to the third and fourth subcarrier groups 671 and 672. The second candidate sequence may have a different value according to an OFDM symbol, slot, BS, and/or the like. The second candidate sequence may be a binary sequence or a complex sequence, but this is merely an example for convenience of description, and the first exemplary embodiment of the radio signal generation method is not limited thereto.

In the first exemplary embodiment of the radio signal generation method, the second candidate sequence $b_{1,s,1}[k]$ may have the same number of elements as the number of available subcarriers for each FA according to $N_{comb}$=1 (i.e., the number of subcarriers for each FA $N_{TA1}=N_{TA2}=N_{RB}M_{RB}$). The transmission signal for timing estimation for each FA may be expressed as $q_{1,s,1,FA\ \#}$. In the first exemplary embodiment of the radio signal generation method, $q_{1,s,1}$ for each FA may be expressed as in Equation 2.

$$q_{1,s,1,FA1}[k] = b_{1,s,1}[k],\quad k = 0, 1, 2, \ldots, N_{RB}M_{RB} - 1$$ [Equation 2]

$$q_{1,s,1,FA2}[k] = b_{1,s,1}[k],\quad k = 0, 1, 2, \ldots, N_{RB}M_{RB} - 1.$$

The first exemplary embodiment of the radio signal generation method shown in FIGS. 6A and 6B may be based on a TDMA-based interference avoidance approach. For $N_{comb}$=1, in order to avoid interference between BSs, null values may be applied to available subcarriers corresponding to a symbol #1 of the BS #0. Meanwhile, a guard band 675 may be arranged between the third subcarrier group 671 and the fourth subcarrier group 672.

In the first exemplary embodiment of the radio signal generation method, one or more candidate sequences $b_{l,s,c}[\bullet]$ may be defined as a random Quadrature Phase Shift Keying (QPSK) sequence identical to or similar to Equation 3.

$$b_{l,s,c}[k] = \frac{1}{\sqrt{2}}(1 - 2x_{l,s,c}(2k')) + j\frac{1}{\sqrt{2}}(1 - 2x_{l,s,c}(2k' + 1)),$$ [Equaiton 3]

$$k' = 0, 1, 2, \ldots, \frac{N_{RB}M_{RB}}{N_{comb}} - 1$$

In Equation 3, $x_{l,s,c}(k)$ may be an m-sequence. For example, $x_{l,s,c}(k)$ may be an m-sequence having a maximum degree of 31, and having a seed $$x_{l,s,c}^{init}$$

(i.e., initial values $$x_{l,s,c}^{init}$$

of shift registers) identical or similar to Equation 4.

$$x_{l,s,c}^{init} = \left[2^{22}\left\lfloor\frac{c}{1024}\right\rfloor + 2^{10}(N_{sym}^{slot}s + l + 1)(2[c]_{1024} + 1) + [c]_{1024}\right]_{2^{31}}.$$ [Equation 4]

In Equation 4, c may be an ID of a sequence for timing estimation, and $$N_{sym}^{slot}$$

may mean the number of OFDM symbols per slot. The configurations described with reference to Equations 3 and 4 are merely examples for convenience of description, and the first exemplary embodiment of the radio signal generation method is not limited thereto.

In the first exemplary embodiment of the radio signal generation method, the signal for timing estimation and the candidate sequence may have at least one of the following characteristics.

- The candidate sequences $b_{l,s,c}[\bullet]$ may vary according to a symbol, slot, BS, and/or the like. However, this is merely an example for convenience of description, and the candidate sequence $b_{l,s,c}[\bullet]$ may vary according to all other possible variable combinations.
- In the candidate sequence $b_{l,s,c}[\bullet]$, c may correspond to a BS ID. However, this is merely an example for convenience of description, and c may correspond to a cell ID, a TRP ID, an ID of a sequence for timing estimation, and the like.
- $N_{RB}$ may be 12. However, this is merely an example for convenience of description, and $N_{RB}$ may have all other possible numbers as values.
- The same number $N_{RB}M_{RB}$ of available subcarriers may be applied to all FAs. However, this is merely an example for convenience of description, and the number of available subcarriers may be determined differently for each FA.
- Although a situation in which there are two FAs is shown as an example in FIGS. 6A and 6B, this is merely an example for convenience of description, and the configurations according to the first exemplary embodiment of the radio signal generation method may be applied equally or similarly to two or more FAs.
- Although the same sequence $b_{l,s,c}[m]$ is used for FA1 and FA2 in FIGS. 6A and 6B, this is merely an example for convenience of description, and a modified sequence $\tilde{b}_{l,s,c}[m]$ of the sequence of FA1 (or FA2) may be used for FA2 (or FA1). As an example, the modified sequence $\tilde{b}_{l,s,c}[m]$ may be $\tilde{b}_{l,s,c}[m] = -b_{l,s,c}[m]$, $$\tilde{b}_{l,s,c}[m] = b^{I}_{l,s,c}[m] - jb^{Q}_{l,s,c}[m],\ \tilde{b}_{l,s,c}[m] = -b^{I}_{l,s,c}[m] + jb^{Q}_{l,s,c}[m],$$

$$\tilde{b}_{l,s,c}[m] = b^{Q}_{l,s,c}[m] + jb^{I}_{l,s,c}[m],\ \tilde{b}_{l,s,c}[m] = -b^{Q}_{l,s,c}[m] - jb^{I}_{l,s,c}[m],$$

$$\tilde{b}_{l,s,c}[m] = b^{Q}_{l,s,c}[m] - jb^{I}_{l,s,c}[m],\ \tilde{b}_{l,s,c}[m] = -b^{Q}_{l,s,c}[m] + jb^{I}_{l,s,c}[m],$$

or the like, but may not be limited thereto. All possible modified sequences of $b_{l,s,c}$[m] fall within the scope of the present disclosure. Here, $$b^{I}_{l,s,c}[m] \text{ and } b^{Q}_{l,s,c}[m]$$

may mean a real part and an imaginary part of $b_{l,s,c}$c[m], respectively.

Second Exemplary Embodiment of Radio Signal Generation Method

Figure 6C:
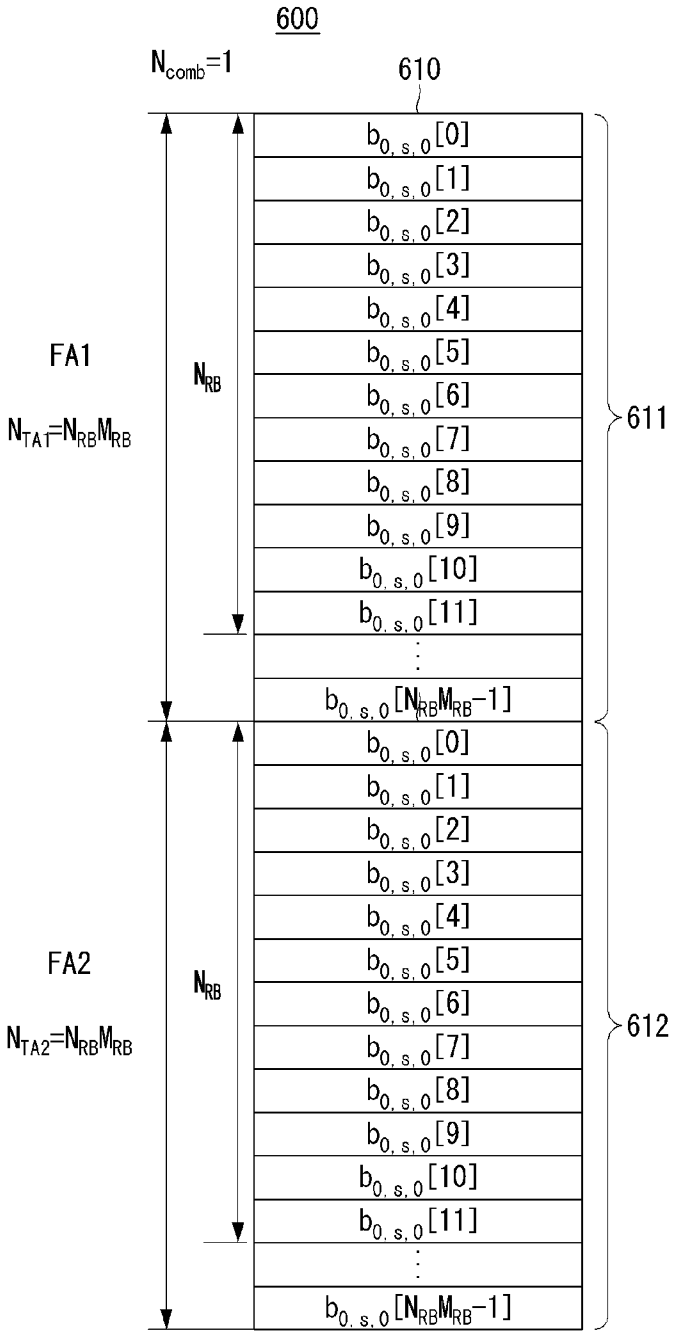
Figure 6D:
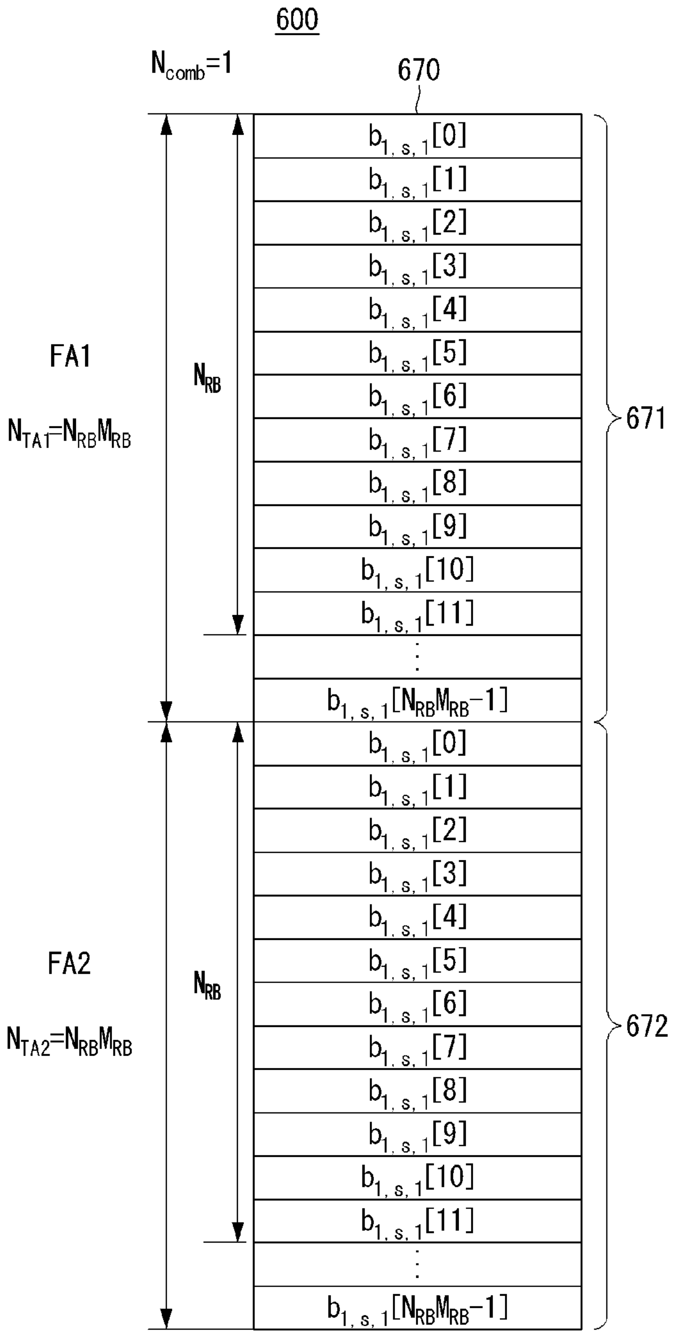

Referring to FIGS. 6C and 6D, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}$[•], and may be generated based on one or more candidate sequences $b_{l,s,c}$[•], and/or the like. Here, l, s, and c may each mean an OFDM symbol index, a slot index, and a BS index, respectively. Hereinafter, in describing the second exemplary embodiment of the radio signal generation method with reference to FIGS. 6C and 6D, contents overlapping with those described with reference to FIGS. 1 to 6B may be omitted.

Referring to FIG. 6C, according to the second exemplary embodiment of the radio signal generation method, in the radio signal structure 600, a transmission signal for timing estimation corresponding to the symbol #0 610 of the BS #0 may be expressed as $q_{0,s,0}$, and a transmission signal for timing estimation corresponding to the symbol #1 670 of the BS #1 may be expressed as $q_{1,s,1}$. $q_{0,s,0}$ may be mapped to first and second subcarrier groups 611 and 612, and $q_{1,s,1}$ may be mapped to third and fourth subcarrier groups 671 and 672.

A difference between the first exemplary embodiment and the second exemplary embodiment of the radio signal generation method may be determined by whether a guard band is arranged. Unlike the first exemplary embodiment of the radio signal generation method, in the second exemplary embodiment of the radio signal generation method, a guard band may not be arranged between the first and second subcarrier groups 611 and 612 and between the third and fourth subcarrier groups 671 and 672. That is, the first and second subcarrier groups 611 and 612 may be arranged adjacent to each other. Also, the third and fourth subcarrier groups 671 and 672 may be arranged adjacent to each other.

FIGS. 7A to 7D are conceptual diagrams for describing third and fourth exemplary embodiments of a radio signal generation method in a communication system.

Figure 7A:
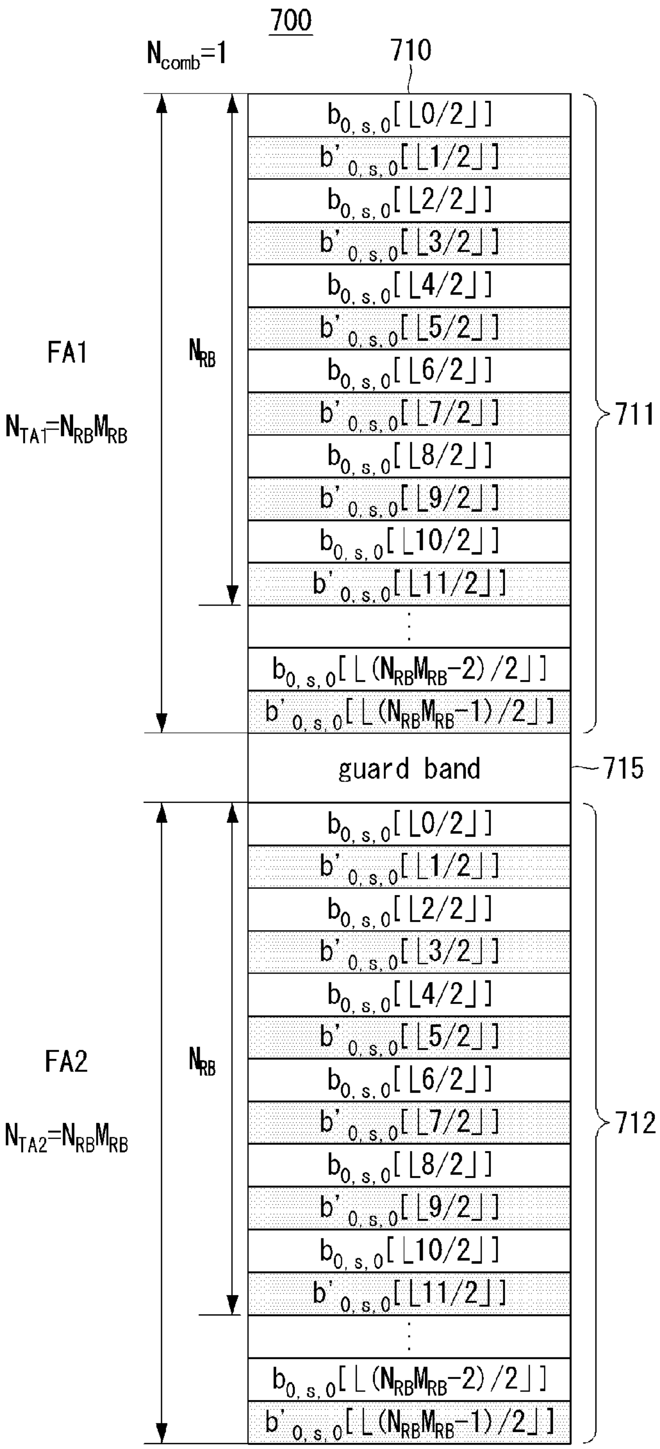
FIGS. 7A to 7D are conceptual diagrams for describing third and fourth exemplary embodiments of a radio signal generation method in a communication system.
Figure 7B:
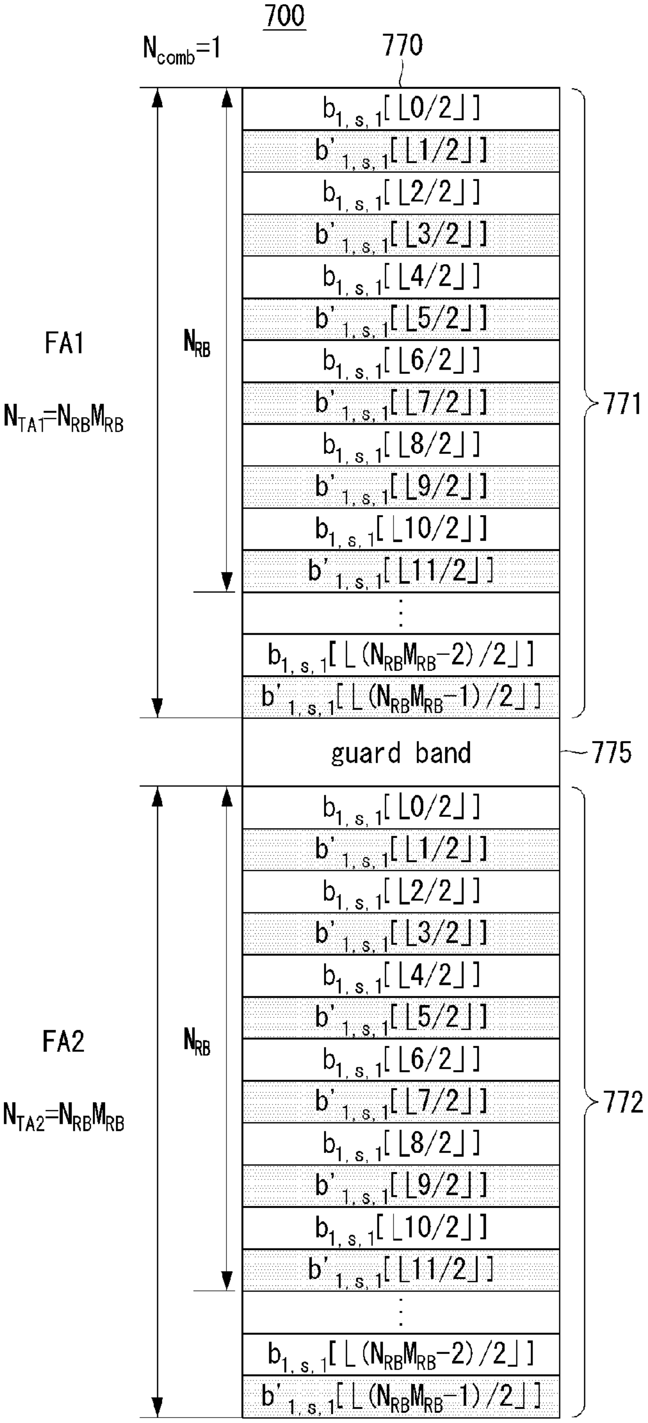

Referring to FIGS. 7A to 7D, in the third and fourth exemplary embodiments of the radio signal generation method in the communication system, the first radio signal may be generated based on a specific radio signal structure 700. Here, the radio signal structure 700 may be the same as or similar to the radio signal structure 500 described with reference to FIG. 5. FIGS. 7A and 7B may correspond to the third exemplary embodiment of the radio signal generation method, and FIGS. 7C and 7D may correspond to the fourth exemplary embodiment of the radio signal generation method. In the third and fourth exemplary embodiments of the radio signal generation method, $N_{comb}$ may be 1.

Third Exemplary Embodiment of Radio Signal Generation Method

Referring to FIGS. 7A and 7B, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}$[•], and may be generated based on one or more candidate sequences $b_{l,s,c}$[•], and/or the like. Here, l, s, and c may mean an OFDM symbol index, a slot index, and a BS index, respectively. Hereinafter, in describing the third exemplary embodiment of the radio signal generation method with reference to FIGS. 7A and 7B, contents overlapping with those described with reference to FIGS. 1 to 6D may be omitted.

Referring to FIG. 7A, according to the third exemplary embodiment of the radio signal generation method, in a radio signal structure 700, a transmission signal for timing estimation corresponding to a symbol #0 710 of a BS #0 may be expressed as $q_{0,s,0}$. To generate $q_{0,s,0}$, a first candidate sequence $b_{0,s,0}$[k] may be mapped to a first subcarrier group 711 and a second subcarrier group 712. That is, the first candidate sequence $b_{0,s,0}$[k] may be equally mapped to the first and second subcarrier groups 711 and 712. The first candidate sequence may have a different value according to an OFDM symbol, slot, BS, and/or the like. The first candidate sequence may be a binary sequence or a complex sequence, but this is merely an example for convenience of description, and the third exemplary embodiment of the radio signal generation method is not limited thereto.

In the third exemplary embodiment of the radio signal generation method, the first candidate sequence $b_{0,s,0}$[k] may have the same number of elements as the number of available subcarriers for each FA according to $N_{comb}$=1 (i.e., the number of subcarriers for each FA $N_{TA1}=N_{TA2}=N_{RB}M_{RB}$). The transmission signal for timing estimation for each FA may be expressed as $q_{0,s,0,FA\ \#}$. In the third exemplary embodiment of the radio signal generation method, $q_{0,s,0}$ for each FA may be expressed as in Equation 5.

[Equation 5]

$$q_{0,s,0,FA1}[k] = \begin{cases} b_{0,s,0}[\lfloor k/2 \rfloor], k = 2k', & k' = 0, 1, 2, \ldots, \frac{N_{RB}M_{RB}}{2} - 1 \\ \tilde{b}_{0,s,0}[\lfloor k/2 \rfloor], k = 2k' + 1, & k' = 0, 1, 2, \ldots, \frac{N_{RB}M_{RB}}{2} - 1 \end{cases}$$

$$q_{0,s,0,FA2}[k] = \begin{cases} b_{0,s,0}[\lfloor k/2 \rfloor], k = 2k', & k' = 0, 1, 2, \ldots, \frac{N_{RB}M_{RB}}{2} - 1 \\ \tilde{b}_{0,s,0}[\lfloor k/2 \rfloor], k = 2k' + 1, & k' = 0, 1, 2, \ldots, \frac{N_{RB}M_{RB}}{2} - 1. \end{cases}$$

In Equation 5, the first candidate sequence $b_{0,s,0}$[n] may mean an arbitrary binary or complex sequence having a length of $N_{RB}M_{RB}/2$, which has a different value or the same value according to an OFDM symbol, slot, and BS, and $\tilde{b}_{0,s,0}[n]$ may mean a modified sequence of $b_{0,s,0}[n]$. For example, $$\tilde{b}_{0,s,0}[n] = -b_{0,s,0}[n], \text{ and } \tilde{b}_{0,s,0}[n] = b^{I}_{0,s,0}[n] - jb^{Q}_{0,s,0}[n]$$

may be established, but are not limited thereto, and the third exemplary embodiment of the radio signal generation method is not limited thereto. For example, all possible modified patterns of $b_{0,s,0}[n]$ may be $\tilde{b}_{0,s,0}[n]$.

For $N_{comb}=1$, in order to avoid interference between BSs, null values may be applied to available subcarriers corresponding to a symbol #0 of a BS #1. Meanwhile, a guard band 715 may be arranged between the first subcarrier group 711 and the second subcarrier group 712.

Referring to FIG. 7B, according to the third exemplary embodiment of the radio signal generation method, in the radio signal structure 700, a transmission signal for timing estimation corresponding to a symbol #1 770 of the BS #1 may be expressed as $q_{1,s,1}$. To generate $q_{1,s,1}$, a second candidate sequence $b_{1,s,1}[k]$ may be mapped to a third subcarrier group 771 and a fourth subcarrier group 772. That is, the second candidate sequence $b_{1,s,1}[k]$ may be equally mapped to the third and fourth subcarrier groups 771 and 772. The second candidate sequence may have a different value according to an OFDM symbol, slot, BS, and/or the like. The second candidate sequence may be a binary sequence or a complex sequence, but this is merely an example for convenience of description, and the third exemplary embodiment of the radio signal generation method is not limited thereto.

In the third exemplary embodiment of the radio signal generation method, the second candidate sequence $b_{1,s,1}[k]$ may have the same number of elements as the number of available subcarriers for each FA according to $N_{comb}=1$ (i.e., the number of subcarriers for each FA $N_{TA1}=N_{TA2}=N_{RB}M_{RB}$). The transmission signal for timing estimation for each FA may be expressed as $q_{1,s,1,FA\#}$. In the third exemplary embodiment of the radio signal generation method, $q_{1,s,1}$ for each FA may be expressed as in Equation 6.

[Equation 6]

$$q_{1,s,1,FA1}[k] = \begin{cases} b_{1,s,1}[\lfloor k/2 \rfloor], & k = 2k', \quad k' = 0, 1, 2, \ldots, \frac{N_{RB}M_{RB}}{2} - 1 \\ \tilde{b}_{1,s,1}[\lfloor k/2 \rfloor], & k = 2k'+1, \quad k' = 0, 1, 2, \ldots, \frac{N_{RB}M_{RB}}{2} - 1 \end{cases}$$

$$q_{1,s,1,FA2}[k] = \begin{cases} b_{1,s,1}[\lfloor k/2 \rfloor], & k = 2k', \quad k' = 0, 1, 2, \ldots, \frac{N_{RB}M_{RB}}{2} - 1 \\ \tilde{b}_{1,s,1}[\lfloor k/2 \rfloor], & k = 2k'+1, \quad k' = 0, 1, 2, \ldots, \frac{N_{RB}M_{RB}}{2} - 1. \end{cases}$$

Even in the case of $q_{1,s,1}$, it may be generated by allocating distributed concatenation-based transmission sequences for timing estimation such as $b_{1,s,1}[n]$ and $\tilde{b}_{1,s,1}[n]$ in the same or similar manner to Equation 5. By allocating the transmission sequences for timing estimation for each BS to subsequent symbols to avoid interference between BSs in a TDMA form as described above, a receiving end may minimize interference between received signals of the transmission signal for timing estimation at BSs.

For $N_{comb}=1$, in order to avoid interference between BSs, null values may be applied to available subcarriers corresponding to a symbol #1 of a BS #0. Meanwhile, a guard band 875 may be arranged between the third subcarrier group 871 and the fourth subcarrier group 872.

In the third exemplary embodiment of the radio signal generation method, one or more candidate sequences $b_{l,s,c}[.]$ may be defined as a random QPSK sequence based on Equations 3 and 4, and the like. However, this is merely an example for convenience, and the third exemplary embodiment of the radio signal generation method is not limited thereto.

In the third exemplary embodiment of the radio signal generation method, the signal for timing estimation and the candidate sequence may have at least one of the following characteristics.

- The candidate sequences $b_{l,s,c}[\bullet]$ may vary according to a symbol, slot, BS, and/or the like. However, this is merely an example for convenience of description, and the candidate sequence $b_{l,s,c}[\bullet]$ may vary according to all other possible variable combinations.
- In the candidate sequence $b_{l,s,c}[\bullet]$, c may correspond to a BS ID. However, this is merely an example for convenience of description, and c may correspond to a cell ID, a TRP ID, an ID of a sequence for timing estimation, and the like.
- $N_{RB}$ may be 12. However, this is merely an example for convenience of description, and $N_{RB}$ may have all other possible numbers as values.
- The same number $N_{RB}M_{RB}$ of available subcarriers may be applied to all FAs. However, this is merely an example for convenience of description, and the number of available subcarriers may be determined differently for each FA.
- Although a situation in which there are two FAs is shown as an example in FIGS. 7A and 7B, this is merely an example for convenience of description, and the configurations according to the third exemplary embodiment of the radio signal generation method may be applied equally or similarly to two or more FAs.
- In FIGS. 7A and 7B, $b_{l,s,c}[m]$ is applied to even-numbered subcarriers for each FA and $\tilde{b}_{l,s,c}[m]$ is applied to odd-numbered subcarriers for each FA. However, this is merely an example for convenience of description, and the third exemplary embodiment of the radio signal generation method is not limited thereto. For example, $b_{l,s,c}[m]$ may be applied to odd-numbered subcarriers for each FA, and $b_{l,s,c}[m]$ may be applied to even-numbered subcarriers for each FA.
- Although the same sequences $b_{l,s,c}[m]$ and $\tilde{b}_{l,s,c}[m]$ are applied to FA1 and FA2 in FIGS. 7A and 7B, this is merely an example for convenience of description, and the third exemplary embodiment of the radio signal generation method is not limited thereto. For example, in FA2 (or FA1), a modified sequence of the sequence used in FA1 (or FA2) may be used. As an example, when $b_{l,s,c}[m]$ and $\tilde{b}_{l,s,c}[m]$ are used in FA1, $-b_{l,s,c}[m]$ and $-b_{l,s,c}[m]$, or $$b^{I}_{l,s,c}[m] - jb^{Q}_{l,s,c}[m] \text{ and } \tilde{b}^{I}_{l,s,c}[m] - j\tilde{b}^{Q}_{l,s,c}[m]$$

may be used in FA2.

Fourth Exemplary Embodiment of Radio Signal Generation Method

Figure 7C:
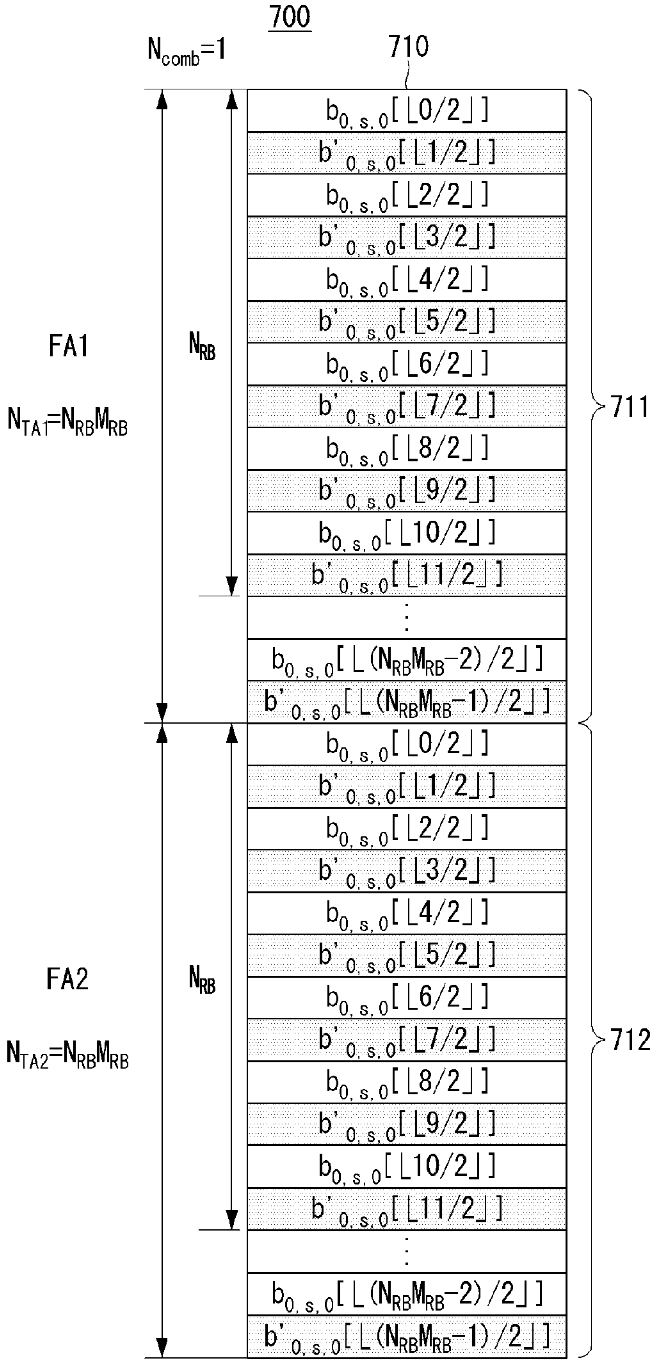
Figure 7D:
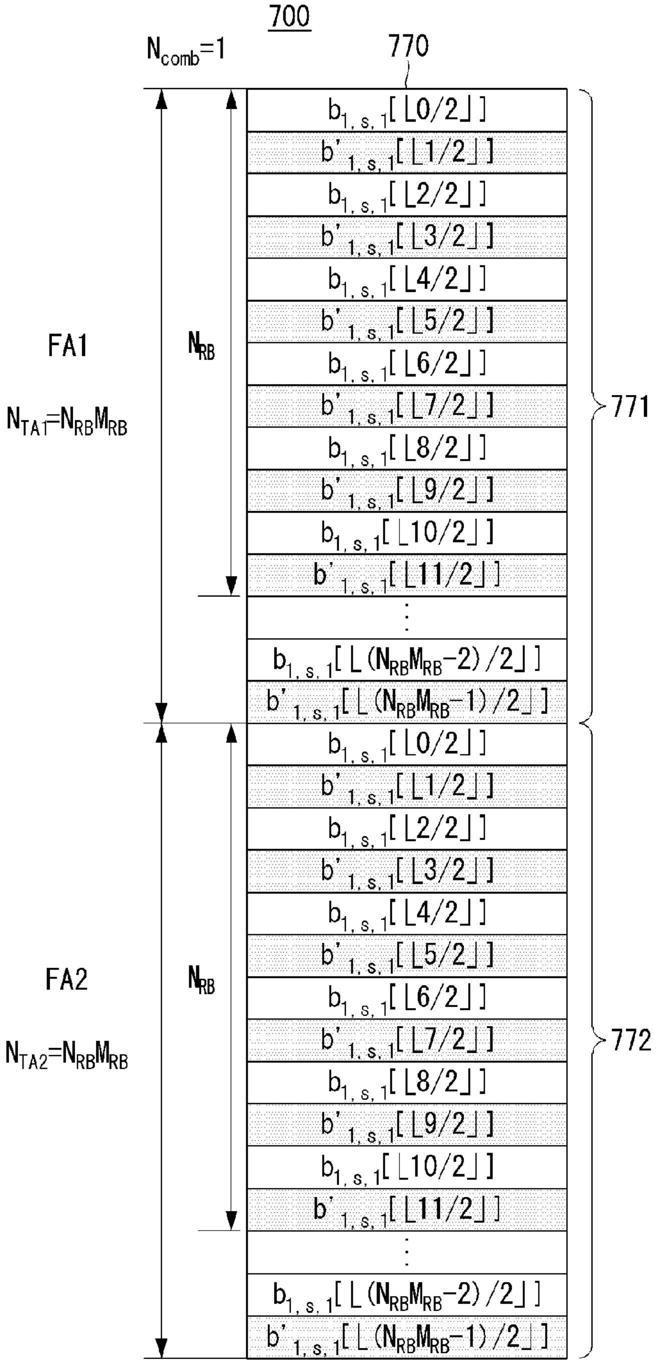

Referring to FIGS. 7C and 7D, the first radio signal may include a plurality of subcarriers in the frequency domain.

The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may each mean an OFDM symbol index, a slot index, and a BS index, respectively. Hereinafter, in describing the fourth exemplary embodiment of the radio signal generation method with reference to FIGS. 7C and 7D, contents overlapping with those described with reference to FIGS. 1 to 7B may be omitted.

Referring to FIG. 7C, according to the fourth exemplary embodiment of the radio signal generation method, in the radio signal structure 700, a transmission signal for timing estimation corresponding to the symbol #0 710 of the BS #0 may be expressed as $q_{0,s,0}$, and a transmission signal for timing estimation corresponding to the symbol #1 770 of the BS #1 may be expressed as $q_{1,s,1}$. $q_{0,s,0}$ may be mapped to first and second subcarrier groups 711 and 712, and $q_{1,s,1}$ may be mapped to third and fourth subcarrier groups 771 and 772.

A difference between the third exemplary embodiment and the fourth exemplary embodiment of the radio signal generation method may be determined by whether a guard band is arranged. Unlike the third exemplary embodiment of the radio signal generation method, in the fourth exemplary embodiment of the radio signal generation method, a guard band may not be arranged between the first and second subcarrier groups 711 and 712 and between the third and fourth subcarrier groups 771 and 772. That is, the first and second subcarrier groups 711 and 712 may be arranged adjacent to each other. Also, the third and fourth subcarrier groups 771 and 772 may be arranged adjacent to each other.

FIGS. 8A to 8D are conceptual diagrams for describing fifth and sixth exemplary embodiments of a radio signal generation method in a communication system.

Figure 8A:
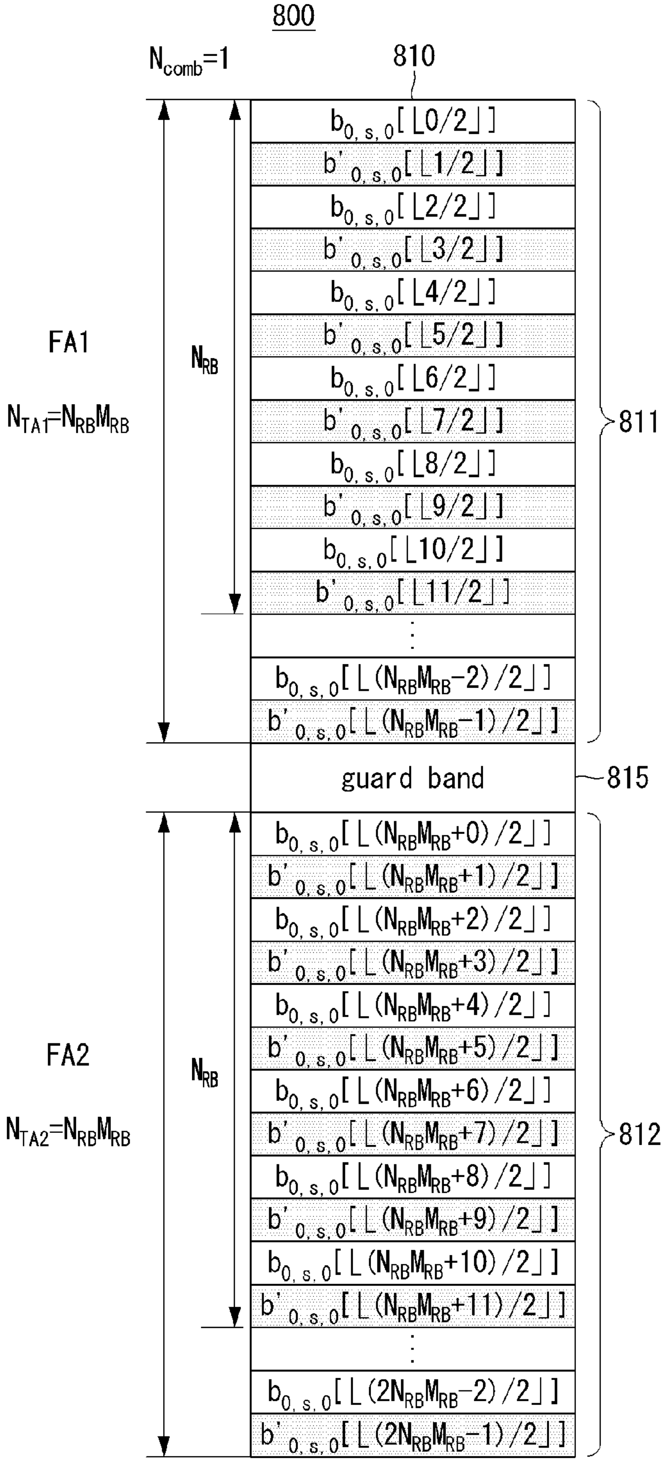
FIGS. 8A to 8D are conceptual diagrams for describing fifth and sixth exemplary embodiments of a radio signal generation method in a communication system.
Figure 8B:
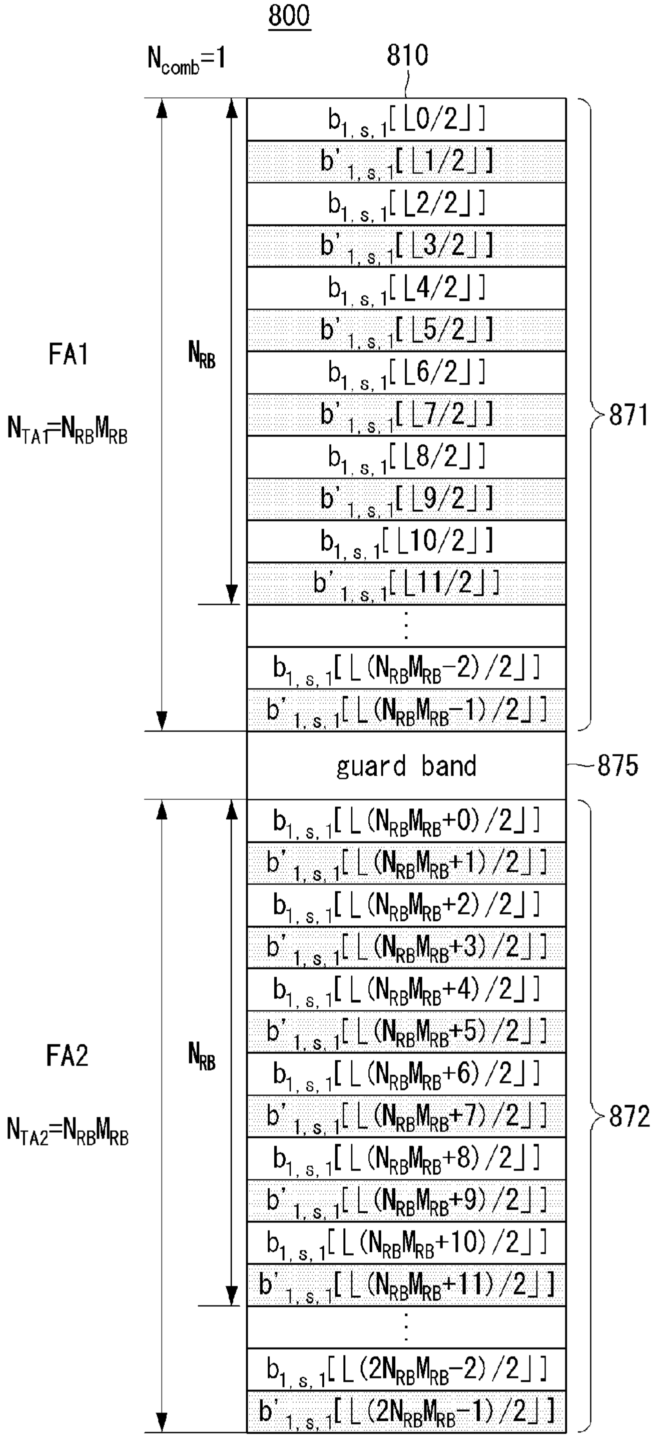

Referring to FIGS. 8A to 8D, in the fifth and sixth exemplary embodiments of the radio signal generation method in the communication system, the first radio signal may be generated based on a specific radio signal structure 800. Here, the radio signal structure 800 may be the same as or similar to the radio signal structure 500 described with reference to FIG. 5. FIGS. 8A and 8B may correspond to the fifth exemplary embodiment of the radio signal generation method, and FIGS. 8C and 8D may correspond to the sixth exemplary embodiment of the radio signal generation method. In the fifth and sixth exemplary embodiments of the radio signal generation method, $N_{comb}$ may be 1.

Fifth Exemplary Embodiment of Radio Signal Generation Method

Referring to FIGS. 8A and 8B, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may mean an OFDM symbol index, a slot index, and a BS index, respectively. Hereinafter, in describing the fifth exemplary embodiment of the radio signal generation method with reference to FIGS. 8A and 8B, contents overlapping with those described with reference to FIGS. 1 to 7D may be omitted.

Referring to FIG. 8A, according to the fifth exemplary embodiment of the radio signal generation method, in the radio signal structure 800, a transmission signal for timing estimation corresponding to a symbol #0 810 of a BS #0 may be expressed as $q_{0,s,0}$. To generate $q_{0,s,0}$, a first candidate sequence $b_{0,s,0}[k]$ may be mapped to a first subcarrier group 811 and a second subcarrier group 812. That is, the first candidate sequence $b_{0,s,0}[k]$ may be identically mapped to the first and second subcarrier groups 811 and 812. The first candidate sequence may have a different value according to an OFDM symbol, slot, BS, and/or the like. The first candidate sequence may be a binary sequence or a complex sequence, but this is merely an example for convenience of description, and the fifth exemplary embodiment of the radio signal generation method is not limited thereto.

In the fifth exemplary embodiment of the radio signal generation method, the first candidate sequence $b_{0,s,0}[k]$ may have the same number of elements as the number of available subcarriers for each FA according to $N_{comb}=1$ (i.e., the number of subcarriers for each FA $N_{TA1}=N_{TA2}=N_{RB}M_{RB}$). The transmission signal for timing estimation for each FA may be expressed as $q_{0,s,0,FA\ \#}$. In the fifth exemplary embodiment of the radio signal generation method, $q_{0,s,0}$ for each FA may be expressed as in Equation 7.

[Equation 7]

$$q_{0,s,0,FA1}[k] = \begin{cases} b_{0,s,0}[\lfloor k/2 \rfloor],\ k = 2k', & k' = 0, 1, 2, \ldots, \frac{N_{RB}M_{RB}}{2} - 1 \\ \tilde{b}_{0,s,0}[\lfloor k/2 \rfloor],\ k = 2k' + 1, & k' = 0, 1, 2, \ldots, \frac{N_{RB}M_{RB}}{2} - 1. \end{cases}$$

$$q_{0,s,0,FA2}[k] = \begin{cases} b_{0,s,0}[\lfloor k/2 \rfloor],\ k = N_{RB}M_{RB} + 2k', & k' = 0, 1, 2, \ldots, \frac{N_{RB}M_{RB}}{2} - 1 \\ \tilde{b}_{0,s,0}[\lfloor k/2 \rfloor],\ k = N_{RB}M_{RB} + 2k' + 1, & k' = 0, 1, 2, \ldots, \frac{N_{RB}M_{RB}}{2} - 1. \end{cases}$$

In Equation 7, the first candidate sequence $b_{0,s,0}[n]$ may mean an arbitrary binary or complex sequence having a length of $N_{RB}M_{RB}$, which has a different value or the same value according to an OFDM symbol, slot, and BS, and $\tilde{b}_{0,s,0}[n]$ may mean a modified sequence of $b_{0,s,0}[n]$. For example, $$\tilde{b}_{0,s,0}[n] = -b_{0,s,0}[n] \text{ and } \tilde{b}_{0,s,0}[n] = b^{I}_{0,s,0}[n] - jb^{Q}_{0,s,0}[n]$$

may be established, but are not limited thereto, and the fifth exemplary embodiment of the radio signal generation method is not limited thereto. For example, all possible modified patterns of $b_{0,s,0}[n]$ may be $\tilde{b}_{0,s,0}[n]$.

For $N_{comb}=1$, in order to avoid interference between BSs, null values may be applied to available subcarriers corresponding to a symbol #0 of a BS #1. Meanwhile, a guard band 815 may be arranged between the first subcarrier group 811 and the second subcarrier group 812.

Referring to FIG. 8B, according to the fifth exemplary embodiment of the radio signal generation method, in the radio signal structure 800, a transmission signal for timing estimation corresponding to a symbol #1 870 of the BS #1 may be expressed as $q_{1,s,1}$. To generate $q_{1,s,1}$, a second candidate sequence $b_{1,s,1}[k]$ may be mapped to a third subcarrier group 871 and a fourth subcarrier group 872. That is, the second candidate sequence $b_{1,s,1}[k]$ may be identically mapped to the third and fourth subcarrier groups 871 and 872. The second candidate sequence may have a different value according to an OFDM symbol, slot, BS, and/or the like. The second candidate sequence may be a binary sequence or a complex sequence, but this is merely an example for convenience of description, and the fifth exemplary embodiment of the radio signal generation method is not limited thereto.

In the fifth exemplary embodiment of the radio signal generation method, the second candidate sequence $b_{1,s,1}[k]$ may have the same number of elements as the number of available subcarriers for each FA according to $N_{comb}=1$ (i.e., the number of subcarriers for each FA $N_{TA1}=N_{TA2}=N_{RB}M_{RB}$). The transmission signal for timing estimation for each FA may be expressed as $q_{1,s,1,FA\,\#}$. In the fifth exemplary embodiment of the radio signal generation method, $q_{1,s,1}$ for each FA may be expressed as in Equation 8.

[Equation 8]

$$q_{1,s,1,FA1}[k] = \begin{cases} b_{1,s,1}[\lfloor k/2 \rfloor],\ k = 2k', & k' = 0, 1, 2, \ldots, \frac{N_{RB}M_{RB}}{2} - 1 \\ \tilde{b}_{1,s,1}[\lfloor k/2 \rfloor],\ k = 2k'+1, & k' = 0, 1, 2, \ldots, \frac{N_{RB}M_{RB}}{2} - 1. \end{cases}$$

$$q_{1,s,1,FA2}[k] = \begin{cases} b_{1,s,1}[\lfloor k/2 \rfloor],\ k = N_{RB}M_{RB} + 2k', & k' = 0, 1, 2, \ldots, \frac{N_{RB}M_{RB}}{2} - 1 \\ \tilde{b}_{1,s,1}[\lfloor k/2 \rfloor],\ k = N_{RB}M_{RB} + 2k'+1, & k' = 0, 1, 2, \ldots, \frac{N_{RB}M_{RB}}{2} - 1. \end{cases}$$

Even in the case of $q_{1,s,1}$, it may be generated by allocating distributed concatenation-based transmission sequences for timing estimation such as $b_{1,s,1}[n]$ and $\tilde{b}_{1,s,1}[n]$ in the same or similar manner to Equation 7. By allocating the transmission sequences for timing estimation for each BS to subsequent symbols to avoid interference between BSs in a TDMA form as described above, a receiving end may minimize interference between received signals of the transmission signal for timing estimation at BSs.

In the fifth exemplary embodiment of the radio signal generation method, one or more candidate sequences $b_{l,s,c}[.]$ may be defined as a random QPSK sequence based on Equations 3 and 4, and the like. However, this is merely an example for convenience, and the fifth exemplary embodiment of the radio signal generation method is not limited thereto.

In the fifth exemplary embodiment of the radio signal generation method, the signal for timing estimation and the candidate sequence may have at least one of the following characteristics.

- The candidate sequences $b_{l,s,c}[\bullet]$ may vary according to a symbol, slot, BS, and/or the like. However, this is merely an example for convenience of description, and the candidate sequence $b_{l,s,c}[\bullet]$ may vary according to all other possible variable combinations.
- In the candidate sequence $b_{l,s,c}[\bullet]$, c may correspond to a BS ID. However, this is merely an example for convenience of description, and c may correspond to a cell ID, a TRP ID, an ID of a sequence for timing estimation, and the like.
- $N_{RB}$ may be 12. However, this is merely an example for convenience of description, and $N_{RB}$ may have all other possible numbers as values.
- The same number $N_{RB}M_{RB}$ of available subcarriers may be applied to all FAs. However, this is merely an example for convenience of description, and the number of available subcarriers may be determined differently for each FA.
- Although a situation in which there are two FAs is shown as an example in FIGS. 8A and 8B, this is merely an example for convenience of description, and the configurations according to the fifth exemplary embodiment of the radio signal generation method may be applied equally or similarly to two or more FAs.
- In FIGS. 8A and 8B, $b_{l,s,c}[m]$ is applied to even-numbered subcarriers for each FA and $\tilde{b}_{l,s,c}[m]$ is applied to odd-numbered subcarriers for each FA. However, this is merely an example for convenience of description, and the fifth exemplary embodiment of the radio signal generation method is not limited thereto. For example, $b_{l,s,c}[m]$ may be applied to odd-numbered subcarriers for each FA, and $\tilde{b}_{l,s,c}[m]$ may be applied to even-numbered subcarriers for each FA.
- Although the same sequences $b_{l,s,c}[m]$ and $\tilde{b}_{l,s,c}[m]$ are applied to FA1 and FA2 in FIGS. 8A and 8B, this is merely an example for convenience of description, and the fifth exemplary embodiment of the radio signal generation method is not limited thereto. For example, in FA2 (or FA1), a modified sequence of the sequence used in FA1 (or FA2) may be used. As an example, when $b_{l,s,c}[m]$ and $\tilde{b}_{l,s,c}[m]$ are used in FA1, $-b_{l,s,c}[m]$ and $-\tilde{b}_{l,s,c}[m]$, or $$b^{I}_{l,s,c}[m] - jb^{Q}_{l,s,c}[m] \text{ and } \tilde{b}^{I}_{l,s,c}[m] - j\tilde{b}^{Q}_{l,s,c}[m]$$

may be used in FA 2.

Sixth Exemplary Embodiment of Radio Signal Generation Method

Figure 8C:
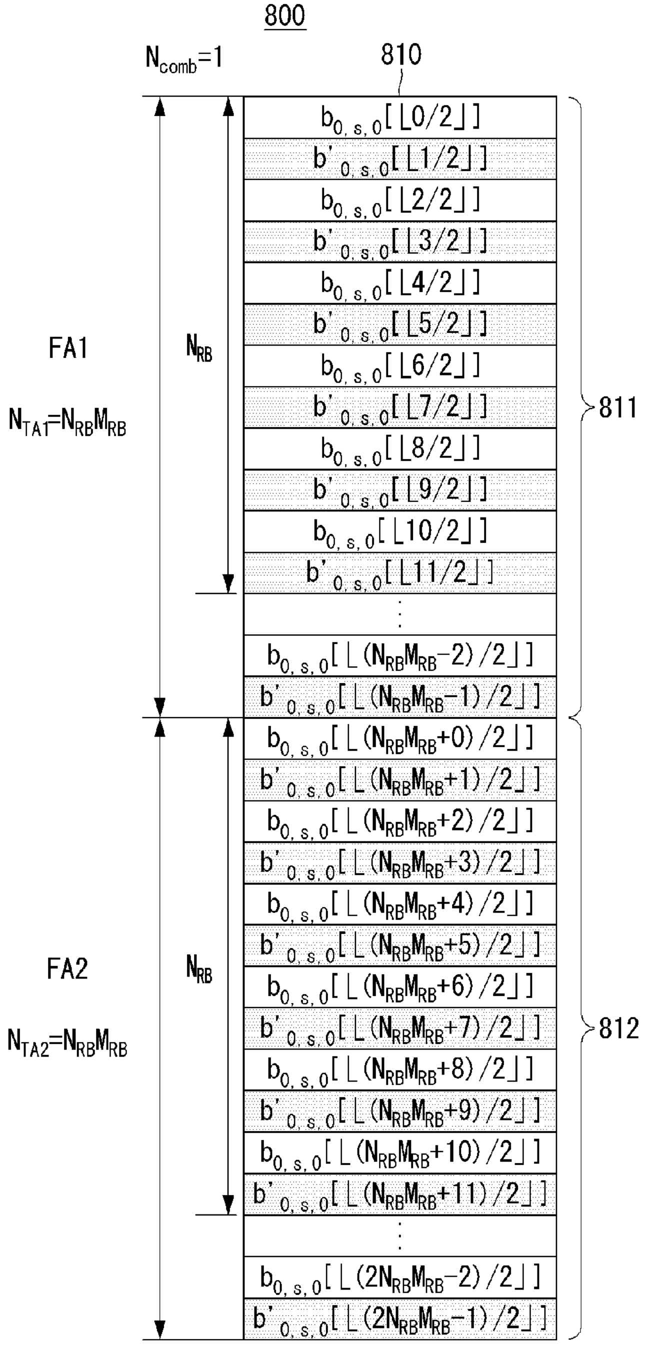
Figure 8D:
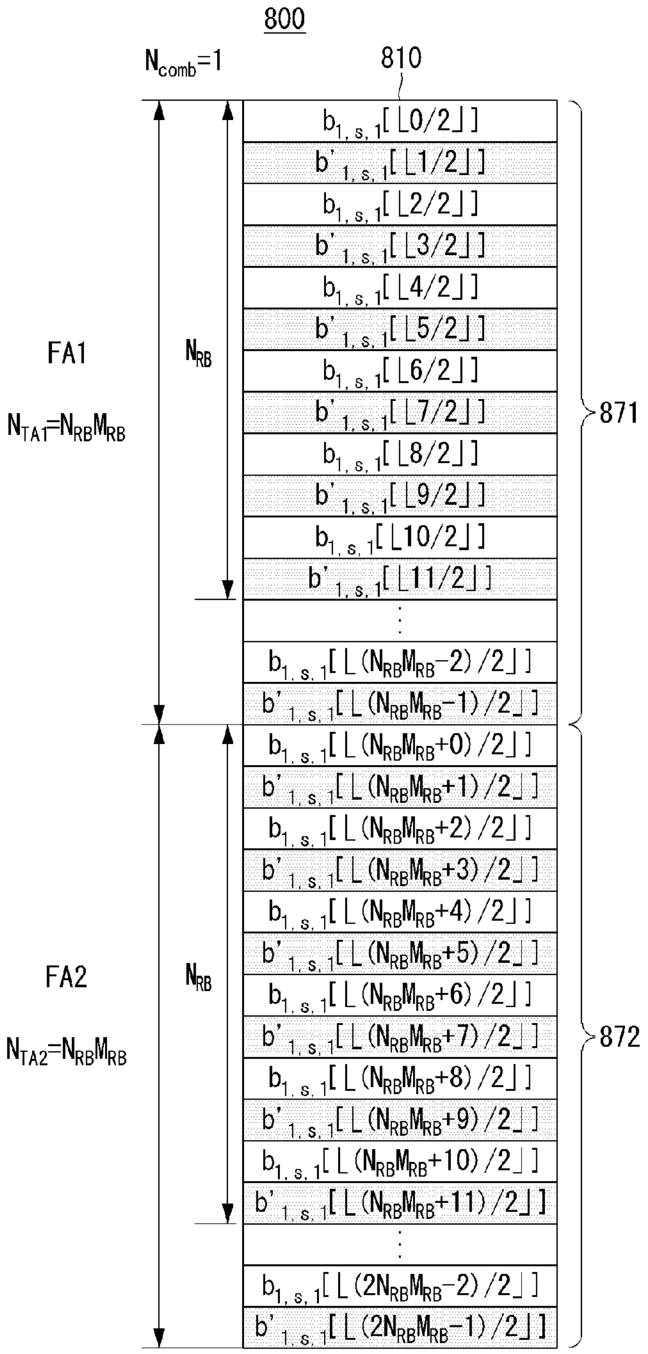

Referring to FIGS. 8C and 8D, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may each mean an OFDM symbol index, a slot index, and a BS index, respectively. Hereinafter, in describing the sixth exemplary embodiment of the radio signal generation method with reference to FIGS. 8C and 8D, contents overlapping with those described with reference to FIGS. 1 to 8B may be omitted.

Referring to FIG. 8C, according to the sixth exemplary embodiment of the radio signal generation method, in the radio signal structure 800, a transmission signal for timing estimation corresponding to the symbol #0 810 of the BS #0 may be expressed as $q_{0,s,0}$, and a transmission signal for timing estimation corresponding to the symbol #1 870 of the BS #1 may be expressed as $q_{1,s,1}$. $q_{0,s,0}$ may be mapped to first and second subcarrier groups 811 and 812, and $q_{1,s,1}$ may be mapped to third and fourth subcarrier groups 871 and 872.

A difference between the fifth exemplary embodiment and the sixth exemplary embodiment of the radio signal generation method may be determined by whether a guard band is arranged. Unlike the fifth exemplary embodiment of the radio signal generation method, in the sixth exemplary embodiment of the radio signal generation method, a guard band may not be arranged between the first and second subcarrier groups 811 and 812 and between the third and fourth subcarrier groups 871 and 872. That is, the first and second subcarrier groups 811 and 812 may be arranged adjacent to each other. Also, the third and fourth subcarrier groups 871 and 872 may be arranged adjacent to each other.

FIGS. 9A to 9D are conceptual diagrams for describing seventh and eighth exemplary embodiments of a radio signal generation method in a communication system.

Figure 9A:
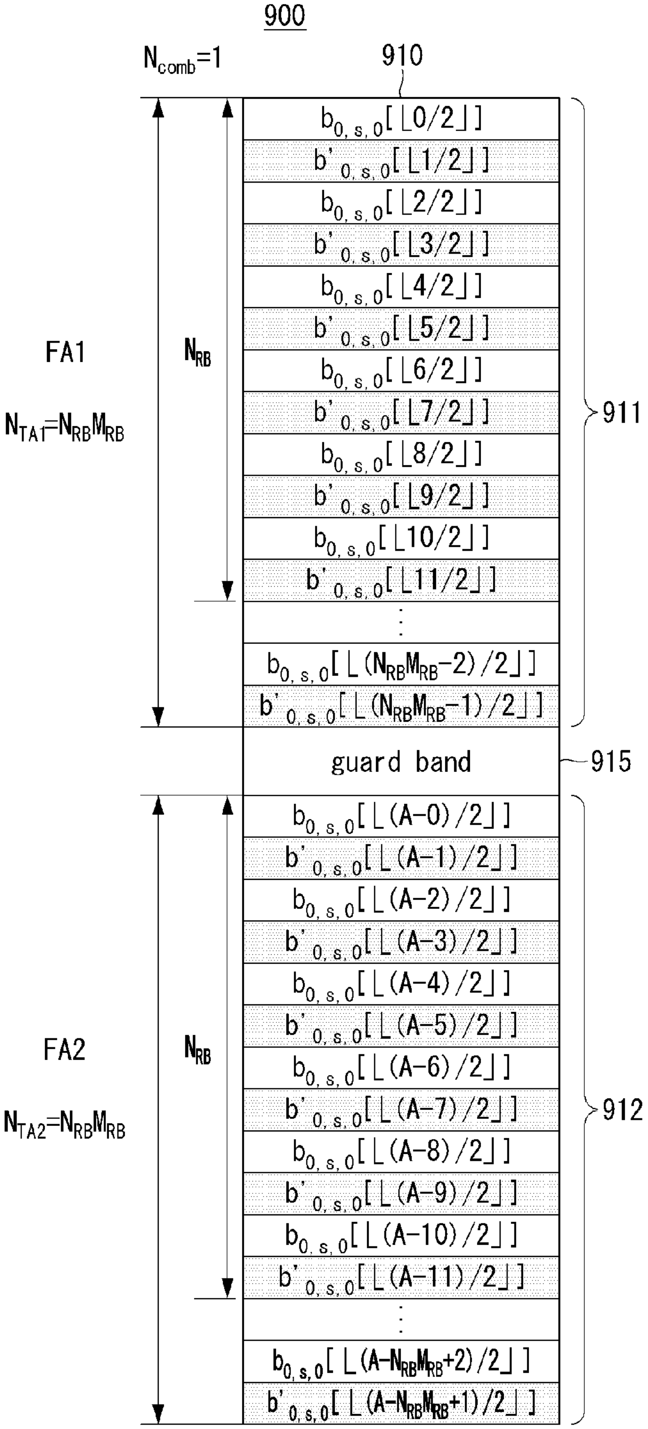
FIGS. 9A to 9D are conceptual diagrams for describing seventh and eighth exemplary embodiments of a radio signal generation method in a communication system.
Figure 9B:
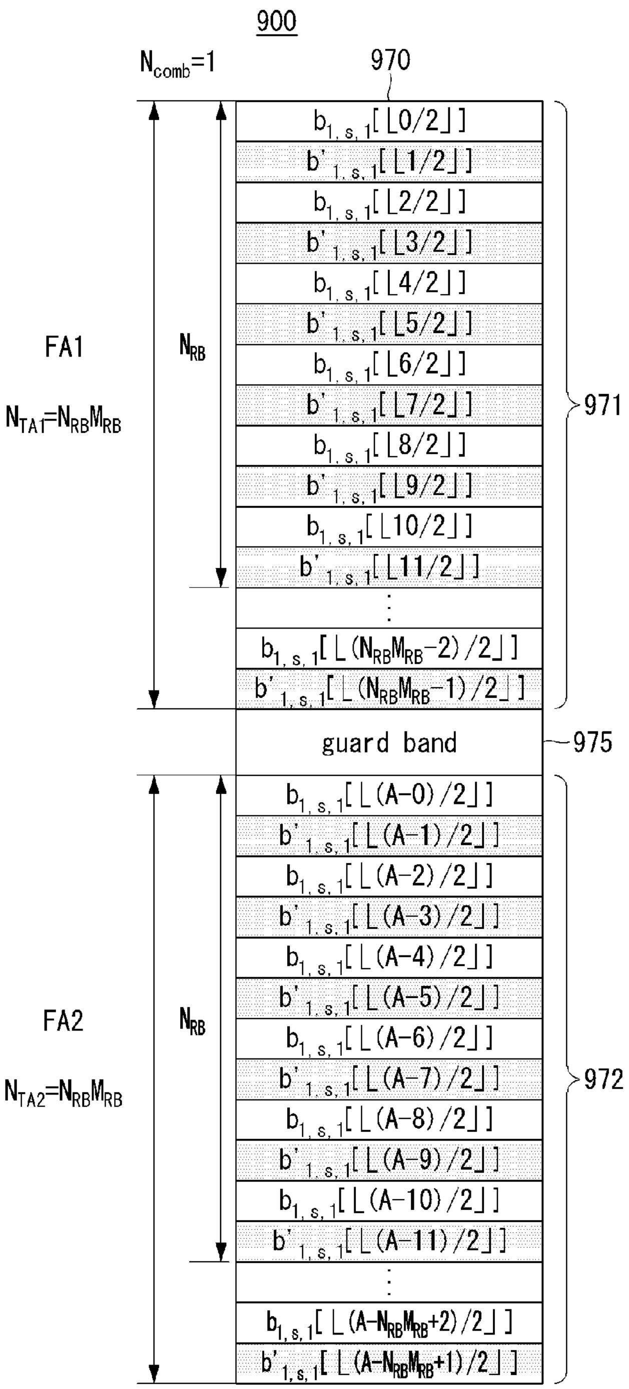

Referring to FIGS. 9A to 9D, in the seventh and eighth exemplary embodiments of the radio signal generation method in the communication system, the first radio signal may be generated based on a specific radio signal structure 900. Here, the radio signal structure 900 may be the same as or similar to the radio signal structure 500 described with reference to FIG. 5. FIGS. 9A and 9B may correspond to the seventh exemplary embodiment of the radio signal generation method, and FIGS. 9C and 9D may correspond to the eighth exemplary embodiment of the radio signal generation method. In the seventh and eighth exemplary embodiments of the radio signal generation method, $N_{comb}$ may be 1.

Seventh Exemplary Embodiment of Radio Signal Generation Method

Referring to FIGS. 9A and 9B, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may mean an OFDM symbol index, a slot index, and a BS index, respectively. Hereinafter, in describing the seventh exemplary embodiment of the radio signal generation method with reference to FIGS. 9A and 9B, contents overlapping with those described with reference to FIGS. 1 to 8D may be omitted.

Referring to FIG. 9A, according to the seventh exemplary embodiment of the radio signal generation method, in the radio signal structure 900, a transmission signal for timing estimation corresponding to a symbol #0 910 of a BS #0 may be expressed as $q_{0,s,0}$. To generate $q_{0,s,0}$, a first candidate sequence $b_{0,s,0}[k]$ may be mapped to a first subcarrier group 911 and a second subcarrier group 912. That is, the first candidate sequence $b_{0,s,0}[k]$ may be identically mapped to the first and second subcarrier groups 911 and 912. The first candidate sequence may have a different value according to an OFDM symbol, slot, BS, and/or the like. The first candidate sequence may be a binary sequence or a complex sequence, but this is merely an example for convenience of description, and the seventh exemplary embodiment of the radio signal generation method is not limited thereto.

In the seventh exemplary embodiment of the radio signal generation method, the first candidate sequence $b_{0,s,0}[k]$ may have the same number of elements as the number of available subcarriers for each FA according to $N_{comb}=1$ (i.e., the number of subcarriers for each FA $N_{TA1}=N_{TA2}=N_{RB}M_{RB}$). The transmission signal for timing estimation for each FA may be expressed as $q_{0,s,0,FA\ \#}$. In the seventh exemplary embodiment of the radio signal generation method, $q_{0,s,0}$ for each FA may be expressed as in Equation 9.

[Equation 9]

$$q_{0,s,0,FA1}[k]=\begin{cases} b_{0,s,0}[\lfloor k/2\rfloor], k=2k', & k'=0,1,2,\ldots,\frac{N_{RB}M_{RB}}{2}-1\\ \tilde{b}_{0,s,0}[\lfloor k/2\rfloor], k=2k'+1, & k'=0,1,2,\ldots,\frac{N_{RB}M_{RB}}{2}-1. \end{cases}$$

$$q_{0,s,0,FA2}[k]=\begin{cases} b_{0,s,0}[\lfloor (A-k)/2\rfloor], k=2k', & k'=0,1,2,\ldots,\frac{N_{RB}M_{RB}}{2}-1\\ \tilde{b}_{0,s,0}[\lfloor (A-k)/2\rfloor], k=2k'+1, & k'=0,1,2,\ldots,\frac{N_{RB}M_{RB}}{2}-1. \end{cases}$$

In Equation 9, $b_{0,s,0}[n]$ may mean an arbitrary binary or complex sequence having a length of $N_{RB}M_{RB}/2$, which has a different value or the same value according to an OFDM symbol, slot, and BS, and $\tilde{b}_{0,s,0}[n]$ may mean a modified sequence of $b_{0,s,0}[n]$. For example, $$\tilde{b}_{0,s,0}[n]=-b_{0,s,0}[n] \text{ and } \tilde{b}_{0,s,0}[n]=b^{I}_{0,s,0}[n]-jb^{Q}_{0,s,0}[n]$$

may be established, but are not limited thereto, and the seventh exemplary embodiment of the radio signal generation method is not limited thereto. For example, all possible modified patterns of $b_{0,s,0}[n]$ may be $\tilde{b}_{0,s,0}[n]$.

For $N_{comb}=1$, in order to avoid interference between BSs, null values may be applied to available subcarriers corresponding to a symbol #0 of a BS #1. Meanwhile, a guard band 915 may be arranged between the first subcarrier group 911 and the second subcarrier group 912.

Referring to FIG. 9B, according to the seventh exemplary embodiment of the radio signal generation method, in the radio signal structure 900, a transmission signal for timing estimation corresponding to a symbol #1 970 of a BS #1 may be expressed as $q_{1,s,1}$. To generate $q_{1,s,1}$, a second candidate sequence $b_{1,s,1}[k]$ may be mapped to a third subcarrier group 971 and a fourth subcarrier group 972. That is, the second candidate sequence $b_{1,s,1}[k]$ may be identically mapped to the third and fourth subcarrier groups 971 and 972. The second candidate sequence may have a different value according to an OFDM symbol, slot, BS, and/or the like. The second candidate sequence may be a binary sequence or a complex sequence, but this is merely an example for convenience of description, and the seventh exemplary embodiment of the radio signal generation method is not limited thereto.

In the seventh exemplary embodiment of the radio signal generation method, the second candidate sequence $b_{1,s,1}[k]$ may have the same number of elements as the number of available subcarriers for each FA according to $N_{comb}=1$ (i.e., the number of subcarriers for each FA $N_{TA1}=N_{TA2}=N_{RB}M_{RB}$). The transmission signal for timing estimation for each FA may be expressed as $q_{1,s,1,FA\ \#}$. In the seventh exemplary embodiment of the radio signal generation method, $q_{1,s,1}$ for each FA may be expressed as in Equation 10.

[Equation 10]

$$q_{1,s,1,FA1}[k] = \begin{cases} b_{1,s,1}[\lfloor k/2 \rfloor], \ k = 2k', & k' = 0, 1, 2, \ldots, \frac{N_{RB}M_{RB}}{2} - 1 \\ \tilde{b}_{1,s,1}[\lfloor k/2 \rfloor], \ k = 2k' + 1, & k' = 0, 1, 2, \ldots, \frac{N_{RB}M_{RB}}{2} - 1. \end{cases}$$

$$q_{1,s,1,FA2}[k] = \begin{cases} b_{1,s,1}[\lfloor k/2 \rfloor], \ k = N_{RB}M_{RB} + 2k', & k' = 0, 1, 2, \ldots, \frac{N_{RB}M_{RB}}{2} - 1 \\ \tilde{b}_{1,s,1}[\lfloor k/2 \rfloor], \ k = N_{RB}M_{RB} + 2k' + 1, & k' = 0, 1, 2, \ldots, \frac{N_{RB}M_{RB}}{2} - 1. \end{cases}$$

Even in the case of $q_{1,s,1}$, it may be generated by allocating distributed concatenation-based transmission sequences for timing estimation such as $b_{1,s,1}[n]$ and $\tilde{b}_{1,s,1}[n]$ in the same or similar manner to Equation 9. By allocating the transmission sequences for timing estimation for each BS to subsequent symbols to avoid interference between BSs in a TDMA form as described above, a receiving end may minimize interference between received signals of the transmission signal for timing estimation at BSs.

In the seventh exemplary embodiment of the radio signal generation method, one or more candidate sequences $b_{l,s,c}[.]$ may be defined as a random QPSK sequence based on Equations 3 and 4, and the like. However, this is merely an example for convenience, and the seventh exemplary embodiment of the radio signal generation method is not limited thereto.

In the seventh exemplary embodiment of the radio signal generation method, the signal for timing estimation and the candidate sequence may have at least one of the following characteristics.

- The candidate sequences $b_{l,s,c}[\bullet]$ may vary according to a symbol, slot, BS, and/or the like. However, this is merely an example for convenience of description, and the candidate sequence $b_{l,s,c}[\bullet]$ may vary according to all other possible variable combinations.
- In the candidate sequence $b_{l,s,c}[\bullet]$, c may correspond to a BS ID. However, this is merely an example for convenience of description, and c may correspond to a cell ID, a TRP ID, an ID of a sequence for timing estimation, and the like.
- $N_{RB}$ may be 12. However, this is merely an example for convenience of description, and $N_{RB}$ may have all other possible numbers as values.
- The same number $N_{RB}M_{RB}$ of available subcarriers may be applied to all FAs. However, this is merely an example for convenience of description, and the number of available subcarriers may be determined differently for each FA.
- Although a situation in which there are two FAs is shown as an example in FIGS. 9A and 9B, this is merely an example for convenience of description, and the configurations according to the seventh exemplary embodiment of the radio signal generation method may be applied equally or similarly to two or more FAs.
- In FIGS. 9A and 9B, $b_{l,s,c}[m]$ is applied to even-numbered subcarriers for each FA and $\tilde{b}_{l,s,c}[m]$ is applied to odd-numbered subcarriers for each FA. However, this is merely an example for convenience of description, and the seventh exemplary embodiment of the radio signal generation method is not limited thereto. For example, $b_{l,s,c}[m]$ may be applied to odd-numbered subcarriers for each FA, and $\tilde{b}_{l,s,c}[m]$ may be applied to even-numbered subcarriers for each FA.
- Although the same sequences $b_{l,s,c}[m]$ and $\tilde{b}_{l,s,c}[m]$ are applied to FA1 and FA2 in FIGS. 9A and 9B, this is merely an example for convenience of description, and the seventh exemplary embodiment of the radio signal generation method is not limited thereto. For example, in FA2 (or FA1), a modified sequence of the sequence used in FA1 (or FA2) may be used. As an example, when $b_{l,s,c}[m]$ and $\tilde{b}_{l,s,c}[m]$ are used in FA1, $-b_{l,s,c}[m]$ and $-\tilde{b}_{l,s,c}[m]$, or $$b^{I}_{l,s,c}[m] - jb^{Q}_{l,s,c}[m] \text{ and } \tilde{b}^{I}_{l,s,c}[m] - j\tilde{b}^{Q}_{l,s,c}[m]$$

may be used in FA 2.

Eighth Exemplary Embodiment of Radio Signal Generation Method

Figure 9C:
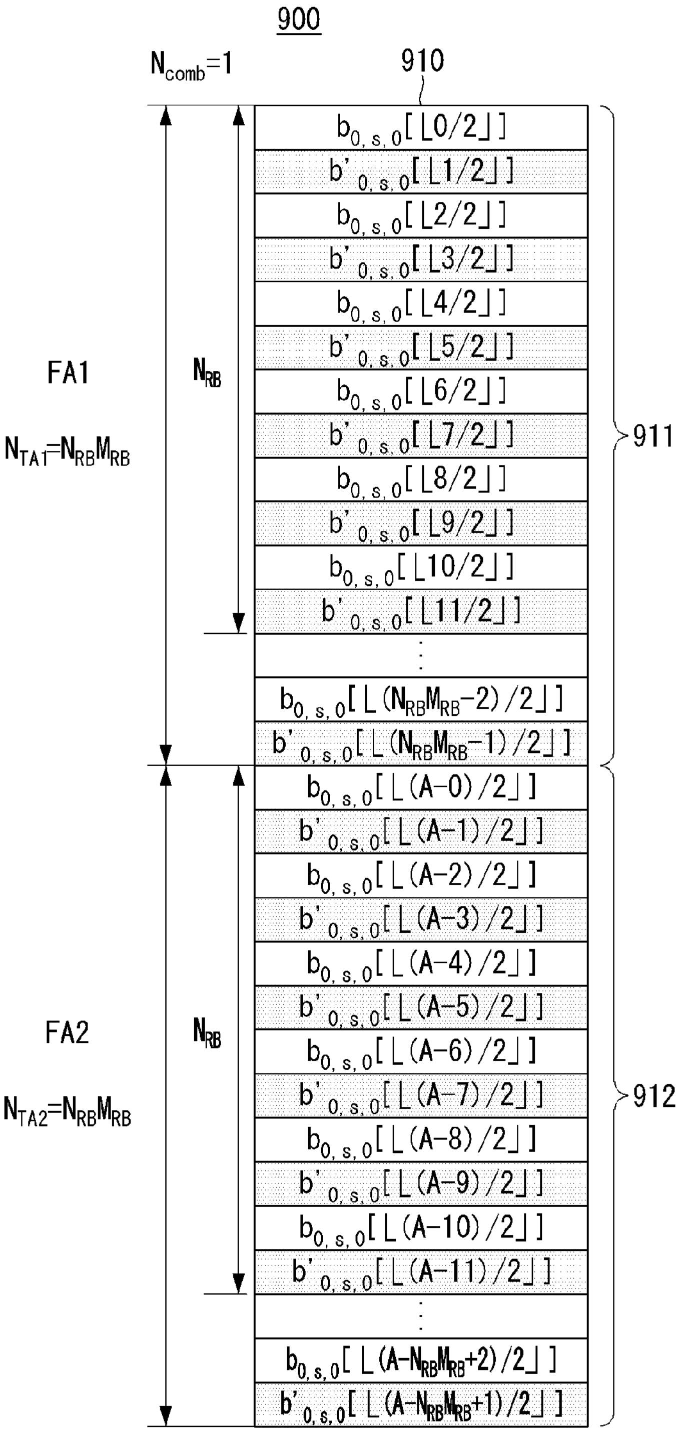
Figure 9D:
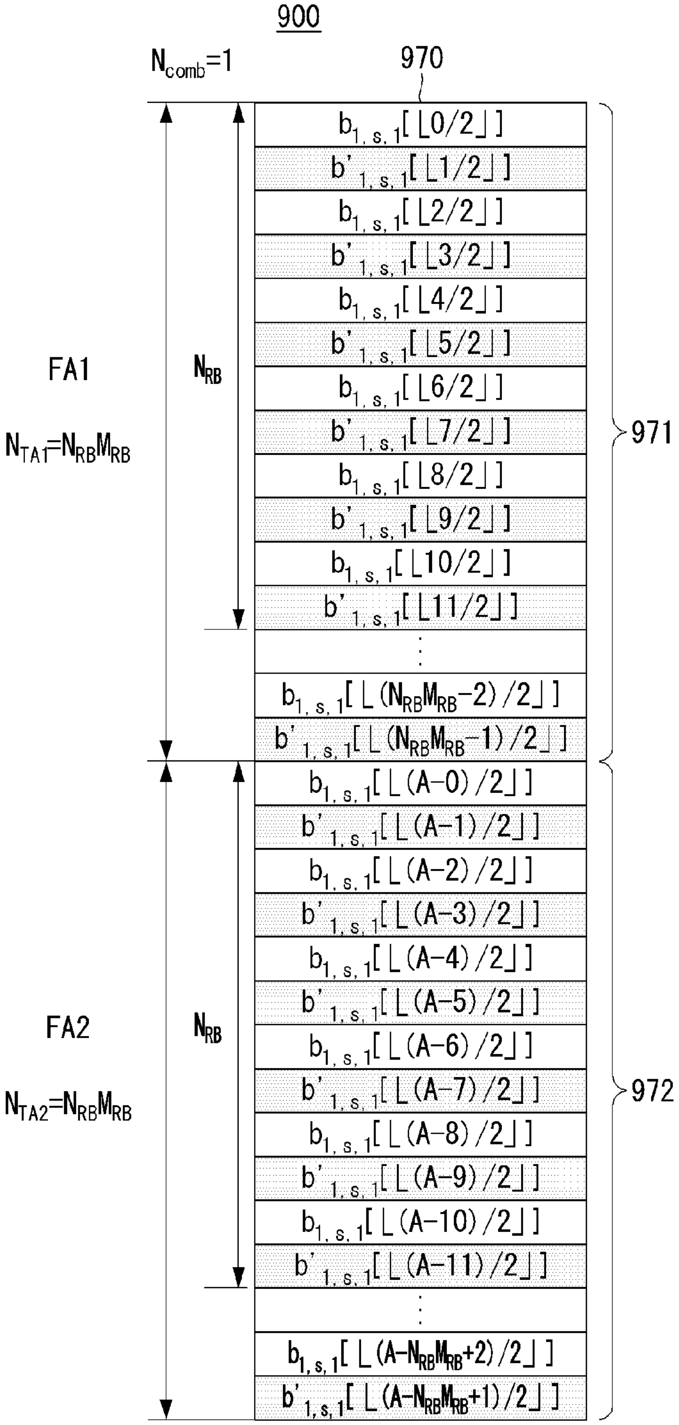

Referring to FIGS. 9C and 9D, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may each mean an OFDM symbol index, a slot index, and a BS index, respectively. Hereinafter, in describing the eighth exemplary embodiment of the radio signal generation method with reference to FIGS. 9C and 9D, contents overlapping with those described with reference to FIGS. 1 to 9B may be omitted.

Referring to FIG. 9C, according to the eighth exemplary embodiment of the radio signal generation method, in the radio signal structure 900, a transmission signal for timing estimation corresponding to a symbol #0 910 of a BS #0 may be expressed as $q_{0,s,0}$, and a transmission signal for timing estimation corresponding to a symbol #1 970 of a BS #1 may be expressed as $q_{1,s,1}$. $q_{0,s,0}$ may be mapped to first and second subcarrier groups 911 and 912, and $q_{1,s,1}$ may be mapped to third and fourth subcarrier groups 971 and 972.

A difference between the seventh exemplary embodiment and the eighth exemplary embodiment of the radio signal generation method may be determined by whether a guard band is arranged. Unlike the seventh exemplary embodiment of the radio signal generation method, in the eighth exemplary embodiment of the radio signal generation method, a guard band may not be arranged between the first and second subcarrier groups 911 and 912 and between the third and fourth subcarrier groups 971 and 972. That is, the first and second subcarrier groups 911 and 912 may be arranged adjacent to each other. Also, the third and fourth subcarrier groups 971 and 972 may be arranged adjacent to each other.

FIGS. 10A to 10D are conceptual diagrams for describing ninth and tenth exemplary embodiments of a radio signal generation method in a communication system.

Figure 10B:
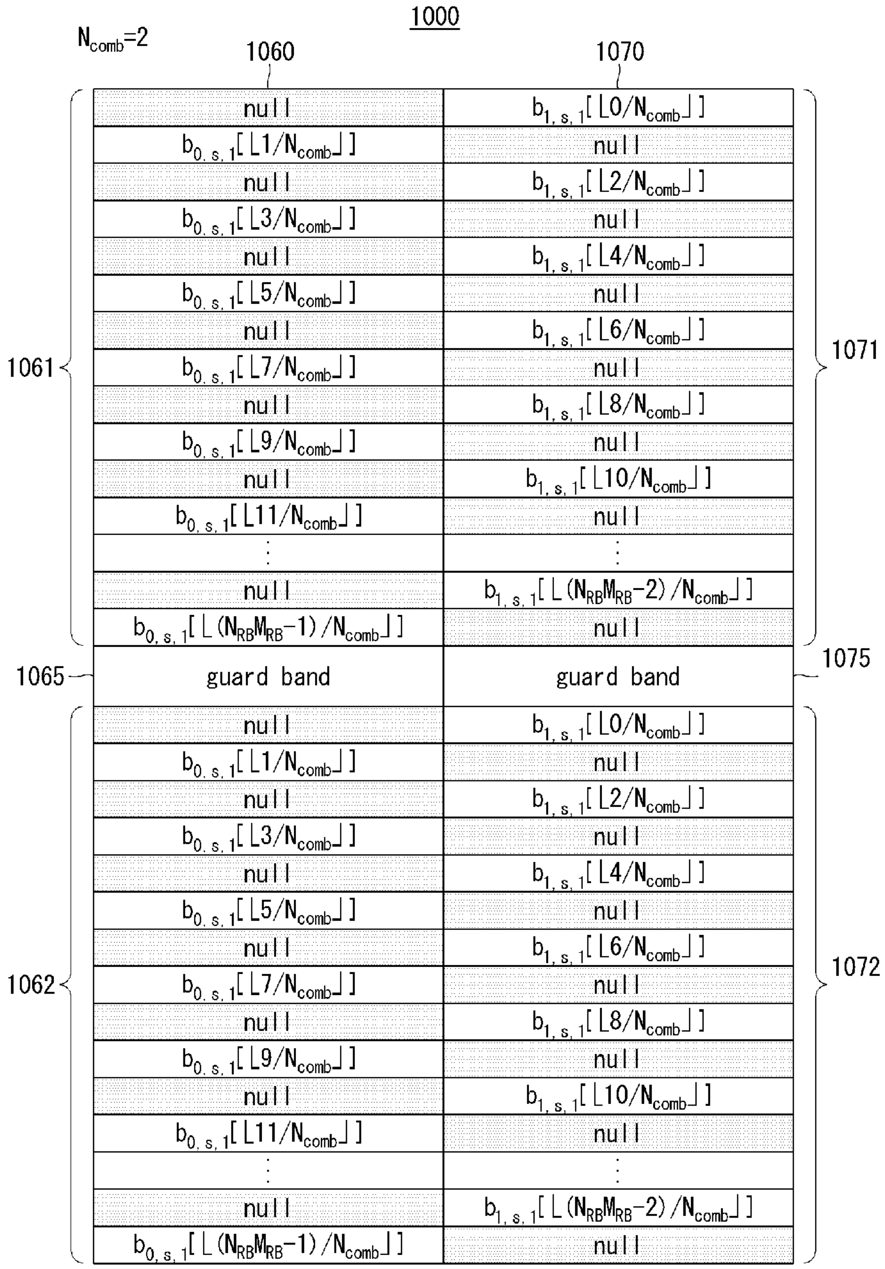

Referring to FIGS. 10A to 10D, in the ninth and tenth exemplary embodiments of the radio signal generation method in the communication system, the first radio signal may be generated based on a specific radio signal structure 1000. Here, the radio signal structure 1000 may be the same as or similar to the radio signal structure 500 described with reference to FIG. 5. FIGS. 10A and 10B may correspond to the ninth exemplary embodiment of the radio signal generation method, and FIGS. 10C and 10D may correspond to the tenth exemplary embodiment of the radio signal generation method. In the ninth and tenth exemplary embodiments of the radio signal generation method, $N_{comb}$ may be 2.

Ninth Exemplary Embodiment of Radio Signal Generation Method

Referring to FIGS. 10A and 10B, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\cdot]$, and may be generated based on one or more candidate sequences $b_{l,s,c}[\cdot]$, and/or the like. Here, l, s, and c may mean an OFDM symbol index, a slot index, and a BS index, respectively. The ninth exemplary embodiment of the radio signal generation method described in FIGS. 10A and 10B may be based on a FDMA-based interference avoidance approach. Hereinafter, in describing the ninth exemplary embodiment of the radio signal generation method with reference to FIGS. 10A and 10B, contents overlapping with those described with reference to FIGS. 1 to 9D may be omitted.

Referring to FIG. 10A, according to the ninth exemplary embodiment of the radio signal generation method, in the radio signal structure 1000, a transmission signal for timing estimation corresponding to a symbol #0 1010 of a BS #0 may be expressed as $q_{0,s,0}$. To generate $q_{0,s,0}$, a first candidate sequence $b_{0,s,0}[k]$ may be mapped to a first subcarrier group 1011 and a second subcarrier group 1012. That is, the first candidate sequence $b_{0,s,0}[k]$ may be identically mapped to the first and second subcarrier groups 1011 and 1012. The first candidate sequence may have a different value according to an OFDM symbol, slot, BS, and/or the like. The first candidate sequence may be a binary sequence or a complex sequence, but this is merely an example for convenience of description, and the ninth exemplary embodiment of the radio signal generation method is not limited thereto.

In the ninth exemplary embodiment of the radio signal generation method, $q_{0,s,0}$ may be expressed as Equation 11.

[Equation 11]

$$q_{0,s,0}[k] = \begin{cases} b_{0,s,0}\left[\lfloor k/N_{comb} \rfloor\right], \ k = 2k', & k' = 0, 1, 2, \ldots, \dfrac{N_{RB}M_{RB}}{N_{comb}} - 1 \\ 0, \ k = 2k' + 1, & k' = 0, 1, 2, \ldots, \dfrac{N_{RB}M_{RB}}{N_{comb}} - 1. \end{cases}$$

In Equation 11, $b_{0,s,0}[\cdot]$ may mean an arbitrary binary or complex sequence having a length of $N_{RB}M_{RB}/N_{comb}$, which has a different value or the same value according to an OFDM symbol, slot, and BS. Meanwhile, for interference avoidance, a transmission signal $q_{0,s,1}[\cdot]$ for timing estimation may be mapped to odd-numbered subcarriers of a symbol #0 1060 of a BS #1 as shown in Equation 12.

[Equation 12]

$$q_{0,s,1}[k] = \begin{cases} 0, \ k = 2k', & k' = 0, 1, 2, \ldots, \dfrac{N_{RB}M_{RB}}{N_{comb}} - 1 \\ b_{0,s,1}\left[\lfloor k/N_{comb} \rfloor\right], \ k = 2k' + 1, & k' = 0, 1, 2, \ldots, \dfrac{N_{RB}M_{RB}}{N_{comb}} - 1. \end{cases}$$

In Equation 12, $b_{0,s,1}[\cdot]$ may be the same sequence as $b_{0,s,0}[\cdot]$ in Equation 11. $b_{0,s,1}[\cdot]$ may have a different value or the same value depending on an OFDM symbol, slot, BS, and/or the like.

Referring to FIG. 10B, according to the ninth exemplary embodiment of the radio signal generation method, in the radio signal structure 1000, a transmission signal for timing estimation corresponding to a symbol #1 1070 of the BS #0 may be expressed as $q_{1,s,0}$. In the ninth exemplary embodiment of the radio signal generation method, $q_{1,s,0}$ may be expressed as Equation 13.

[Equation 13]

$$q_{1,s,0}[k] = \begin{cases} b_{1,s,0}\left[\lfloor k/N_{comb} \rfloor\right], \ k = 2k', & k' = 0, 1, 2, \ldots, \dfrac{N_{RB}M_{RB}}{N_{comb}} - 1 \\ 0, \ k = 2k' + 1, & k' = 0, 1, 2, \ldots, \dfrac{N_{RB}M_{RB}}{N_{comb}} - 1. \end{cases}$$

In Equation 13, $b_{1,s,0}[.]$ may mean an arbitrary binary or complex sequence having a length of $N_{RB}M_{RB}/N_{comb}$, which has a different value or the same value according to an OFDM symbol, slot, and BS. Meanwhile, for interference avoidance, a transmission signal $q_{1,s,1}[\cdot]$ for timing estimation may be mapped to odd-numbered subcarriers of the symbol #0 1060 of the BS #1 as shown in Equation 14.

[Equation 14]

$$q_{1,s,1}[k] = \begin{cases} 0, \ k = 2k', & k' = 0, 1, 2, \ldots, \dfrac{N_{RB}M_{RB}}{N_{comb}} - 1 \\ b_{1,s,1}\left[\lfloor k/N_{comb} \rfloor\right], \ k = 2k' + 1, & k' = 0, 1, 2, \ldots, \dfrac{N_{RB}M_{RB}}{N_{comb}} - 1. \end{cases}$$

As in Equations 11 to 14, by allocating a transmission sequence for timing estimation for each BS to symbols following the above-described pattern, interference between received signals of the transmission signal for timing estimation for each BS may be minimized at the receiving end.

In the ninth exemplary embodiment of the radio signal generation method, the signal for timing estimation and the candidate sequence may have at least one of the following characteristics.

- The candidate sequences $b_{l,s,c}[\bullet]$ may vary according to a symbol, slot, BS, and/or the like. However, this is merely an example for convenience of description, and the candidate sequence $b_{l,s,c}[\bullet]$ may vary according to all other possible variable combinations.
- In the candidate sequence $b_{l,s,c}[\bullet]$, c may correspond to a BS ID. However, this is merely an example for convenience of description, and c may correspond to a cell ID, a TRP ID, an ID of a sequence for timing estimation, and the like.
- $N_{RB}$ may be 12. However, this is merely an example for convenience of description, and $N_{RB}$ may have all other possible numbers as values.
- The same number $N_{RB}M_{RB}/N_{comb}$ of available subcarriers may be applied to all FAs. However, this is merely an example for convenience of description, and the number of available subcarriers may be determined differently for each FA.
- Although a situation in which there are two FAs is shown as an example in FIGS. 10A and 10B, this is merely an example for convenience of description, and the configurations according to the seventh exemplary embodiment of the radio signal generation method may be applied equally or similarly to two or more FAs.
- In FIGS. 10A and 10B, $b_{l,s,c}[m]$ is applied to even-numbered subcarriers for each FA and $\tilde{b}_{l,s,c}[m]$ is applied to odd-numbered subcarriers for each FA. However, this is merely an example for convenience of description, and the ninth exemplary embodiment of the radio signal generation method is not limited thereto. For example, $b_{l,s,c}c$ [m] may be applied to odd-numbered subcarriers for each FA, and $\tilde{b}_{l,s,c}[m]$ may be applied to even-numbered subcarriers for each FA.
- Although the same sequences $b_{l,s,c}[m]$ and $\tilde{b}_{l,s,c}[m]$ are applied to FA1 and FA2 in FIGS. 10A and 10B, this is merely an example for convenience of description, and the ninth exemplary embodiment of the radio signal generation method is not limited thereto. For example, in FA2 (or FA1), a modified sequence of the sequence used in FA1 (or FA2) may be used. As an exemplary, $$\tilde{b}_{l,s,c}[m] = -b_{l,s,c}[m],\ \tilde{b}_{l,s,c}[m] = b^{I}_{l,s,c}[m] - jb^{Q}_{l,s,c}[m],$$

$$\tilde{b}_{l,s,c}[m] = -b^{I}_{l,s,c}[m] + jb^{Q}_{l,s,c}[m],$$

$$\tilde{b}_{l,s,c}[m] = b^{Q}_{l,s,c}[m] + jb^{I}_{l,s,c}[m],\ \tilde{b}_{l,s,c}[m] = -b^{Q}_{l,s,c}[m] - jb^{I}_{l,s,c}[m],$$

$$\tilde{b}_{l,s,c}[m] = b^{Q}_{l,s,c}[m] - jb^{I}_{l,s,c}[m],\ \tilde{b}_{l,s,c}[m] = -b^{Q}_{l,s,c}[m] + jb^{I}_{l,s,c}[m],$$

and/or the like may be used. Here, $$b^{I}_{l,s,c}[m]$$

and $$b^{Q}_{l,s,c}[m]$$

may mean a real part and an imaginary part of $$b_{l,s,c}[m],$$

respectively.

Tenth Exemplary Embodiment of Radio Signal Generation Method

Referring to FIGS. 10C and 10D, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may mean an OFDM symbol index, a slot index, and a BS index, respectively. The tenth exemplary embodiment of the radio signal generation method described in FIGS. 10C and 10D may be based on a FDMA-based interference avoidance approach. Hereinafter, in describing the tenth exemplary embodiment of the radio signal generation method with reference to FIGS. 10C and 10D, contents overlapping with those described with reference to FIGS. 1 to 10B may be omitted.

Referring to FIG. 10C, according to the tenth exemplary embodiment of the radio signal generation method, in the radio signal structure 1000, a transmission signal for timing estimation corresponding to the symbol #0 1010 of the BS #0 may be expressed as $q_{0,s,0}$, and a transmission signal for timing estimation corresponding to the symbol #1 1070 of the BS #1 may be expressed as $q_{1,s,1}$. $q_{0,s,0}$ may be mapped to first and second subcarrier groups 1011 and 1012, and $q_{1,s,1}$ may be mapped to third and fourth subcarrier groups 1071 and 1072.

A difference between the ninth exemplary embodiment and the tenth exemplary embodiment of the radio signal generation method may be determined by whether a guard band is arranged. Unlike the ninth exemplary embodiment of the radio signal generation method, in the tenth exemplary embodiment of the radio signal generation method, a guard band may not be arranged between the first and second subcarrier groups 1011 and 1012 and between the third and fourth subcarrier groups 1071 and 1072. That is, the first and second subcarrier groups 1011 and 1012 may be arranged adjacent to each other. Also, the third and fourth subcarrier groups 1071 and 1072 may be arranged adjacent to each other.

FIGS. 11A to 11D are conceptual diagrams for describing eleventh and twelfth exemplary embodiments of a radio signal generation method in a communication system.

Figure 11B:
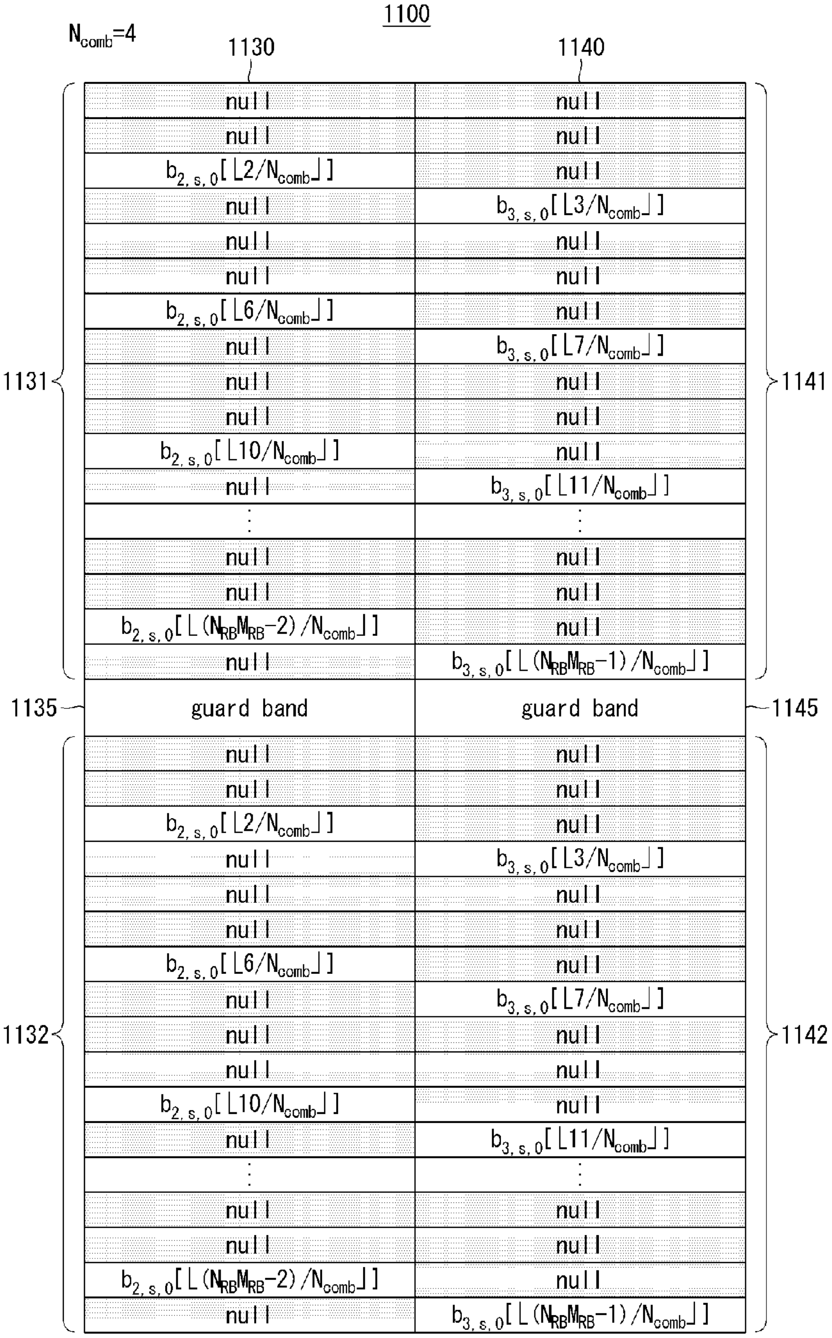

Referring to FIGS. 11A to 11D, in the eleventh and twelfth exemplary embodiments of the radio signal generation method in the communication system, the first radio signal may be generated based on a specific radio signal structure 1100. Here, the radio signal structure 1100 may be the same as or similar to the radio signal structure 500 described with reference to FIG. 5. FIGS. 11A and 11B may correspond to the eleventh exemplary embodiment of the radio signal generation method, and FIGS. 11C and 11D may correspond to the twelfth exemplary embodiment of the radio signal generation method. In the eleventh and twelfth exemplary embodiments of the radio signal generation method, $N_{comb}$ may be 4.

Eleventh Exemplary Embodiment of Radio Signal Generation Method

Referring to FIGS. 11A and 11B, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may mean an OFDM symbol index, a slot index, and a BS index, respectively. The eleventh exemplary embodiment of the radio signal generation method described in FIGS. 11A and 11B may be based on a FDMA-based interference avoidance approach. Hereinafter, in describing the eleventh exemplary embodiment of the radio signal generation method with reference to FIGS. 11A and 11B, contents overlapping with those described with reference to FIGS. 1 to 10D may be omitted.

Referring to FIG. 11A, according to the eleventh exemplary embodiment of the radio signal generation method, in the radio signal structure 1100, a transmission signal for timing estimation corresponding to a symbol #0 1010 of a BS #0 may be expressed as $q_{0,s,0}$. To generate $q_{0,s,0}$, a first candidate sequence $b_{0,s,0}[k]$ may be mapped to a first subcarrier group 1111 and a second subcarrier group 1112. That is, the first candidate sequence $b_{0,s,0}[k]$ may be identically mapped to the first and second subcarrier groups 1111 and 1112. The first candidate sequence may have a different value according to an OFDM symbol, slot, BS, and/or the like. The first candidate sequence may be a binary sequence or a complex sequence, but this is merely an example for convenience of description, and the eleventh exemplary embodiment of the radio signal generation method is not limited thereto.

In the eleventh exemplary embodiment of the radio signal generation method, $q_{0,s,0}$ may be expressed as Equation 15.

$$q_{0,s,0}[k]=\begin{cases} b_{0,s,0}[\lfloor k/N_{comb}\rfloor],\ k=4k', & k'=0,1,2,\ldots,\frac{N_{RB}M_{RB}}{N_{comb}}-1\\ 0,\ k=4k'+1, & k'=0,1,2,\ldots,\frac{N_{RB}M_{RB}}{N_{comb}}-1\\ 0,\ k=4k'+2, & k'=0,1,2,\ldots,\frac{N_{RB}M_{RB}}{N_{comb}}-1\\ 0,\ k=4k'+3, & k'=0,1,2,\ldots,\frac{N_{RB}M_{RB}}{N_{comb}}-1 \end{cases} \quad \text{[Equation 15]}$$

In Equation 15, $b_{0,s,0}[\bullet]$ may mean an arbitrary binary or complex sequence having a length of $N_{RB}M_{RB}/N_{comb}$, which has a different value or the same value according to an OFDM symbol, slot, and BS. Meanwhile, for interference avoidance, a transmission signal $q_{0,s,1}[\bullet]$ for timing estimation may be mapped to odd-numbered subcarriers of a symbol #0 1160 of a BS #1 as shown in Equation 16.

$$q_{0,s,1}[k]=\begin{cases} 0,\ k=4k', & k'=0,1,2,\ldots,\frac{N_{RB}M_{RB}}{N_{comb}}-1\\ b_{0,s,1}[\lfloor k/N_{comb}\rfloor],\ k=4k'+1, & k'=0,1,2,\ldots,\frac{N_{RB}M_{RB}}{N_{comb}}-1\\ 0,\ k=4k'+2, & k'=0,1,2,\ldots,\frac{N_{RB}M_{RB}}{N_{comb}}-1\\ 0,\ k=4k'+3, & k'=0,1,2,\ldots,\frac{N_{RB}M_{RB}}{N_{comb}}-1. \end{cases} \quad \text{[Equation 16]}$$

Meanwhile, for interference avoidance, a transmission signal $q_{0,s,2}[\bullet]$ for timing estimation may be mapped to odd-numbered subcarriers of a symbol #0 of a BS #2 as shown in Equation 17.

$$q_{0,s,2}[k]=\begin{cases} 0,\ k=4k', & k'=0,1,2,\ldots,\frac{N_{RB}M_{RB}}{N_{comb}}-1\\ 0,\ k=4k'+1, & k'=0,1,2,\ldots,\frac{N_{RB}M_{RB}}{N_{comb}}-1\\ b_{0,s,2}[\lfloor k/N_{comb}\rfloor],\ k=4k'+2, & k'=0,1,2,\ldots,\frac{N_{RB}M_{RB}}{N_{comb}}-1\\ 0,\ k=4k'+3, & k'=0,1,2,\ldots,\frac{N_{RB}M_{RB}}{N_{comb}}-1. \end{cases} \quad \text{[Equation 17]}$$

Meanwhile, for interference avoidance, a transmission signal $q_{0,s,3}[\bullet]$ for timing estimation may be mapped to odd-numbered subcarriers of a symbol #0 of a BS #3 as shown in Equation 18.

[Equation 18]

$$q_{0,s,3}[k] = \begin{cases} 0, k = 4k', & k' = 0, 1, 2, \ldots, \dfrac{N_{RB}M_{RB}}{N_{comb}} - 1 \\ 0, k = 4k' + 1, & k' = 0, 1, 2, \ldots, \dfrac{N_{RB}M_{RB}}{N_{comb}} - 1 \\ 0, k = 4k' + 2, & k' = 0, 1, 2, \ldots, \dfrac{N_{RB}M_{RB}}{N_{comb}} - 1 \\ b_{0,s,3}\left[\lfloor k/N_{comb} \rfloor\right], k = 4k' + 3, & k' = 0, 1, 2, \ldots, \dfrac{N_{RB}M_{RB}}{N_{comb}} - 1. \end{cases}$$

In the exemplary embodiments of the transmission signal configuration for timing estimation based on a Comb-2 according to the ninth exemplary embodiment of the radio signal generation method and the transmission signal configuration for timing estimation based on a Comb-4 according to the eleventh embodiment of the radio signal generation method, the same transmission signal $b_{l,s,c}[\bullet]$ for timing estimation may be configured for each FA. However, negating (polarity inversion), conjugating (imaginary part polarity inversion), or a combination thereof may be applied for each FA to be robust against hardware impairment such as phase noises. However, a reason why the same transmission signal for timing estimation is configured for each FA as in the ninth and eleventh exemplary embodiments of the radio signal generation method is that when a guard band is employed, the receiving end can achieve the same effect without applying polarity inversion, imaginary part polarity inversion, or a combination thereof to the transmission signal configuration.

In the eleventh exemplary embodiment of the radio signal generation method, the signal for timing estimation and the candidate sequence may have at least one of the following characteristics.

- The candidate sequences $b_{l,s,c}[\bullet]$ may vary according to a symbol, slot, BS, and/or the like. However, this is merely an example for convenience of description, and the candidate sequence $b_{l,s,c}[\bullet]$ may vary according to all other possible variable combinations.
- In the candidate sequence $b_{l,s,c}[\bullet]$, c may correspond to a BS ID. However, this is merely an example for convenience of description, and c may correspond to a cell ID, a TRP ID, an ID of a sequence for timing estimation, and the like.
- $N_{RB}$ may be 12. However, this is merely an example for convenience of description, and $N_{RB}$ may have all other possible numbers as values.
- The same number $N_{RB}M_{RB}/N_{comb}$ of available subcarriers may be applied to all FAs. However, this is merely an example for convenience of description, and the number of available subcarriers may be determined differently for each FA.
- Although a situation in which there are two FAs is shown as an example in FIGS. 11A and 11B, this is merely an example for convenience of description, and the configurations according to the eleventh exemplary embodiment of the radio signal generation method may be applied equally or similarly to two or more FAs.
- In FIGS. 11A and 11B, $b_{l,s,c}[m]$ is applied to even-numbered subcarriers for each FA and $\tilde{b}_{l,s,c}[m]$ is applied to odd-numbered subcarriers for each FA. However, this is merely an example for convenience of description, and the eleventh exemplary embodiment of the radio signal generation method is not limited thereto. For example, $b_{l,s,c}$c [m] may be applied to odd-numbered subcarriers for each FA, and $\tilde{b}_{l,s,c}[m]$ may be applied to even-numbered subcarriers for each FA.
- Although the same sequences $b_{l,s,c}[m]$ and $\tilde{b}_{l,s,c}[m]$ are applied to FA1 and FA2 in FIGS. 11A and 12B, this is merely an example for convenience of description, and the eleventh exemplary embodiment of the radio signal generation method is not limited thereto. For example, in FA2 (or FA1), a modified sequence of the sequence used in FA1 (or FA2) may be used. As an exemplary, $$\tilde{b}_{l,s,c}[m] = -b_{l,s,c}[m],\ \tilde{b}_{l,s,c}[m] = b^{I}_{l,s,c}[m] - jb^{Q}_{l,s,c}[m],$$

$$\tilde{b}_{l,s,c}[m] = -b^{I}_{l,s,c}[m] + jb^{Q}_{l,s,c}[m],$$

$$\tilde{b}_{l,s,c}[m] = b^{Q}_{l,s,c}[m] + jb^{I}_{l,s,c}[m],\ \tilde{b}_{l,s,c}[m] = -b^{Q}_{l,s,c}[m] - jb^{I}_{l,s,c}[m],$$

$$\tilde{b}_{l,s,c}[m] = b^{Q}_{l,s,c}[m] - jb^{I}_{l,s,c}[m],\ \tilde{b}_{l,s,c}[m] = -b^{Q}_{l,s,c}[m] + jb^{I}_{l,s,c}[m],$$

and/or the like may be used. Here, $$\tilde{b}^{I}_{l,s,c}[m] \text{ and } b^{Q}_{l,s,c}[m]$$

may mean a real part and an imaginary part of $b_{l,s,c}[m]$, respectively.

Twelfth Exemplary Embodiment of Radio Signal Generation Method

Referring to FIGS. 11C and 11D, the first radio signal may include a plurality of subcarriers in the frequency domain. The first radio signal may be generated and transmitted for timing estimation. The first radio signal may be configured for each target node (e.g., each BS), each symbol, or each FA. The first radio signal (i.e., transmission signal for timing estimation) may be expressed in a manner such as $q_{l,s,c}[\bullet]$, and may be generated based on one or more candidate sequences $b_{l,s,c}[\bullet]$, and/or the like. Here, l, s, and c may mean an OFDM symbol index, a slot index, and a BS index, respectively. The twelfth exemplary embodiment of the radio signal generation method described in FIGS. 11C and 11D may be based on a FDMA-based interference avoidance approach. Hereinafter, in describing the twelfth exemplary embodiment of the radio signal generation method with reference to FIGS. 11C and 11D, contents overlapping with those described with reference to FIGS. 1 to 11B may be omitted.

Referring to FIG. 11C, according to the twelfth exemplary embodiment of the radio signal generation method, in the radio signal structure 1100, a transmission signal for timing estimation corresponding to the symbol #0 1110 of the BS #0 may be expressed as $q_{0,s,0}$, and a transmission signal for timing estimation corresponding to the symbol #1 1170 of the BS #1 may be expressed as $q_{1,s,1}$. $q_{0,s,0}$ may be mapped to first and second subcarrier groups 1111 and 1112, and $q_{1,s,1}$ may be mapped to third and fourth subcarrier groups 1171 and 1172.

A difference between the eleventh exemplary embodiment and the twelfth exemplary embodiment of the radio signal generation method may be determined by whether a guard band is arranged. Unlike the eleventh exemplary embodiment of the radio signal generation method, in the twelfth exemplary embodiment of the radio signal generation method, a guard band may not be arranged between the first and second subcarrier groups 1111 and 1112 and between the third and fourth subcarrier groups 1171 and 1172. That is, the first and second subcarrier groups 1111 and 1112 may be arranged adjacent to each other. Also, the third and fourth subcarrier groups 1171 and 1172 may be arranged adjacent to each other.

Figure 12:
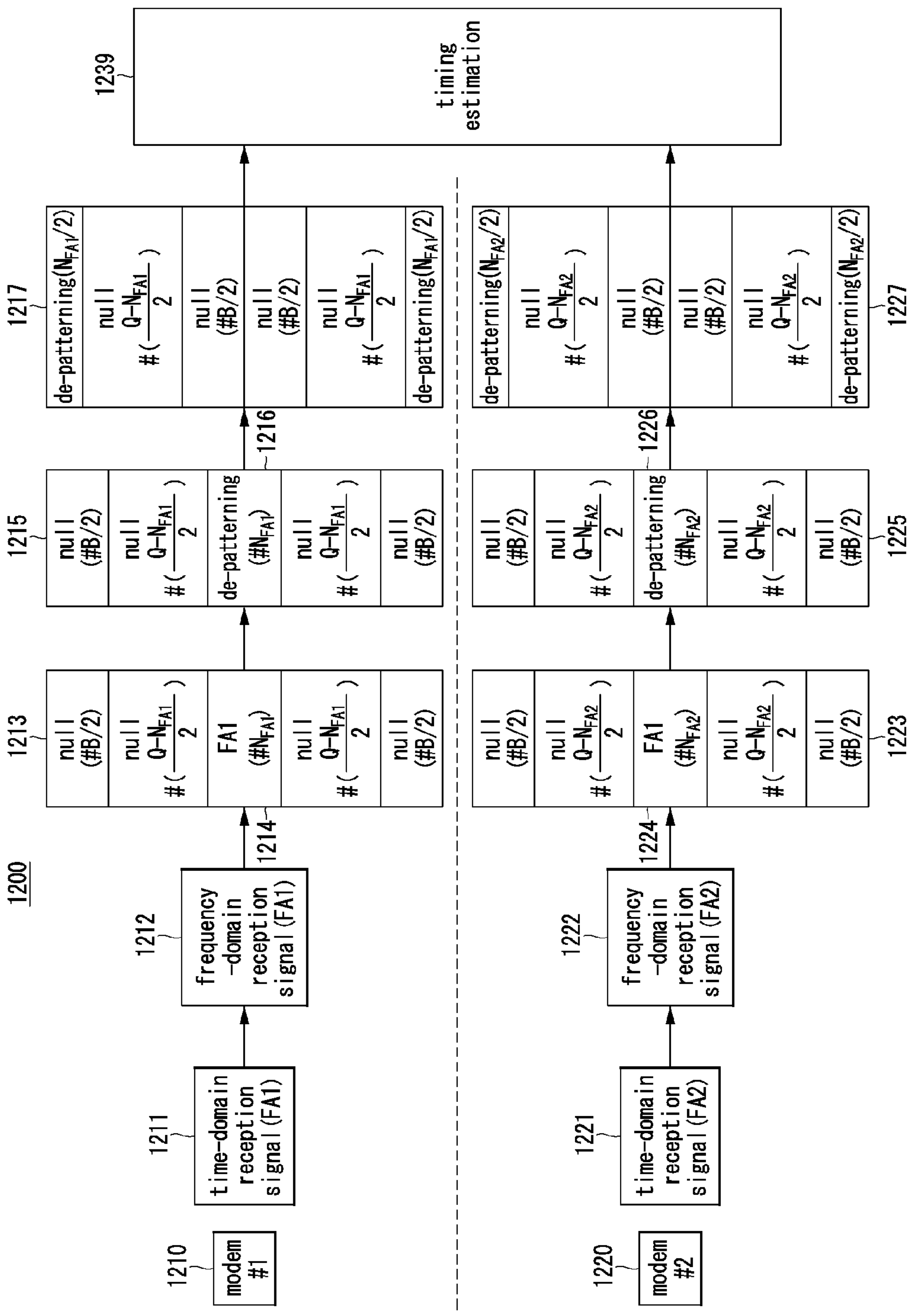
FIG. 12 is a conceptual diagram for describing a first exemplary embodiment of a radio signal reception method in a communication system.

FIG. 12 is a conceptual diagram for describing a first exemplary embodiment of a radio signal reception method in a communication system.

Referring to FIG. 12, in the first exemplary embodiment of the radio signal reception method in the communication system, a first communication node may receive a first reception signal. The first communication node may perform an operation such as timing estimation based on the first radio signal included in the received first reception signal. Hereinafter, in describing the first exemplary embodiment of the radio signal reception method with reference to FIG. 12, content overlapping with those described with reference to FIGS. 1 to 11D may be omitted.

First Exemplary Embodiment of Radio Signal Reception Method

A first reception block 1200 of the first communication node may include one or more modems (i.e. modulator and demodulator) 1210 and 1220. The first communication node may receive the first radio signal using the one or more modems 1210 and 1220. The first reception signal may include the first radio signal. Here, the first radio signal may be the same as or similar to at least one of the first radio signals described with reference to FIGS. 1 to 11D. For example, the first radio signal may correspond to a radio signal generated and transmitted according to the first to eighth exemplary embodiments of the radio signal generation method. That is, the first radio signal included in the first reception signal may be a signal transmitted based on a comb-1. The first radio signal may correspond to the symbol #0 of the BS #0.

The first reception signal and the first radio signal may be mapped to one or more FAs. For example, the first communication node may receive and demodulate the first reception signal mapped to FA1 and FA2 using the modem #1 1210 and the modem #2 1220. The modem #1 1210 may demodulate components corresponding to FA1 in the first reception signal. The modem #2 1220 may demodulate components corresponding to FA2 in the first reception signal. Based on components corresponding to the first radio signal except for a cyclic prefix (CP) in the first reception signal, the first communication node may perform timing estimation and the like.

A time-domain reception signal 1211 corresponding to FA1 and a time-domain reception signal 1221 corresponding to FA2 may each have Q samples. Q may be a natural number. Frequency-domain reception signals 1212 and 1222 each having Q samples may be generated through a Q-point fast Fourier transform (FFT) operation on the time-domain reception signals 1211 and 1221.

As a subcarrier de-indexing operation and a zero-padding operation are performed on each of the frequency-domain reception signals 1212 and 1222, a sample structure #1-1 1213 and a sample structure #1-2 1223 may be obtained. The sample structure #1-1 1213 and sample structure #1-2 1223 may each include as many samples as a first set number. Here, the first set number may be equal to or close to the number BQ of input samples of a BQ-point inverse fast Fourier transform (IFFT) operation.

In the sample structure #1-1 1213, $N_{FA1}$ samples 1214 to which the components corresponding to FA1 in the first radio signal are allocated may be extracted and placed in the middle portion (or the same or similar portion as the middle portion). In the sample structure #1-2 1223, $N_{FA2}$ samples 1224 to which the components corresponding to FA2 in the first radio signal are allocated may be extracted and placed in the middle portion (or the same or similar portion as the middle portion). This may correspond to the subcarrier de-indexing operation.

In the sample structure #1-1 1213, null values may be applied to the remaining subcarriers (i.e., an upper subcarrier group and a lower subcarrier group) excluding the samples corresponding to the $N_{FA1}$ samples 1214 to which the components corresponding to FA1 in the first radio signal are allocated. In the sample structure #1-2 1223, null values may be applied to the remaining subcarriers (i.e., an upper subcarrier group and a lower subcarrier group) excluding the samples corresponding to the $N_{FA2}$ samples 1224 to which the components corresponding to FA2 in the first radio signal are allocated. This may correspond to the zero-padding operation.

Thereafter, the first communication node may generate a sample structure #2-1 1215 and a sample structure #2-2 1225 through a de-patterning operation. Specifically, the first communication node may generate a de-patterned sample $Y_{FA1}[k]$ 1216 and a de-patterned sample $Y_{FA2}[k]$ 1226 as shown in Equation 19, with respect to received subcarriers corresponding $q_{0,s,0}$ which is defined for each FA based on Equation 1, Equation 5, Equation 7, Equation 9, and the like in the sample structure #1-1 1213 and the sample structure #1-2 1223.

$$Y_{FA1}[k] = q^*_{0,s,0,FA1}[k]R_{0,s,0,FA1}[k] \qquad \text{[Equation 19]}$$

$$Y_{FA2}[k] = q^*_{0,s,0,FA2}[k]R_{0,s,0,FA2}[k]$$

In Equation 19, each of $R_{0,s,0,FA1}[k]$ and $R_{0,s,0,FA2}[k]$ may mean a reception signal flowing into a subcarrier k. $R_{0,s,0,FA1}[k]$ and $R_{0,s,0,FA2}[k]$ may be modeled as $H_{0,s,0,FA1}[k]q_{0,s,0,FA1}[k]+Z_{FA1}[k]$ and $H_{0,s,0,FA2}[k]q_{0,s,0,FA2}[k]+Z_{FA2}[k]$, respectively. Each of $H_{0,s,0,FA1}[k]$ and $H_{0,s,0,FA2}[k]$ may mean a frequency response. Each of $Z_{FA1}[k]$ and $Z_{FA2}[k]$ may mean a noise. In Equation 19, $q^*_{0,s,0,FA1}[k]R_{0,s,0,FA1}[k]$ and $q^*_{0,s,0,FA1}[k]R_{0,s,0,FA2}[k]$ may mean the de-patterning operations. The de-patterning operation may refer to a process of making specific transmission signal components 1.

Thereafter, the first communication node may generate a sample structure #3-1 1217 and a sample structure #3-2 1227 through a subcarrier indexing operation. Specifically, the first communication node may adjust subcarrier positions in the sample structure #2-1 1215 and the sample structure #2-2 1225 to match input sample positions of the BQ-point IFFT operation. The de-patterned sample $Y_{FA1}[k]$ 1216 may be divided into two parts, and arranged in an upper portion and a lower portion of the sample structure #3-1 1217. The de-patterned sample $Y_{FA2}[k]$ 1226 may be divided into two parts, and arranged in an upper portion and a lower portion of the sample structure #3-2 1227.

The first communication node may generate time-domain samples $y_{FA1}[n]$ and $y_{FA2}[n]$ (n=0, 1, . . . , BQ−1) through BQ-point IFFT operations on samples of the sample structure #3-1 1217 and the sample structure #3-2 1227 that have undergone subcarrier indexing. Thereafter, the first communication node may input samples corresponding to a CP in $y_{FA1}[n]$ and $y_{FA2}[n]$ to a timing estimation block 1239 to obtain a sample index τ as shown in Equation 20.

$$\tau = \max_{0 \le n < N_{CP}, BQ - N_{CP} \le n < BQ} \{|y_{FA1}[n]|^2 + |y_{FA1}[n]|^2\}. \quad \text{[Equation 20]}$$

A value of the sample index τ obtained as in Equation 20 may correspond to a final timing estimation value. In Equation 20, if n maximizing $||y_{FA1}[n]|^2 + |y_{FA1}[n]|^2$ exists between 0 and samples of CP (i.e., $N_{cp}$), τ=n may be established. Meanwhile, if n maximizing $|y_{FA1}[n]|^2 + |y_{FA1}[n]|^2$ exists between BQ−$N_{CP}$ and BQ, τ=n−BQ may be established.

Figure 13:
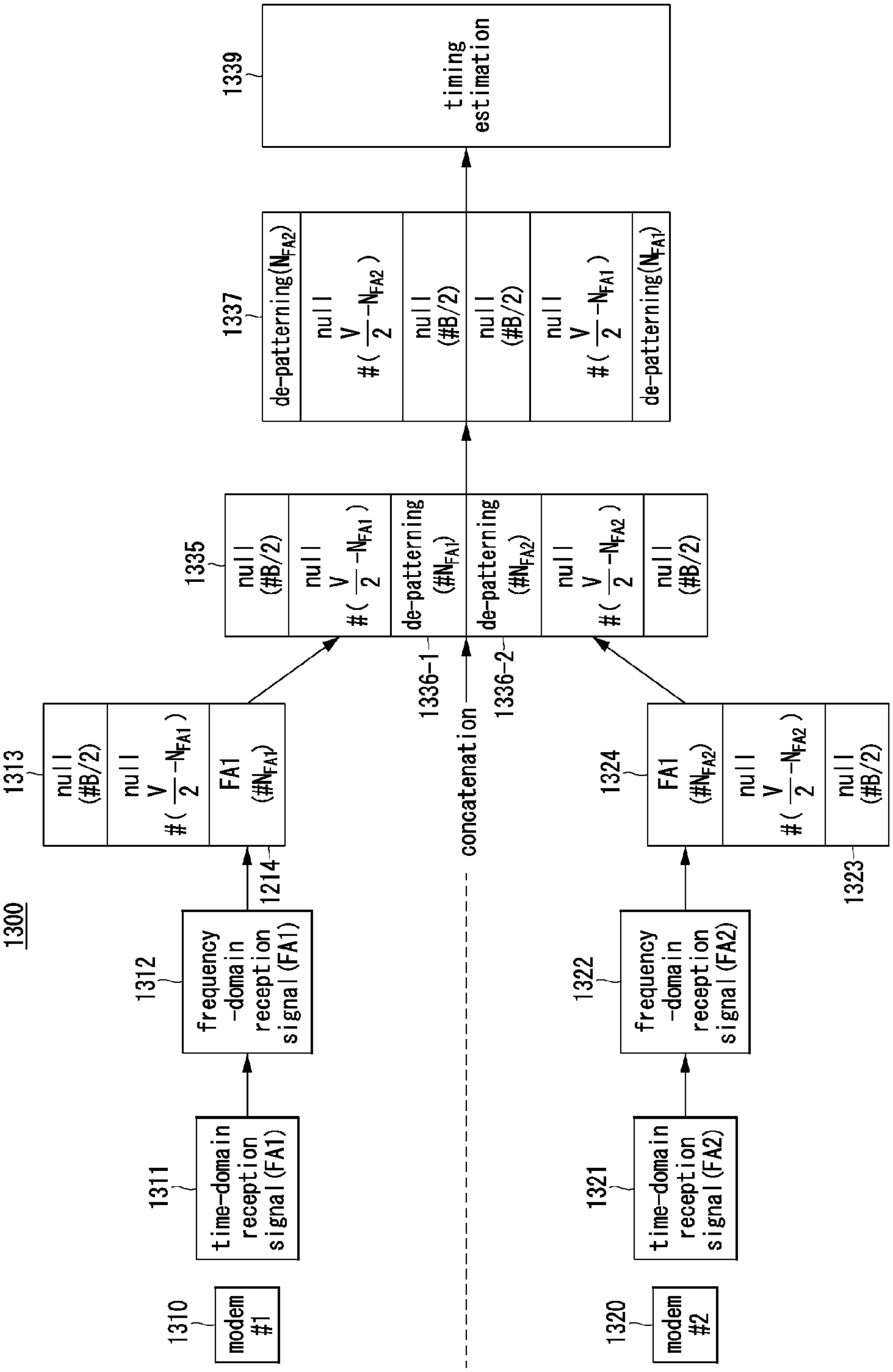
FIG. 13 is a conceptual diagram for describing a second exemplary embodiment of a radio signal reception method in a communication system.

FIG. 13 is a conceptual diagram for describing a second exemplary embodiment of a radio signal reception method in a communication system.

Referring to FIG. 13, in the second exemplary embodiment of the radio signal reception method in the communication system, a first communication node may receive a first reception signal. The first communication node may perform an operation such as timing estimation based on the first radio signal included in the received first reception signal. Hereinafter, in describing the second exemplary embodiment of the radio signal reception method with reference to FIG. 13, content overlapping with those described with reference to FIGS. 1 to 12 may be omitted.

Second Exemplary Embodiment of Radio Signal Reception Method

A first reception block 1300 of the first communication node may include one or more modems (i.e. modulator and demodulator) 1310 and 1320. The first communication node may receive the first radio signal using the one or more modems 1310 and 1320. The first reception signal may include the first radio signal. Here, the first radio signal may be the same as or similar to at least one of the first radio signals described with reference to FIGS. 1 to 11D. For example, the first radio signal may correspond to a radio signal generated and transmitted according to the first to eighth exemplary embodiments of the radio signal generation method. That is, the first radio signal included in the first reception signal may be a signal transmitted based on the comb-1. The first radio signal may correspond to the symbol #0 of the BS #0.

The first reception signal and the first radio signal may be mapped to one or more FAs. For example, the first communication node may receive and demodulate the first reception signal mapped to FA1 and FA2 using the modem #1 1310 and the modem #2 1320. The modem #1 1310 may demodulate components corresponding to FA1 in the first reception signal. The modem #2 1320 may demodulate components corresponding to FA2 in the first reception signal. Based on components corresponding to the first radio signal except for a CP in the first reception signal, the first communication node may perform timing estimation and the like.

A time-domain reception signal 1311 corresponding to FA1 and a time-domain reception signal 1321 corresponding to FA2 may each have Q samples. Q may be a natural number. Frequency-domain reception signals 1312 and 1322 each having Q samples may be generated through a Q-point FFT operation on the time-domain reception signals 1311 and 1321.

As a subcarrier de-indexing operation and a zero-padding operation are performed on each of the frequency-domain reception signals 1312 and 1322, a sample structure #1-1 1313 and a sample structure #1-2 1323 may be obtained. The sample structure #1-1 1313 and sample structure #1-2 1323 may include as many samples as a first set number. Here, the first set number may be equal to or close to a half (i.e., BV/2) of the number BV of input samples of a BV-point IFFT operation.

In the sample structure #1-1 1313, $N_{FA1}$ samples 1314 to which components corresponding to FA1 in the first radio signal are allocated may be extracted and placed at the lowest portion. In the sample structure #1-2 1323, $N_{FA2}$ samples 1324 to which components corresponding to FA2 in the first radio signal are allocated may be extracted and placed at the uppermost portion. This may correspond to the subcarrier de-indexing operation.

In the sample structure #1-1 1313, null values may be applied to the remaining subcarriers (i.e., an upper subcarrier group) excluding the samples corresponding to the $N_{FA1}$ samples 1314 to which the components corresponding to FA1 in the first radio signal are allocated. In the sample structure #1-2 1323, null values may be applied to the remaining subcarriers (i.e., a lower subcarrier group) excluding the samples corresponding to the $N_{FA2}$ samples 1224 to which the components corresponding to FA2 in the first radio signal are allocated. This may correspond to the zero-padding operation.

Thereafter, the first communication node may generate a sample structure #2 1335 and a sample structure #3 1337 through a de-patterning operation, concatenation operation, subcarrier indexing operation, and the like. Specifically, the first communication node may generate a de-patterned sample $Y_{FA1}[k]$ 1336-1 and a de-patterned sample $Y_{FA2}[k]$ 1336-2 as shown in Equation 19 described with reference to FIG. 12, with respect to received subcarriers corresponding $q_{0,s,0}$ which is defined for each FA based on Equation 1, Equation 5, Equation 7, Equation 9, and the like in the sample structure #1-1 1313 and the sample structure #1-2 1323.

Thereafter, the first communication node may adjust subcarrier positions in the sample structure #2 1335 to match input sample positions of the BV-point IFFT operation through the subcarrier indexing operation. The depatterned sample $Y_{FA1}[k]$ 1336-1 may be arranged at a lower portion of sample structure #3 1337. The depatterned sample $Y_{FA2}[k]$ 1336-2 may be arranged at an upper portion of sample structure #3 1327.

The first communication node may generate time-domain samples $y_{FA1}[n]$ and $y_{FA2}[n]$ (n=0, 1, . . . , BV−1) through the BV-point IFFT operation on samples of the sample structure #3 1337 that have undergone subcarrier indexing. Thereafter, the first communication node may input samples corresponding to a CP in $y_{FA1}[n]$ and $y_{FA2}[n]$ to a timing estimation block 1339 to obtain a sample index τ as shown in Equation 21.

$$\tau = \max_{0 \le n < N_{CP}, BV - N_{CP \le n < BV}} \left\{ |y_{FA1}[n]|^2 + |y_{FA1}[n]|^2 \right\} \quad \text{[Equation 21]}$$

A value of the sample index τ obtained as in Equation 21 may correspond to a final timing estimation value. In Equation 21, if n maximizing $\|y_{FA1}[n]|^2+|y_{FA1}[n]|^2$ exists between 0 and samples of CP (i.e., $N_{CP}$), τ=n may be established. Meanwhile, if n maximizing $|y_{FA1}[n]|^2+|y_{FA1}[n]|^2$ exists between $BV-N_{CP}$ and BV, τ=n−BV may be established.

Figure 14:
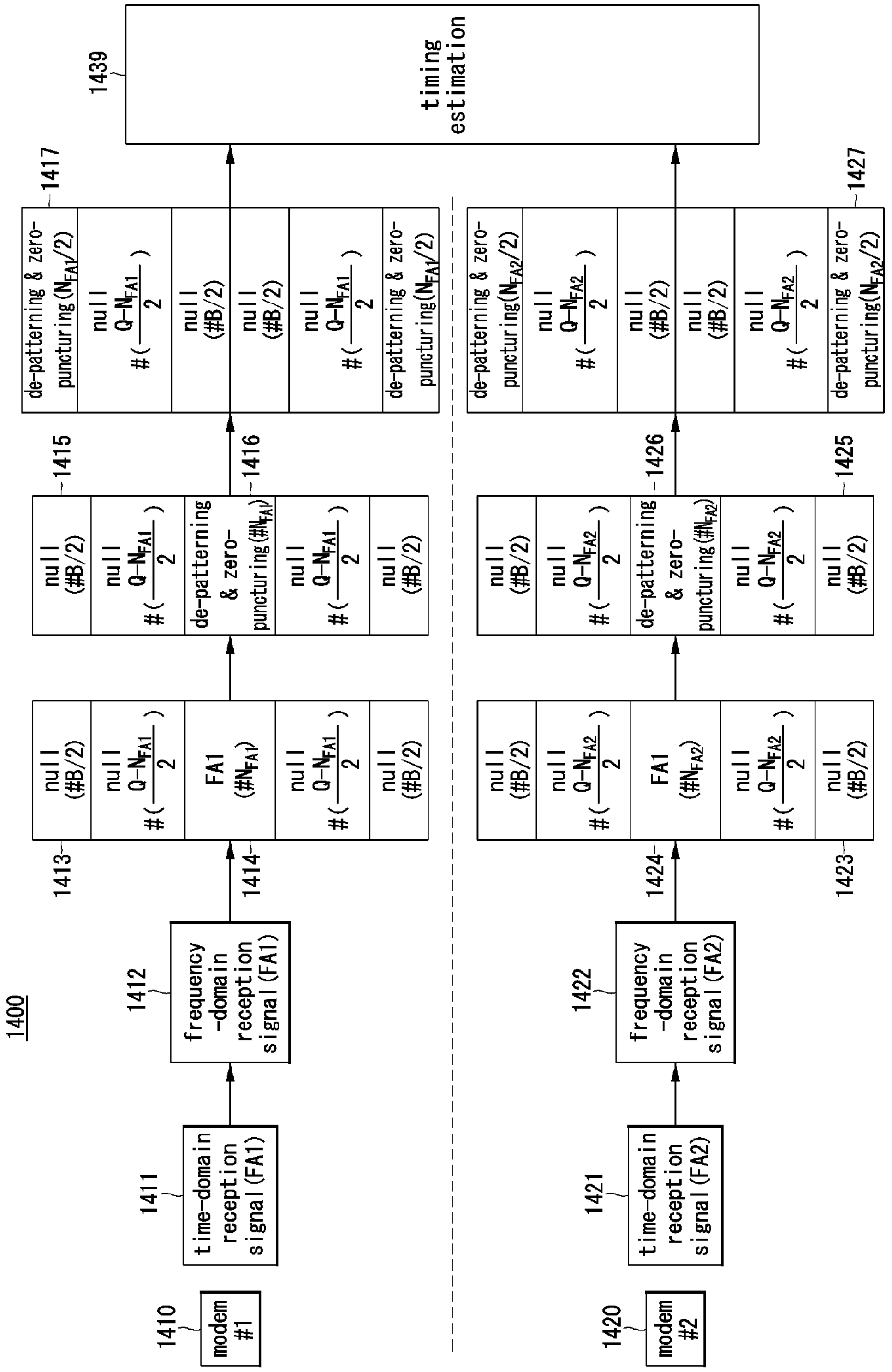
FIG. 14 is a conceptual diagram for describing a third exemplary embodiment of a radio signal reception method in a communication system.

FIG. 14 is a conceptual diagram for describing a third exemplary embodiment of a radio signal reception method in a communication system.

Referring to FIG. 14, in the third exemplary embodiment of the radio signal reception method in the communication system, a first communication node may receive a first reception signal. The first communication node may perform an operation such as timing estimation based on the first radio signal included in the received first reception signal. Hereinafter, in describing the third exemplary embodiment of the radio signal reception method with reference to FIG. 14, content overlapping with those described with reference to FIGS. 1 to 13 may be omitted.

Third Exemplary Embodiment of Radio Signal Reception Method

A first reception block 1400 of the first communication node may include one or more modems (i.e. modulator and demodulator) 1410 and 1420. The first communication node may receive a first radio signal using the one or more modems 1410 and 1420. The first reception signal may include the first radio signal. Here, the first radio signal may be the same as or similar to at least one of the first radio signals described with reference to FIGS. 1 to 11D. For example, the first radio signal may correspond to a radio signal generated and transmitted according to the ninth to twelfth exemplary embodiments of the radio signal generation method. That is, the first radio signal included in the first reception signal may be a signal transmitted based on the comb-2 or comb-4. The first radio signal may correspond to the symbol #0 of the BS #0.

The first reception signal and the first radio signal may be mapped to one or more FAs. For example, the first communication node may receive and demodulate the first reception signal mapped to FA1 and FA2 using the modem #1 1410 and the modem #2 1420. The modem #1 1410 may demodulate components corresponding to FA1 in the first reception signal. The modem #2 1420 may demodulate components corresponding to FA2 in the first reception signal. Based on components corresponding to the first radio signal except for a CP in the first reception signal, the first communication node may perform timing estimation and the like.

A time-domain reception signal 1411 corresponding to FA1 and a time-domain reception signal 1421 corresponding to FA2 may each have Q samples. Q may be a natural number. Frequency-domain reception signals 1412 and 1422 each having Q samples may be generated through a Q-point FFT operation on the time-domain reception signals 1411 and 1421.

As a subcarrier de-indexing operation and a zero-padding operation are performed on each of the frequency-domain reception signals 1412 and 1422, a sample structure #1-1 1413 and a sample structure #1-2 1423 may be obtained. The sample structure #1-1 1413 and sample structure #1-2 1423 may include as many samples as a first set number. Here, the first set number may be equal to or close to the number BQ of input samples of a BQ-point IFFT operation.

In the sample structure #1-1 1413, $N_{FA1}$ samples 1414 to which the components corresponding to FA1 in the first radio signal are allocated may be extracted and placed in the middle portion (or the same or similar portion as the middle portion). In the sample structure #1-2 1423, $N_{FA2}$ samples 1424 to which the components corresponding to FA2 in the first radio signal are allocated may be extracted and placed in the middle portion (or the same or similar portion as the middle portion). This may correspond to the subcarrier de-indexing operation.

In the sample structure #1-1 1413, null values may be applied to the remaining subcarriers (i.e., an upper subcarrier group and a lower subcarrier group) excluding the samples corresponding to the $N_{FA1}$ samples 1414 to which the components corresponding to FA1 in the first radio signal are allocated. In the sample structure #1-2 1423, null values may be applied to the remaining subcarriers (i.e., an upper subcarrier group and a lower subcarrier group) excluding the samples corresponding to the $N_{FA2}$ samples 1424 to which the components corresponding to FA2 in the first radio signal are allocated. This may correspond to the zero-padding operation.

Thereafter, the first communication node may generate a sample structure #2-1 1415 and a sample structure #2-2 1425 through a de-patterning operation and a zero-puncturing operation. Specifically, the first communication node may generate a de-patterned and zero-punctured sample Y[k] 1416 and 1426 as shown in Equation 22, with respect to received subcarriers corresponding $q_{0,s,0}$ which is defined for each FA based on Equation 11 and the like in the sample structure #1-1 1413 and the sample structure #1-2 1423.

$$Y[k] = \begin{cases} q^*_{0,s,0}[k]R_{0,s,0}[k], & k = 2k', \quad k' = 0, 1, 2, \dots, \frac{N_{RB}M_{RB}}{N_{comb}} - 1 \\ 0, & k = 2k' + 1, \quad k' = 0, 1, 2, \dots, \frac{N_{RB}M_{RB}}{N_{comb}} - 1. \end{cases} \quad \text{[Equation 22]}$$

In Equation 22, $R_{0,s,0}[k]$ may mean a reception signal flowing into a subcarrier k. $R_{0,s,0}[k]$ may be modeled as $H_{0,s,0}[k]q_{0,s,0}[k]+Z[k]$. $H_{0,s,0}[k]$ may mean a frequency response. Z[k] may mean a noise. In Equation 22, $q^*_{0,s,0}[k]$ $R_{0,s,0}[k]$ may mean the de-patterning operation. The de-patterning operation may refer to a process of making specific components of a transmission signal 1. Meanwhile, a process of making a value of a subcarrier k=2k'+1 zero may mean the zero-puncturing operation. Y[k] 1416 and 1426 may be expressed as $Y_{FA1}[k]$ 1416 and $Y_{FA2}[k]$ 1426 for the respective FAs.

Thereafter, the first communication node may generate a sample structure #3-1 1417 and a sample structure #3-2 1427 through a subcarrier indexing operation. Specifically, the first communication node may adjust subcarrier positions in the sample structure #2-1 1415 and the sample structure #2-2 1425 to match input sample positions of the BQ-point IFFT operation. The de-patterned sample $Y_{FA1}[k]$ 1416 may be divided into two parts, and arranged in an upper portion and a lower portion of the sample structure #3-1 1417. The de-patterned sample $Y_{FA2}[k]$ 1426 may be divided into two parts, and arranged in an upper portion and a lower portion of the sample structure #3-2 1427.

The first communication node may generate time-domain samples $y_{FA1}[n]$ and $y_{FA2}[n]$ (n=0, 1, . . . , BQ−1) through the BQ-point IFFT operation on samples of the sample structure #3-1 1417 and the sample structure #3-2 1427 that have undergone subcarrier indexing. Thereafter, the first communication node may input samples corresponding to a CP in $y_{FA1}[n]$ and $y_{FA2}[n]$ to a timing estimation block 1439 to obtain a sample index τ as shown in Equation 20. A value of the sample index τ obtained as in Equation 20 may correspond to a final timing estimation value. In Equation 20, if n maximizing $\|y_{FA1}[n]^2+|y_{FA1}[n]|^2$ exists between 0 and samples of CP (i.e., $N_{CP}$), τ=n may be established. Meanwhile, if n maximizing $|y_{FA1}[n]|^2+|y_{FA1}[n]|^2$ exists between BQ−$N_{CP}$ and BQ, τ=n−BQ may be established.

Figure 15:
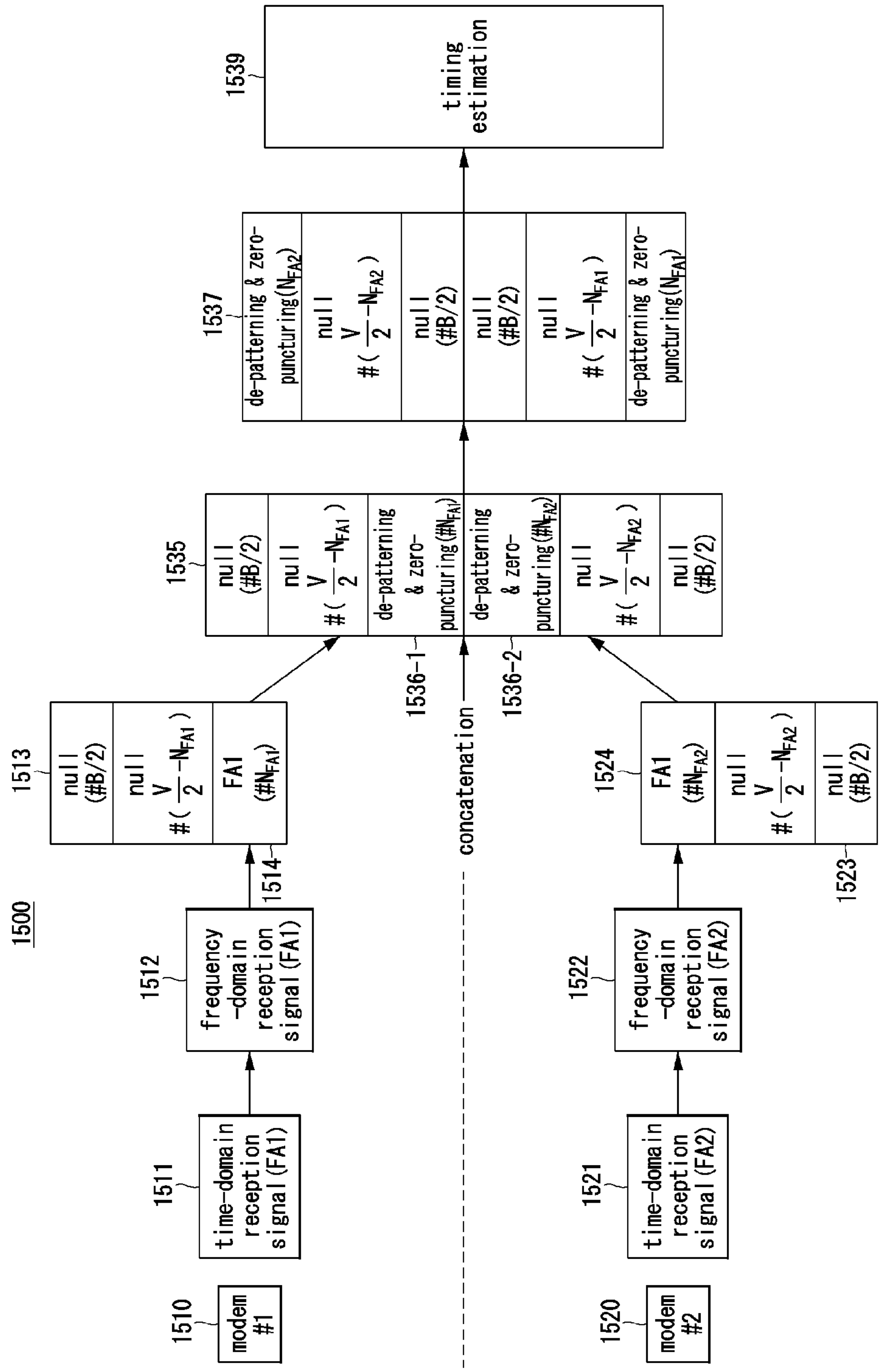
FIG. 15 is a conceptual diagram for describing a fourth exemplary embodiment of a radio signal reception method in a communication system.

FIG. 15 is a conceptual diagram for describing a fourth exemplary embodiment of a radio signal reception method in a communication system.

Referring to FIG. 15, in the fourth exemplary embodiment of the radio signal reception method in the communication system, a first communication node may receive a first reception signal. The first communication node may perform an operation such as timing estimation based on the first radio signal included in the received first reception signal. Hereinafter, in describing the fourth exemplary embodiment of the radio signal reception method with reference to FIG. 15, content overlapping with those described with reference to FIGS. 1 to 14 may be omitted.

Fourth Exemplary Embodiment of Radio Signal Reception Method

A first reception block 1500 of the first communication node may include one or more modems (i.e. modulator and demodulator) 1510 and 1520. The first communication node may receive a first radio signal using the one or more modems 1510 and 1520. The first reception signal may include the first radio signal. Here, the first radio signal may be the same as or similar to at least one of the first radio signals described with reference to FIGS. 1 to 11D. For example, the first radio signal may correspond to a radio signal generated and transmitted according to the first to eighth exemplary embodiments of the radio signal generation method. That is, the first radio signal included in the first reception signal may be a signal transmitted based on the comb-2 or comb-4. The first radio signal may correspond to the symbol #0 of the BS #0.

The first reception signal and the first radio signal may be mapped to one or more FAs. For example, the first communication node may receive and demodulate the first reception signal mapped to FA1 and FA2 using the modem #1 1510 and the modem #2 1520. The modem #1 1510 may demodulate components corresponding to FA1 in the first reception signal. The modem #2 1520 may demodulate components corresponding to FA2 in the first reception signal. Based on components corresponding to the first radio signal except for a CP in the first reception signal, the first communication node may perform timing estimation and the like.

A time-domain reception signal 1511 corresponding to FA1 and a time-domain reception signal 1521 corresponding to FA2 may each have Q samples. Q may be a natural number. Frequency-domain reception signals 1512 and 1522 each having Q samples may be generated through a Q-point FFT operation on the time-domain reception signals 1511 and 1521.

As a subcarrier de-indexing operation and a zero-padding operation are performed on each of the frequency-domain reception signals 1512 and 1522, a sample structure #1 1513 and a sample structure #2 1523 may be obtained. The sample structure #1 1513 and sample structure #2 1523 may include as many samples as a first set number. Here, the first set number may be equal to or close to a half (i.e., BV/2) of the number BV of input samples of a BV-point IFFT operation.

In the sample structure #1-1 1513, $N_{FA1}$ samples 1514 to which components corresponding to FA1 in the first radio signal are allocated may be extracted and placed at the lowest portion. In the sample structure #1-2 1523, $N_{FA2}$ samples 1524 to which components corresponding to FA2 in the first radio signal are allocated may be extracted and placed at the uppermost portion. This may correspond to the subcarrier de-indexing operation.

In the sample structure #1-1 1513, null values may be applied to the remaining subcarriers (i.e., an upper subcarrier group) excluding the samples corresponding to the $N_{FA1}$ samples 1514 to which the components corresponding to FA1 in the first radio signal are allocated. In the sample structure #1-2 1523, null values may be applied to the remaining subcarriers (i.e., a lower subcarrier group) excluding the samples corresponding to the $N_{FA2}$ samples 1524 to which the components corresponding to FA2 in the first radio signal are allocated. This may correspond to the zero-padding operation.

Thereafter, the first communication node may generate a sample structure #2 1535 and a sample structure #3 1537 through a de-patterning operation, zero-puncturing operation, concatenation operation, subcarrier indexing operation, and the like. Specifically, the first communication node may generate a de-patterned and zero-punctured sample Y[k] 1536-1 and 1536-2 as shown in Equation 22 described with reference to FIG. 14, with respect to received subcarriers corresponding $q_{0,s,0}$ which is defined for each FA based on Equation 11, and the like in the sample structure #1-1 1513 and the sample structure #1-2 1523.

Thereafter, the first communication node may adjust subcarrier positions in the sample structure #2 1535 to match input sample positions of the BV-point IFFT operation through the subcarrier indexing operation. The depatterned sample $Y_{FA1}[k]$ 1536-1 may be arranged at a lower portion of sample structure #3 1537. The depatterned sample $Y_{FA2}[k]$ 1536-2 may be arranged at an upper portion of sample structure #3 1537.

The first communication node may generate time-domain samples $y_{FA1}[n]$ and $y_{FA2}[n]$ (n=0, 1, . . . , BV−1) through a BV-point IFFT operation on samples of the sample structure #3 1537 that have undergone subcarrier indexing. Thereafter, the first communication node may input samples corresponding to a CP in $y_{FA1}[n]$ and $y_{FA2}[n]$ to a timing estimation block 1539 to obtain a sample index τ as shown in Equation 23.

$$\tau = \max_{0\le n<N_{CP},BV-N_{CP\le n<BV}} \left\{|y_{FA1}[n]|^2 + |y_{FA1}[n]|^2\right\} \quad \text{[Equation 23]}$$

A value of the sample index τ obtained as in Equation 23 may correspond to a final timing estimation value. In Equation 23, if n maximizing $\|y_{FA1}[n]|^2+|y_{FA1}[n]|^2$ exists between 0 and samples of CP (i.e., $N_{CP}$), τ=n may be established. Meanwhile, if n maximizing $|y_{FA1}[n]|^2+|y_{FA1}[n]|^2$ exists between BV−$N_{CP}$ and BV, τ=n−BV may be established.

According to exemplary embodiments of a method and an apparatus for transmitting and receiving signals for timing estimation in the communication system, timing estimation performance can be improved based on radio signals designed in consideration of an interference avoidance effect for each base station or each FA in the CA transmission mode. Accordingly, improvement in time resolution and timing accuracy performance can be expected even in an environment where hardware impairment is non-negligible for each FA frequency band (or across FA frequency bands).

However, the effects that can be achieved by the exemplary embodiments of the method and apparatus for transmitting and receiving signals for timing estimation in the communication system are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a communication system, comprising:

generating a first component carrier (CC) sequence and a second CC sequence corresponding to a first CC and a second CC, respectively, based on a first sequence;

mapping elements of a first CC signal and a second CC signal, which are respectively generated by modulating the first and second CC sequences, to first and second subcarrier groups corresponding to the first and second CCs, a first cell, and a first symbol;

generating a third CC sequence and a fourth CC sequence corresponding to the first CC and the second CC, respectively, based on a second sequence;

mapping elements of a third CC signal and a fourth CC signal, which are respectively generated by modulating the first and second CC sequences, to third and fourth subcarrier groups corresponding to the first and second CCs, a second cell, and a second symbol; and transmitting, by the first cell, a first transmission signal including the first and second CC signals mapped to the first and second subcarrier groups, and transmitting, by the second cell, a second transmission signal including the third and fourth CC signals mapped to the third and fourth subcarrier groups.

2. The method according to claim 1, wherein null values are mapped to the subcarrier groups corresponding to the first and second CCs, the first cell, and the second symbol, and the subcarrier groups corresponding to the first and second CCs, the second cell, and the first symbol.

3. The method according to claim 1, further comprising, before the generating of the first CC sequence and the second CC sequence, determining the first sequence and the second sequence at least based on first to third identifiers, wherein the first identifier is identifier(s) of the first and second cells, the second identifier is an identifier of a time resource, the third identifier is identifier(s) of the first and second symbols, the first sequence is equally determined for the first and second CCs, and the second sequence is equally determined for the first and second CCs.

4. The method according to claim 1, further comprising, before the generating of the first CC sequence and the second CC sequence, determining the first sequence and the second sequence at least based on first to fourth identifiers, wherein the first identifier is identifier(s) of the first and second cells, the second identifier is an identifier of a time resource, the third identifier is identifier(s) of the first and second symbols, and the fourth identifier is identifier(s) of the first and second CCs.

5. The method according to claim 1, wherein the first and second transmission signals are generated based on a transmission comb value of 1.

6. The method according to claim 1, wherein a number of elements of the first and second sequences is determined based on a total number of available subcarriers for each CC, and the total number of available subcarriers for each CC is determined based on a number of resource blocks for each CC, a number of subcarriers for each resource block, and a transmission comb value.

7. The method according to claim 1, wherein the generating of the first CC sequence and the second CC sequence comprises: determining values of elements constituting a first element group and a second element group included in the first CC sequence, based on the first sequence, wherein values of elements of one of the first and second element groups are determined based on a first modified sequence modified from the first sequence.

8. The method according to claim 7, wherein one group among the first and second element groups is composed of elements having even indices and another group is composed of elements having odd indices.

9. The method according to claim 7, wherein the generating of the first CC sequence and the second CC sequence comprises: determining values of elements constituting a third element group and a fourth element group included in the second CC sequence, based on the first sequence, wherein indices of elements constituting the first to fourth element groups are determined as successive values.

10. The method according to claim 9, wherein values of elements of one group among the third and fourth element groups are determined based on a second modified sequence modified from the first sequence, and values of elements of another group are determined based on a third modified sequence modified from the first sequence.

11. The method according to claim 1, wherein a guard band is disposed between the first and second subcarrier groups and between the third and fourth subcarrier groups, respectively.

12. A method of a communication system, comprising:

generating a first component carrier (CC) sequence and a second CC sequence corresponding to a first CC and a second CC, respectively, based on a first sequence;

mapping elements of a first CC signal and a second CC signal, which are respectively generated by modulating the first and second CC sequences, to first and second subcarrier groups corresponding to the first and second CCs, a first cell, and a first symbol;

generating a third CC sequence and a fourth CC sequence corresponding to the first CC and the second CC, respectively, based on a second sequence;

mapping elements of a third CC signal and a fourth CC signal, which are respectively generated by modulating the third and fourth CC sequences, to third and fourth subcarrier groups corresponding to the first and second CCs, the first cell, and a second symbol; and transmitting a first transmission signal including the first and second CC signals mapped to the first and second subcarrier groups and the third and fourth CC signals mapped to the third and fourth subcarrier groups.

13. The method according to claim 12, wherein elements having odd indices in the first and second CC sequences and elements having even indices in the third and fourth CC sequences all have null values.

14. The method according to claim 12, further comprising:

generating a fifth CC sequence and a sixth CC sequence corresponding to the first CC and the second CC, respectively, based on a third sequence;

mapping elements of a fifth CC signal and a sixth CC signal, which are respectively generated by modulating the fifth and sixth CC sequences, to fifth and sixth subcarrier groups corresponding to the first and second CCs, a second cell, and the first symbol;

generating a seventh CC sequence and an eighth CC sequence corresponding to the first CC and the second CC, respectively, based on a fourth sequence;

mapping elements of a seventh CC signal and an eighth CC signal, which are respectively generated by modulating the seventh and eighth CC sequences, to seventh and eighth subcarrier groups corresponding to the first and second CCs, the second cell and the second symbol; and transmitting a second transmission signal including the fifth and sixth CC signals mapped to the fifth and sixth subcarrier groups and the seventh and eighth CC signals mapped to the seventh and eighth subcarrier groups.

15. The method according to claim 14, wherein elements having even indices in the fifth and sixth CC sequences and elements having odd indices in the seventh and eighth CC sequences all have null values.

16. The method according to claim 12, further comprising, before the generating of the first CC sequence and the second CC sequence, determining the first sequence and the second sequence at least based on first to third identifiers, wherein the first identifier is an identifier of the first cell, the second identifier is an identifier of a time resource, and the third identifier is identifier(s) of the first and second symbols.

17. The method according to claim 12, wherein the first transmission signal is generated based on a transmission comb value of 2.

18. The method according to claim 12, wherein a number of elements of the first and second sequences is determined based on a total number of available subcarriers for each CC, and the total number of available subcarriers for each CC is determined based on a number of resource blocks for each CC, a number of subcarriers for each resource block, and a transmission comb value.

19. The method according to claim 12, wherein when the first transmission signal is generated based on a transmission comb value of n, the method further comprises: before the transmitting of the first transmission signal, generating a (2n−1)-th CC sequence and a 2n-th CC sequence corresponding to the first CC and the second CC, respectively, based on an n-th sequence; and mapping elements of a (2n−1)-th CC signal and a 2n-th CC signal, which are respectively generated by modulating the (2n−1)-th and 2n-th CC sequences, to (2n−1)-th and 2n-th subcarrier groups corresponding to the first and second CCs, the first base station, and an n-th symbol, wherein the first transmission signal further includes the (2n−1)-th CC signal and the 2n-th CC signal, and n is a natural number greater than 2.

* * * * *